(12) United States Patent
Zheng et al.

(10) Patent No.: US 6,611,522 B1
(45) Date of Patent: Aug. 26, 2003

(54) QUALITY OF SERVICE FACILITY IN A DEVICE FOR PERFORMING IP FORWARDING AND ATM SWITCHING

(75) Inventors: Qin Zheng, Boxborough, MA (US); Steven R. Willis, Acton, MA (US); Frank Kastenholz, Chelmsford, MA (US); Eric Crawley, Maynard, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 09/336,311

(22) Filed: Jun. 18, 1999

Related U.S. Application Data

(60) Provisional application No. 60/090,028, filed on Jun. 19, 1998.

(51) Int. Cl.⁷ ............................................... H04L 12/28
(52) U.S. Cl. ........................... 370/395.21; 370/395.42; 370/395.5; 370/469; 709/245; 709/230; 709/238
(58) Field of Search .................... 370/395.21, 395.4, 370/395.41, 395.42, 395.43, 395.5, 395.51, 395.52, 230, 235, 230.1, 389, 400, 401, 402, 404, 405, 395.1, 396, 465, 466, 469, 902, 905, 912

(56) References Cited

U.S. PATENT DOCUMENTS 5,822,319 A * 10/1998 Nagami et al. ............. 370/392
5,892,924 A * 4/1999 Lyon et al. .................. 709/245
5,903,559 A * 5/1999 Acharya et al. ............. 370/355
6,021,263 A * 2/2000 Kujoory et al. ............. 709/232
6,097,722 A * 8/2000 Graham et al. ......... 370/395.21
6,115,373 A * 9/2000 Lea ............................. 370/355

OTHER PUBLICATIONS

Copy of U.S. Ser. No. 09/237,128, filed on Jan. 25, 1999; Frank Kastenholz; Network Packet Forwarding Lookup With A Reduced Number Of Memory Accesses; 47 pages.
Copy of U.S. Ser. No. 09/336,229, filed Jun. 18, 1999; Steven R. Willis; Device for Performing IP Forwarding And ATM Switching; 62 pages.
Copy of U.S. Ser. No. 09/336,090, filed Jun. 18, 1999; Frank Kastenholz et al.; An Interconnect Network For Operation Without A Communication Node; 57 pages.

(List continued on next page.)

Primary Examiner—Dang Ton
Assistant Examiner—Tri H. Phan
(74) Attorney, Agent, or Firm—Harrity & Snyder, LLP

(57) ABSTRACT

According to one embodiment, the invention is directed to a facility for providing Asynchronous Transfer Mode (ATM) and Internet Protocol (IP) Quality of Service (QoS) features in a digital communication node. The facility includes a plurality of logical input ports, a plurality of logical output ports, ATM switching elements, IP routing elements and QoS elements. The switching and forwarding elements transfer ATM data cells and IP data packets from the logical input ports to the logical output ports. The QoS elements prioritize, schedule and flow control the transfer of data, based at least in part on ATM QoS features associated with the ATM data cells and on IP QoS features associated with the IP data packets.

53 Claims, 33 Drawing Sheets

OTHER PUBLICATIONS

Copy of U.S. Ser. No. 09/335,947, filed on Jun. 18. 1999; Gregg Bromley et al.; Method And System For Encapsulating/Decapsulating Date On A Per Channel Bases In Hardware; 59 pages.

Almesberger, W. et al., "Application Requested IP over ATM(Arequipa) and its use in the Web," Global Information Infrastructure (G11) Evolution, S. Rao et al. Eds., IOS Press, pp. 252–260 (1996).

Keshav, S. et al., "Issues and Trends in Router Design," *IEEE Communications Magazine,* pp. 144–151 (May 1998).

Kühn, S. et al., "Current and Advanced Protocols over ATM: Evaluation, Implementation and Experiences," GB, London, Chapman and Hall, pp. 430–442 (1996).

Matsumoto, T. et al., "Evolution of ATM Switch Family for Diverse Networks and Services," *NEC Research and Development,* Tokyo, Japan, vol. 36, No. 4, pp. 502–512 (Oct. 1995).

Parulkar, G. et al., "$A^iT^pM$: a Strategy for Intergrating IP with ATM," *Computer Communication Review,* vol. 25, No. 4, pp. 49–58 (Oct. 1995).

* cited by examiner

DS-3 PLCP FRAME

QUALITY OF SERVICE FACILITY IN A DEVICE FOR PERFORMING IP FORWARDING AND ATM SWITCHING

RELATED APPLICATIONS

This application claims the benefit of priority under 35 U.S.C. 119(e) to U.S. Provisional Application Serial No. 60/090,028, filed Jun. 19, 1998, and is related to U.S. patent application Ser. No. 09/237,128, filed Jan. 25, 1999, and entitled "NETWORK PACKET FORWARDING LOOKUP WITH A REDUCED NUMBER OF MEMORY ACCESSES," U.S. patent application Ser. No. 09/336,090, filed Jun. 18, 1999, and entitled "AN INTERCONNECT NETWORK FOR OPERATION WITHIN A COMMUNICATION NODE," U.S. patent application Ser. No. 09/336,229, filed Jun. 18, 1999, and entitled "DEVICE FOR PERFORMING IP FORWARDING AND ATM SWITCHING," and U.S. patent application Ser. No. 09/335,947, filed Jun. 18, 1999, and entitled "METHOD AND SYSTEM FOR ENCAPSULATING/DECAPSULATING DATA ON A PER CHANNEL BASIS IN HARDWARE". The entire contents of each of the applications are hereby incorporated by reference.

TECHNICAL FIELD

The present invention relates generally to communication nodes and more particularly to Quality of Service (QoS) features in a single communication node for performing IP forwarding and ATM switching.

BACKGROUND OF THE INVENTION

QoS covers a broad range of issues in computer networks. QoS features can take the form of preferred service for particular data flows. QoS features can also include congestion control. As used herein, the term "QoS features" refers to those features in a digital communication network that provide a capability to differentiate between data flows so that network service providers some traffic differently than other traffic. The need for QoS features arises from different types of network traffic having different transmission requirements. By way of example, to avoid echoes, voice traffic typically requires a 64 kbs bandwidth, with less than 100 ms of delay. Alternatively, non-interactive broadcast video typically requires a 271 Mbs bandwidth, but does not have a strict delay requirement. To be competitive, network service providers need to provide differentiated classes of service.

In conventional systems, ATM networks have been viewed as separate universes from IP networks. ATM networks work well for a subset of services, and IP networks work well for a different subset of services. Traditionally, ATM networks have been viewed as preferential for applications requiring more sophisticated QoS features. For example, the ATM Forum has defined five service categories for ATM: Constant Bit Rate (CBR); real-time Variable Bit Rate (rtVBR); non-real-time Variable Bit Rate (nrtVBR); Unspecified Bit Rate (UBR); and Available Bit Rate (ABR). When a service provider sets up an ATM virtual circuit (VC), the service provider and the user contract for one of the service categories. With each service category, comes a set of transmission priority parameters that are specific to the category.

However, as multimedia applications have infiltrated computer networking, IP QoS features have improved. Today, IP QoS features include the ReSerVation Protocol (RSVP); the Integrated Services models (IntServ); and the Integrated Services over Specific Link Layers (ISSLL). Together, these components provide comprehensive QoS features for end-to-end flows, but still do not provide all of the QoS features available from ATM. Additionally, this type of end-to-end flow regulation lacks the flexibility required for adapting to emerging technologies.

Given that neither IP nor ATM offer a complete multiservice solution, many service providers choose to operate dual networks. IP networks support applications such as Internet access and virtual private networks (VPNs), whereas ATM networks support Frame Relay (FR), VPNs, circuit emulation, private branch exchanges (PBX) and other applications where reliability and more rigorous QoS are a priority. These dual networks can be a complex and expensive aggregation of core routers connecting smaller Access Points of Presence (PoPs) to the core transport capacity. These structures are fragile, with frequent service outages due to performance limitations and equipment failures. Enterprises cannot afford to be exposed to significant down time due to failures or updates associated with conventional technology.

Accordingly, an object of the invention is to provide enhanced QoS features in a single communication node for performing IP forwarding and ATM switching.

A further object of the invention is to provide QoS features, which are capable of accommodating emerging technologies, in a single communication node.

Another object of the invention is to provide QoS features, which are capable of accommodating a variety of communication protocols, without requiring the maintenance of costly parallel networks.

These and other objects of the invention will be apparent with respect to the following description of the invention.

SUMMARY OF THE INVENTION

The invention is directed to a facility and related methods for providing Asynchronous Transfer Mode (ATM) and Internet Protocol (IP) Quality of Service (QoS) features in a digital communication node. Optionally, the QoS facility of the invention also provides Frame Relay (FR) QoS features. According to one embodiment of the invention, the facility comprises a plurality of logical input ports, a plurality of logical output ports, switching elements, routing elements and QoS elements.

The logical input ports are adapted for receiving input data flows from external data sources. Similarly, the logical output ports are adapted for transmitting output data flows to a plurality of external data destinations. According to the invention, the input and output data flows can be ATM-based data flows or IP-based data flows. The input and output data flows can also be IP over ATM. That is, IP packets can be carried in ATM cells. In a further embodiment of the invention, the logical input ports are included in a common physical interface. According to a further aspect, the input data flows through the common physical interface include Synchronous Optical Network (SONET) frames.

The switching elements are adapted for switching ATM data cells from one of the logical input ports toward at least one of the logical output ports, along a selected forwarding path. According to a further feature of the invention, the switching elements include ATM lookup elements for identifying toward which of the logical output ports particular ATM data cells should be switched.

The routing elements are adapted for routing IP data packets from one of the logical input ports toward at least one of the logical output ports along a selected forwarding path. According to a further embodiment of the invention, the routing elements include IP lookup elements for identifying toward which of the logical output ports to rout a particular IP data packet, in response to information contained in the particular IP data packet.

The QoS elements are common to the switching elements and the routing elements and provide ATM QoS features to the ATM data cells and IP QoS features to the to the IP data packets. Optionally, the ATM lookup elements are further adapted for determining which of the ATM QoS features should be applied to a particular ATM data cell. According to a time saving feature, the lookup elements identify a forwarding path and determine the applicable ATM QoS features in a single lookup operation.

The ATM QoS features include one or more of, Constant Bit Rate (CBR), Unspecified Bit Rate (UBR), non-real-time Variable Bit Rate (nrtVBR), real-time Variable Bit Rate (rtVBR) and Available Bit Rate (ABR), and the IP QoS features include one or more of, Provisional QoS, Differentiated Services, and Integrated Services.

In another embodiment of the invention, the facility for providing ATM and IP QoS features includes a mechanical housing that contains both the switching, routing and QoS elements. In this way, a facility according to one embodiment of the invention, provides an integrated system for switching ATM data cells, routing IP data packets and providing ATM and IP QoS features. Thus, a facility according to this embodiment of the invention enables service providers to avoid maintaining costly parallel networks; one for switching ATM data cells and one for routing IP data packets. The facility of the invention also enables service providers to provide different classes of service (e.g. coach, business and first class) for both ATM-based and IP-based data flows; thus, providing an additional source of revenue from clients willing to pay for enhanced bandwidth guarantees.

In alternative embodiments, the QoS facility provides call control elements. The call control elements enable the facility to form service contracts with client networks. The service contracts typically specify QoS features, such as bandwidth guarantees, that the communication node agrees to provide to data flows received from or transmitted to a client network. Optionally, the call control elements determine the available bandwidth of the communication node, and accept or deny requested service contracts in response to the available bandwidth.

Another embodiment of the invention provides traffic control elements. The traffic control elements interpret the bandwidth requirements associated with a service contract, and signal control information to devices along the forwarding path of the contracted data flow to reserve adequate bandwidth to provide the data flow with the contracted for QoS features.

A further feature of the invention is that the QoS elements are adapted to interpret the industry standard RSVP protocol. The RSVP protocol is a signaling protocol for an external data destination to request a service contract from the communication node. Typically, the service contract applies to data flows that the external data destination anticipates receiving from an external data source.

A facility according to one embodiment of the invention can be viewed as providing a plurality of logical functions along a data forwarding path. Classification, scheduling and policing are examples of such logical functions. Classification elements of the invention categorize received ATM data cells and IP data packets, based on which, if any, QoS features apply to the received cells and packets. The scheduling elements schedule routing of the IP data packets and switching of the ATM data cells in response to categorization by the classification elements. The policing elements monitor data flows to ensure that data flows received from external sources do not exceed agreed upon service contracts. According to one embodiment of the invention, the policing elements discard data that fails to conform to an agreed upon service contract. According to an alternative embodiment, the policing elements mark the nonconforming data. Data so marked is more likely to be discarded, should the communication node become congested.

According to another embodiment of the invention, the QoS facility employs alternative methods for identifying nonconforming data and for determining which data to discard if the communication node should become congested. By way of example, according to one feature, ATM data cells make up an ATM frame and the policing elements include Partial Packet Discard (PPD) elements for discarding selected additional ATM data cells included in an ATM frame, in response to having to discard one or more nonconforming ATM data cells included in the ATM frame. Typically, the PPD elements discard the ATM data cells of an ATM frame, which are received subsequent to the nonconforming ATM data cell, except for the last cell of the frame. The PPD elements do not discard the last cell of the ATM frame because that cell includes an end of a cell indicator.

An alternative approach to PPD is Early Packet Discard (EPD). According to a further aspect of the invention, the policing elements include EPD elements. According to the EPD protocol, the policing elements also include queuing elements for buffering the forwarding of ATM data cells, and the EPD elements discard entire ATM frames in response to the queuing elements reaching a selected level of fullness. By discarding the entire frame, the QoS facility avoids the overhead associated with transferring useless, partial ATM frames. It should be noted that PPD and EPD can be applied simultaneously by a policing element, and they can also be used at an output port for congestion control.

According to an alternative embodiment of the invention, the QoS facility comprises a plurality of logical input ports, a plurality of logical output ports, a plurality of communication modules, and QoS elements. The logical input ports are adapted for receiving input data flows from external data sources. The logical output ports are adapted for transmitting output data flows to a plurality of external data destinations. The data flows can be ATM-based data flows or IP-based data flows.

In a further aspect, the output ports include Random Early Detect (RED) elements. The RED elements monitor queue elements that buffer IP data packets and ATM data cells. In response to the queues reaching a selected average level of fullness, the RED elements substantially randomly discard IP data packets and ATM data cells. In this way, the QoS facility of the invention avoids the possibility of a data flow using up a disproportionate amount of bandwidth in the communication node.

The communication modules include IP packet routing elements for routing IP data packets from one of the logical input ports to one or more of the logical output ports. The communication modules also include ATM cell switching elements for switching ATM data cells form one of the logical input ports to one or more of the logical output ports.

The QoS elements provide ATM QoS features to ATM data cells, and provide IP QoS features to IP data packets.

The ATM QoS features include one or more of, Constant Bit Rate (CBR), Unspecified Bit Rate (UBR), non-real-time Variable Bit Rate (nrtVBR), real-time Variable Bit Rate (rtVBR) and Available Bit Rate (ABR). The IP QoS features include one or more of, Provisional QoS, Differentiated Services, and Integrated Services. In a further embodiment, at least some of the QoS elements are distributed among the communication modules.

According to a further feature, the QoS facility includes an interconnect. The interconnect is in digital communication with the communication modules and is adapted for forwarding ATM data cells and IP data packets between the communication modules. In one preferred embodiment, the interconnect is in electrical communication with the communication modules, while in other embodiments the interconnect is coupled to the communication modules via fiber optical connections. Optionally, at least some of the QoS elements are included in the interconnect.

The QoS elements can also include a control processor for controlling operation of the QoS elements. In a further aspect, the control processor populates tables that are at least in part representative of the QoS features to be applied to received ATM data cells and received IP data packets. Optionally, the QoS elements include lookup elements that access the tables and schedule routing of IP data packets and switching of ATM data cells through the communication node, based at least in part on the populated tables. In a further embodiment, each of the communication modules include a communication module processor. The communication module processors are in communication with the control processor and assist the control processor in controlling the QoS elements.

According to a further embodiment of the invention, the communication modules include a queuing structure for intermediately storing ATM data cells and IP data packets transferred from the interconnect to the communication modules for output via one or more of the logical output ports. According to another aspect, the communication modules include one or more logical output ports associated with each of the physical output ports. Additionally, the queuing structure further comprises a plurality of output queues associated with each of the physical output ports, wherein each plurality of output queues is adapted for intermediately storing IP data packets and ATM data cells destined for output through an associated physical output port. According to another feature, each of the queues included in a particular plurality of queues has an assigned priority relative to other queues included in the plurality. Data stored in queues having a relatively higher priority is scheduled for output in preference to data stored in relatively lower priority queues. Which, if any, of the ATM and IP QoS features are associated with the data determines in which queue the data is stored. It also determines the output scheduling of the data stored in the queue. According to another feature, congestion control elements are used to monitor the amount of data in the queues and selectively drop or mark IP packets and ATM cells when the queue occupations reach selected thresholds.

In a further feature of the invention, the queuing structure includes a traffic shaping element comprised of a calendar queue. The calendar queue intermediately stores at least selected ATM data cells and IP data packets destined for the output queues. The traffic shaping element schedules the transfer of ATM data cells and IP data packets from the calendar queue to the output queues, based at least in part, on which of the ATM and IP QoS features apply to the ATM data cells and IP data packets stored in the calendar queue.

According to a further practice of the invention, the queuing structure also includes an output stack. The output stack is adapted for intermediately storing ATM data cells and IP data packets that are destined for transfer from one of the output queues.

In an alternative embodiment, the invention comprises a method for providing ATM and IP QoS features in a digital communication node. The method comprises the steps of: receiving ATM data cells and IP data packets into the digital communication node; determining if any ATM QoS features are associated with a received ATM cell, and if so, assigning a priority for forwarding the received ATM data cell through the digital communication node, wherein the priority is representative of the ATM QoS features associated with the cell; determining if any IP QoS features are associated with a received IP data packet, and if so, assigning a priority for forwarding the received IP packet through the digital communication node, wherein the priority is representative of the IP QoS features associated with the packet; scheduling forwarding of received ATM cells and received IP packets through the communication node, based at least in part on the assigned priority; forwarding the received ATM cells and IP packets to an external destination.

In further embodiments, the invention includes additional elements and methods for providing ATM and IP QoS features in a digital communication node.

BRIEF DESCRIPTION OF THE DRAWINGS

The subject matter regarded as the invention is particularly pointed out and distinctly claimed in the concluding portion of the specification. However, the invention, both as to organization and method of practice, together with further objects and advantages thereof, may best be understood by reference to the following illustrative description taken in conjunction with the accompanying drawings in which like numerals refer to like elements.

DESCRIPTION OF THE ILLUSTRATED EMBODIMENT

Figure 1:
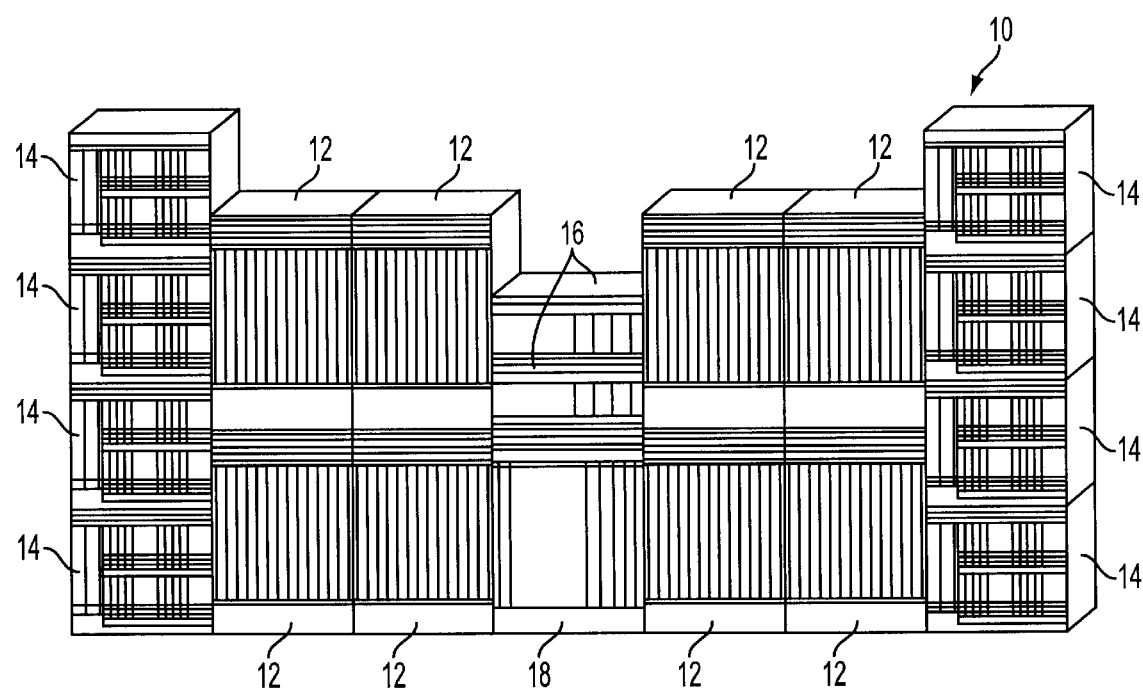
FIG. 1 depicts a modular communication node including QoS features according to an illustrative embodiment of the invention.

The illustrative embodiment of the invention provides a facility for furnishing both Asynchronous Transfer Mode (ATM) and Internet Protocol (IP) Quality of Service (QoS) features in an illustrative digital communication node. In contrast to prior digital communication nodes, which maintain separate parallel networks for performing IP forwarding and ATM switching, the illustrative digital communication node is an integrated device, which performs both IP forwarding and ATM switching. Since a QoS facility according to invention is preferably integrated into such a novel digital communication node, the following description of an illustrative embodiment of the invention also provides a description of an illustrative embodiment of the communication node.

As mentioned above, a digital communication node integrating a QoS facility according to the invention preferably includes both an IP data packet routing facility and an ATM data cell switching facility. In this context, "forwarding" refers to the passing of data between a source port and one or more destination ports in the communication node, such as a switch, a router or a switch/router. "Routing" refers to the accumulation of topology information to provide information to a forwarding table or similar structure by the communication node that is used for directing input data toward a destination. "Switching" refers to the directing of ATM cells or other modularized information through intermediary switching nodes to connect a sender with a receiver in a connection-oriented environment.

The illustrative embodiment eliminates the need for having separate switching and routing networks. A digital communication node employing a QoS facility according to the invention can handle both ATM data cells and IP data packets. The communication node may be employed in IP networks, such as the internet, intranet or extranet, or more traditional switching environments, such as virtual private networks (VPNs), private data networks and SNA (Systems Network Architects) networks. The illustrated communication node supports routing of IP packets over a SONET (Synchronous Optical Network), the routing of IP packets over ATM and pure ATM switching. More generally, the illustrative embodiment eliminates, the separation of Open Systems Interconnection (OSI) layer 2 devices and layer 3 devices so that layer 2 data units and layer 3 data units may be directed toward their destinations by a single communication node through a common QoS facility.

The illustrative digital communication node includes input ports for receiving input data traffic from external sources and output ports for directing the input data traffic towards external destinations. Each input data port is also tied to a communication line, such as a fiber optic line. Similarly, each output port is tied, likewise, to a communication line (e.g. a fiber optic line). The communication node provides an ATM cell forwarding facility and an IP packet forwarding facility for each input port. The ATM cell forwarding facility determines, for each ATM cell received by the input port, which output port to use for outputting the ATM cell. The IP packet forwarding facility determines, for each IP packet received by the input port, which output port to use for outputting the IP packet. Hence, each input port may receive both ATM cells and IP packets and the communication node will properly direct the ATM cells and IP packets.

The illustrative QoS facility is integrated into the ATM cell and IP packet forwarding facilities, along with the control processors that schedule the forwarding of ATM cells and IP packets. The QoS facility provides ATM QoS features such as Constant Bit Rate (CBR), Unspecified Bit Rate (UBR), non-real-time Variable Bit Rate (nrtVBR), real-time Variable Bit Rate (rtVBR) and Available Bit Rate (ABR). The QoS facility also provides IP QoS features, such as Provisional QoS, Differentiated Services, and Integrated Services.

The discussion below summarizes the architecture and operation of a QoS facility according to the invention. As depicted, it is integrated within an illustrative digital communication node for performing both ATM switching and IP forwarding.

FIG. 1 depicts an illustrative digital communication node 10 for providing ATM switching and IP routing, and incorporating a QoS facility according to the invention. The illustrative communication node 10 includes eight switching shelves 12, eight access shelves 14, two control shelves 16, and an extension shelf 18. The switching shelf 12 provides core switching functionality for the node 10. As shown, the node 10, optionally includes multiple switching shelves 12 to increase the bandwidth of the node 10. This modularizing of the switching functionality enables network service providers to choose the switching bandwidth that is appropriate for their needs. Each access shelf 14 includes a pair of linear terminal multiplexers that create a structured OC-48 data stream or individual OC-12/STM4, OC-3/STM1, DS-3 and/or E3 tributaries. Illustratively, the communication node 10 employs eight access shelves 14, thereby providing an access shelf 14 for each corresponding switching shelf 12. Each control shelf 16 contains a redundant pair of control processors. One oversees operation of the communication node 10. The other is a standby processor. As discussed below in more detail, optionally, the control processors of the control shelves 16 include a portion of the QoS facility of the invention. The extension shelf 18 is a 160 Gbps switch for interconnecting the up to eight switching shelves 12. The extension shelf 18 enables data transfer between the switching shelves 12. By way of example, the extension shelf 18 enables an input data stream to be received at an input port of one switching shelf 12 and to be transferred to and output from one or more output ports of one or more other switching shelves 12.

Figure 2:
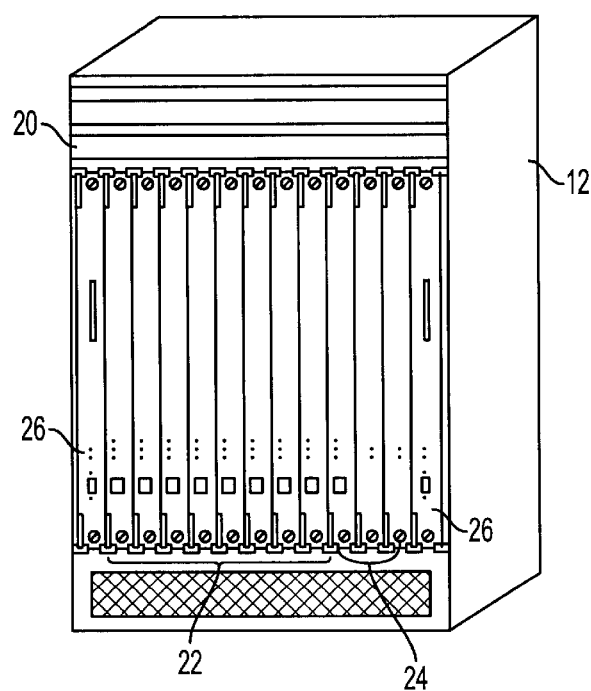
FIG. 2 depicts a switching shelf for use in the illustrative embodiment of the of FIG. 1.

FIG. 2 depicts a switching shelf 12 of the type shown in the communication node 10 of FIG. 1. The switching shelf 12 includes a housing 20 for containing the components of the switching shelf, including eight line cards 22. The eight line cards 22 are printed circuit boards that contain circuitry for receiving and transmitting data. Each line card 22 is designed to receive an OC-48 input data stream, corresponding to 2.488 gigabits per second (Gbps). SONET is a standard that defines a family of fiber optic transmission rates that facilitate the internetworking of transmission products for multiple vendors. The optical transmission rates are known as optical carry (OC) rates. The SONET OC rates are defined in TABLE 1 as follows:

TABLE 1

| OC Level | Line Rates | Capacity |
| --- | --- | --- |
| OC-1 | 51.84 Mbps | 28 DS1s or 1 DS3 |
| OC-3 | 155.52 Mbps | 84 DS1s or 3 DS3s |
| OC-9 | 466.56 Mbps | 252 DS1s or 9 DS3s |
| OC-12 | 622.08 Mbps | 336 DS1s or 12 DS3s |
| OC-18 | 933.12 Mbps | 504 DS1s or 18 DS3s |
| OC-24 | 1.244 Gbps | 672 DS1s or 24 DS3s |
| OC-36 | 1.866 Gbps | 1008 DS1s or 36 DS3s |
| OC-48 | 2.488 Gbps | 1344 DS1s or 48 DS3s |
| OC-96 | 4.976 Gbps | 2688 DS1s or 96 DS3s |
| OC-192 | 9.953 Gbps | 5376 DS1s or 192 DS3s |

As can be seen, OC-48 is one of the specified line rates. In the capacity column of TABLE 1, references are made to DS-1 and DS-3 rates. These are respective line rates in the DS hierarchy of digital signal speeds that is used to classify capacities of lines or trunks. The fundamental speed level in the DS hierarchy is DS-0, which corresponds to 64 kilobits per second. DS-1 corresponds to 1.54 megabits per second, and DS-3 corresponds to 44.736 mbps.

The switching shelf 12 also contains interconnect module cards 24, which occupy 3 slots. The interconnect module cards 24 are printed circuit boards that provide switching and routing capacity to facilitate communication between the line cards. The interconnect module cards 24 form the core of the "interconnect," which will be described in more detail below. Switch processor modules 26 occupy the remaining two slots in the switching shelf 10. These processor modules 26 manage board level status information for the switching shelf 12.

The depicted communication node 10 provides a channelization SONET/SDH mode of operation, such that each OC-48 line card 22 can be configured for DS-3, OC-3 and OC-12 tributary configuration.

Figure 3:
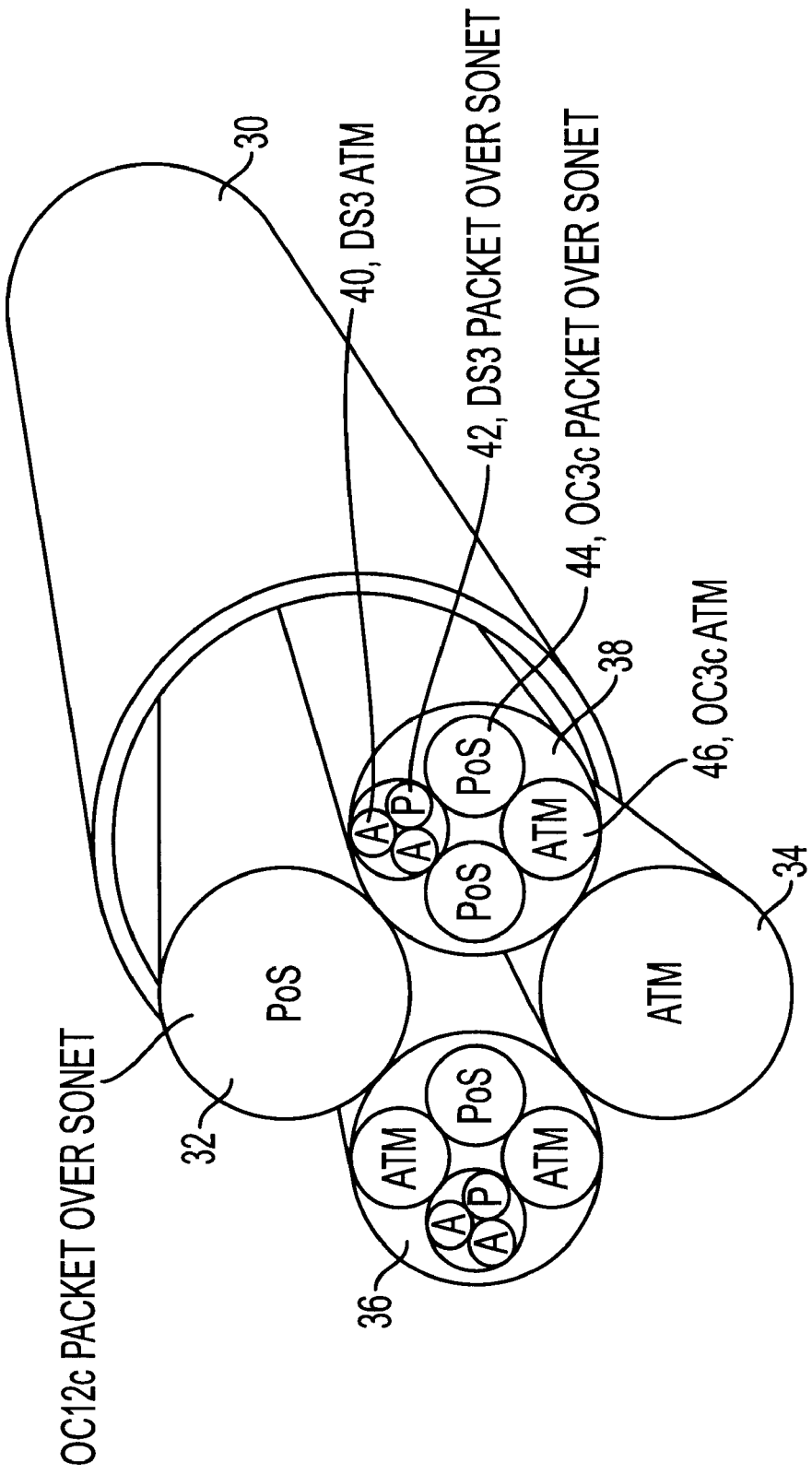
FIG. 3 depicts a channelized SONET scheme used in the illustrative embodiment.

FIG. 3 shows an example of such channelization. A single OC-48 input stream 30 has tributaries that include an OC-12C packet over SONET tributary 32 and an OC-12 ATM tributary 34. The tributary 38 divides into four OC-3 tributaries, including an OC-3C packet over SONET tributary 44 and an OC-3 ATM tributary 46. The tributary 47 divides into three DS-3 tributaries, including an ATM tributary 40 and a packet over SONET tributary 42. Each of the line cards 22 demultiplexes the OC-48 input stream into the specified tributaries and then operates on the tributaries (i.e. "channels") separately. The configuration of the tributaries is software controlled and may be dynamically altered.

Figure 4:
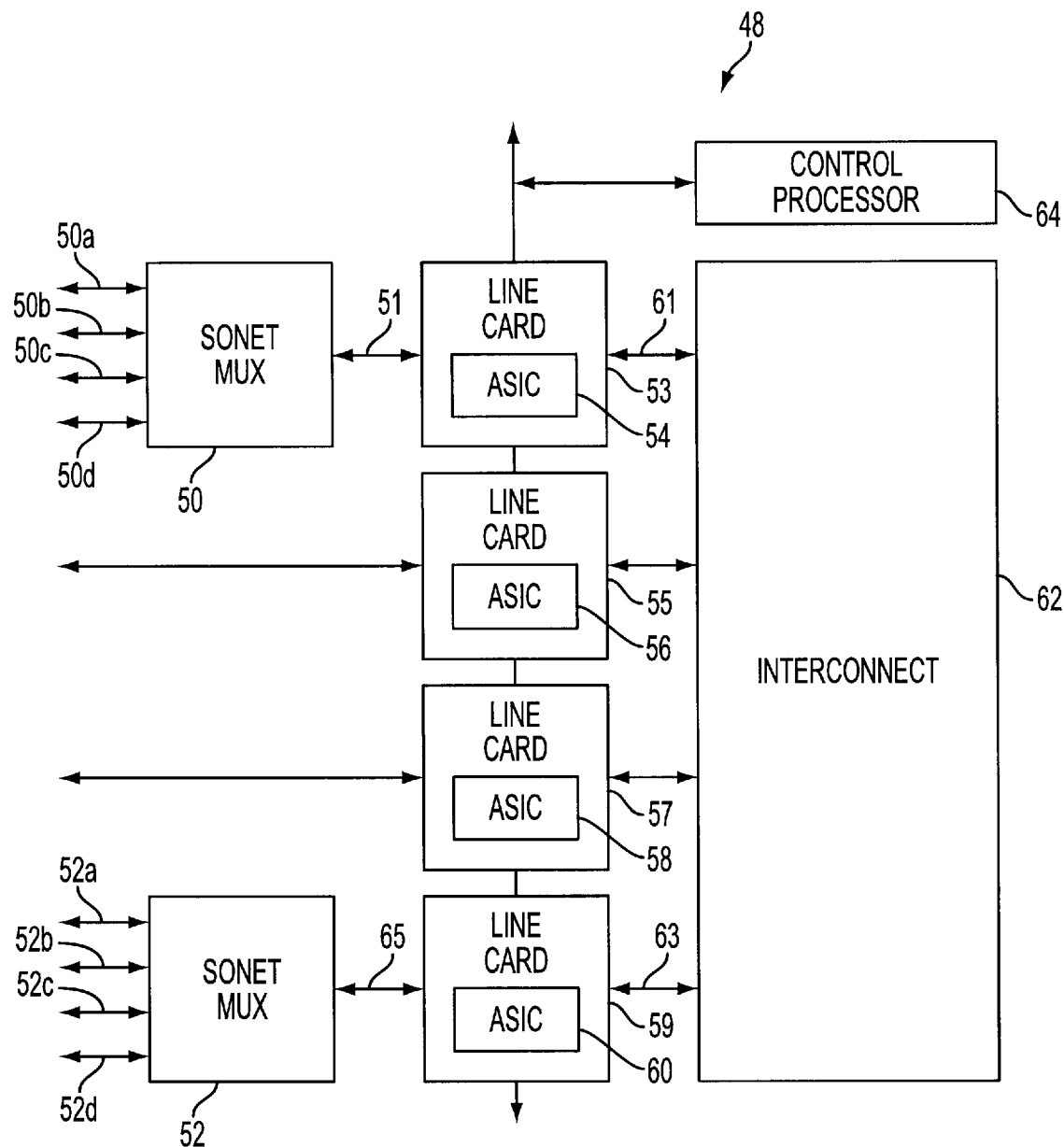
FIG. 4 is a logical block diagram of a portion of the switching shelf of FIG. 2.

FIG. 4 depicts a portion of the switching shelf 12, along with multiplexers 50 and 52, which are located in the access shelf 14. For illustrative purposes, FIG. 4 only depicts four of the eight potential line cards 22 that can be included in a switching shelf 12. The block diagram 48 of FIG. 4 shows illustrative line cards 53, 55, 57 and 59, an interconnect 62, the SONET multiplexers 50 and 52, and a control processor 64. In operation, data enters a SONET multiplexer 50 by way of lines 52a–52d. The multiplexer 52 passes a single physical OC-48 data stream to the line card 59 by way of line 65. The line card 59 forwards information stripped from the OC-48 data stream to the interconnect 62, by way of line 63. The interconnect 62 processes the received information and forwards it to a destination line card, by way of example, line card 53, along line 61. The destination line card 53, in turn, transfers the received information by way of the OC-48 interface 51 to the SONET multiplexer 50. The multiplexer 50 forwards the received information to an external source by way of lines 50a–50d. Information transfers involving line cards 55 and 57 occur in much the same fashion.

Figure 5:
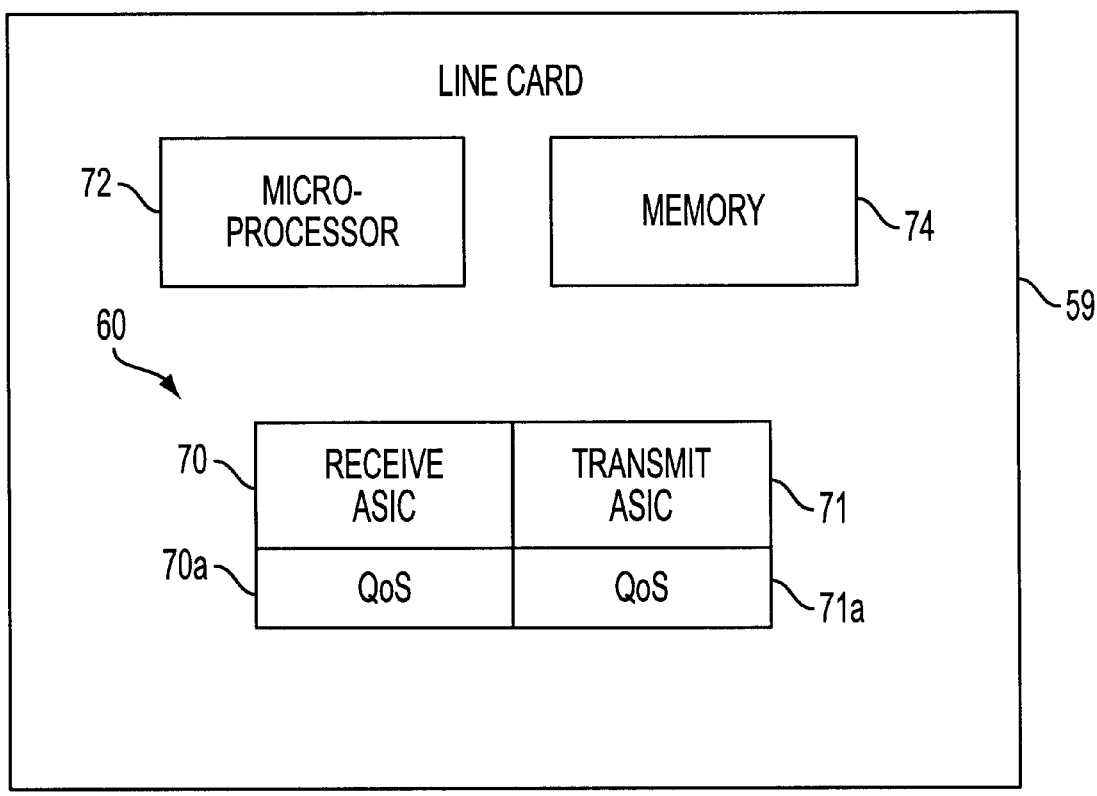
FIG. 5 is a logical block diagram of a line card of the type depicted in the switching shelf of FIGS. 2 and 4.

FIG. 5 is a more detailed logical block diagram of an illustrative line card 59. Each of the other line cards 53, 55, and 57 has a similar layout. The line card 59 includes a Line Card Processor (LCP) 72 and a memory 74. The memory 74 may take many different forms, including a random access memory (RAM) or a read only memory (ROM). The line card 59 also includes application specific integrated circuits (ASICs) 60, including a receive ASIC 70 and a transmit ASIC 71. The receive ASIC 70 is responsible for receiving incoming data and processing the data so that the data is ready to be transferred over the interconnect 62. The transmit ASIC 71 receives data from the interconnect 62 and forwards data out over an output port to the output line 65. The receive ASIC 70 includes a logical QoS portion 70a. The QoS portion 70a provides classification and policing functions. The transmit ASIC 71 includes a logical QoS portion 71a. The QoS portion 71a provides output data scheduling and shaping. These QoS functions are discussed in further detail below.

As those skilled in the art will appreciate, the depiction of the ASIC 60 is considered to be merely illustrative. In other embodiments, the receive ASIC 70 and the transmit ASIC 71 may be implemented as a single ASIC. Alternatively, the ASICS 71 and 70 may be implemented as more than two ASICS. Further, the ASICs 71 and 70 may be implemented in alternative circuitry, such as field programmable gate arrays (FPGAs), or in software.

As mentioned above, each of the line cards 53, 55 and 57 has a similar architecture to that depicted in FIG. 5. Hence, the line card 53 includes ASIC 54, line card 55 includes ASIC 56 and line card 57 includes ASIC 58.

Those skilled in the art will also appreciate that the depiction of the line card 59, shown in FIG. 5 is also considered to be merely illustrative and not limiting of the present invention. Other line card configurations may be used to practice of the present invention. Moreover, the functionality provided by the line card 59 need not be implemented on a line card, per se, but rather may be implemented in a different fashion or by a different hardware configuration. Additionally, the receive ASIC 70 and the transmit ASIC 71 need not be implemented as separate ASICs, but instead implemented as a single ASIC. Still further, the functionality of the ASICs 54, 56, 58 and 60 may be implemented in software rather than in hardware. Also, the QoS portions 70*a* and 71*a* may be distributed throughout the ASIC 60, or even throughout the line card 59.

Optionally, the line cards 53 have SONET multiplexers, such as multiplexers 50 and 52, positioned at the line card input ports to multiplex the incoming tributary data streams into OC-48 data streams. In the example depicted in FIG. 4, the SONET multiplexer 50 multiplexes four OC-12 data streams 50*a*–50*d* into an OC-48 data stream. The control processor 64 controls operation of the line cards and 53, 55, 57 and 59, along with the interconnect 62.

An example is helpful to illustrate data flow through the components depicted in FIG. 4. Suppose that four OC-12 data streams are multiplexed into a single OC-48 input data stream at the input port for line card 59. The receive ASIC 70 on line card 59 determines where to direct ATM cells and/or IP packets in the input data stream. The QoS portion 70*a* classifies the input data stream based on any ATM or IP QoS features that apply to the input data stream. The QoS input portion 70*a* also prioritizes the transfer of the input data stream across the interconnect 62, based on the prior classification. The interconnect 62 forwards the data stream to a destination line card, such as line card 53. The transmit ASIC 71 on the line card 53 packages the data (i.e. encapsulates) in a format that is appropriate for the destination. The QoS output portion 71*a* schedules and shapes the output of the packaged data, based on classification information provided by the QoS input portion 70*a*. The QoS output portion 71*a* may also drop or mark the packaged data, based on the congestion status at the output ports. The data is then sent out over the output ports. Optionally, a demultiplexer 50 of an access shelf 12 demultiplexes the output data from multiple tributaries into a single OC-48 output data stream.

Figure 6:
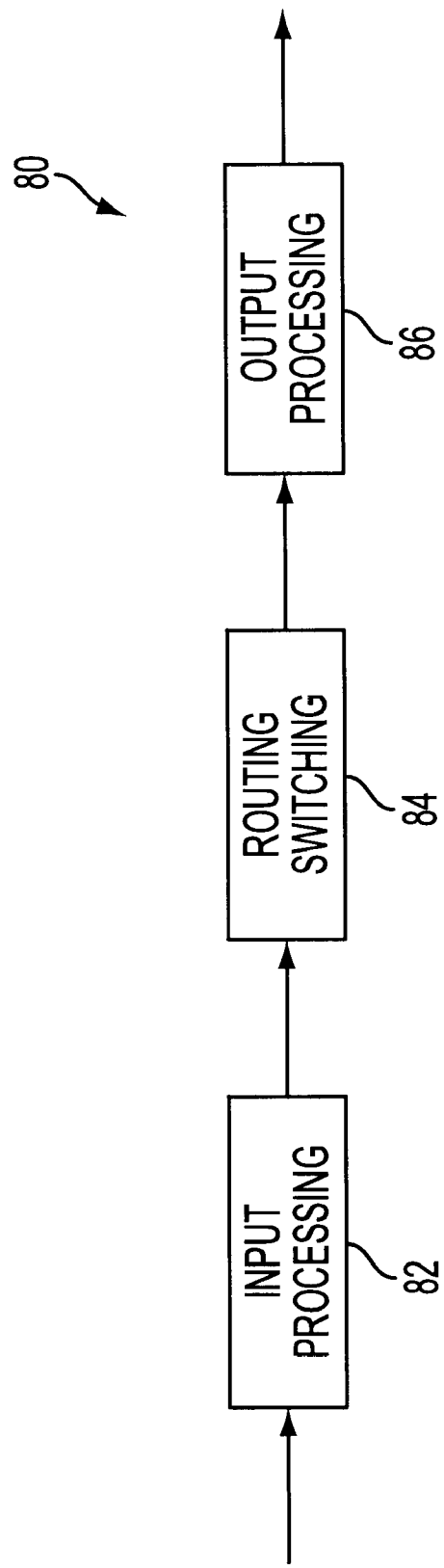
FIG. 6 is a simplified block diagram illustrating operation of the modular communication node of FIG. 1.

FIG. 6 is a functional block diagram 80 depicting three primary stages through which data transits in the digital communication node 10 of FIG. 1. More particularly, node 10 performs input processing 82, followed by ATM switching and IP routing 84, followed by output processing 86. As described in more detail below, the input processing stage 82 decapsulates and segments the incoming data and also locates the ATM cells and IP packets within the incoming data stream. The input processing stage 82 also classifies and polices the incoming data with regards to any associated QoS features, determines a destination handle (DH) and places the data in a suitable format for forwarding over the interconnect 62. The input processing stage 82 employs IP routing and ATM switching lookups to identify QoS features and a destination address. The routing/switching stage 84 forwards the input toward the appropriate output line cards. As is discussed in further detail below, the data is forwarded to the line cards, in an internally used canonical form, over the interconnect 62. The output processing stage 86 encapsulates the data received over the interconnect and directs the data out the appropriate output ports so that the data reaches the intended destinations. The output processing stage 86 also shapes and schedules the output of the data to meet any IP or ATM QoS features associated with the data. In case of congestion, the output processing stage 86 also drops or marks IP data packets and ATM data cells.

Figure 7:
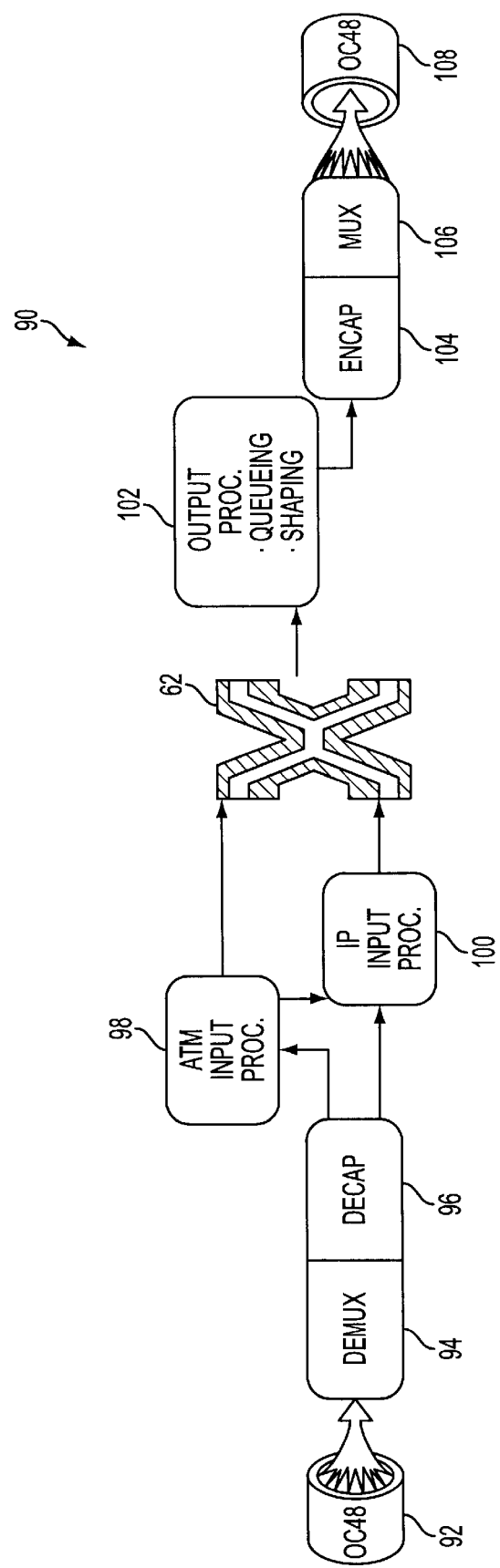
FIG. 7 is a logical flow diagram illustrating steps performed on communication traffic by the modular communication node of FIG. 1.

FIG. 7 is a functional flow diagram 90 illustrative of data processing in the communication node 10 of FIG. 1. Data enters an input line card, for example line card 59, by way of an OC-48 interface 92. A demultiplexer 94 demultiplexes the OC-48 input data stream 92 into separate tributaries (also known as "channels"). The decapsulation elements 96 decapsulate the data within each of the channels to remove the data from the SONET frames and the OSI layer 2 frames. The ATM input processing elements 98 process ATM data cells in the input data flow. Similarly, the IP input processing elements 100 process the IP data packets in the input data flow. According to the illustrative embodiment, the same physical elements (e.g., the receive ASIC 70 on the line card 59) process both the ATM data cells and IP data packets in the input data flow. Additionally, the input processing elements 98 and 100 also classify the IP data packets and the ATM data cells in the input data flows, according to any detected ATM and IP QoS features associated with the packet or cell. The input processing elements 98 and 100 also police the input data stream to detect nonconforming ATM data cells and IP data packets, which exceed agreed upon service contracts. The input processing elements can mark or drop the policed cells. As discussed in further detail below, the communication node 10 employs a variety of methods for determining which, if any, policed cells and packets to discard.

Subsequent to input processing, the data passes through the interconnect 62 to an output line card, for example line card 53. The output line card includes the output processing elements 102. Based on the QoS classification of the data, the output processing elements 102 perform traffic scheduling, shaping and congestion control. Scheduling generally refers to selecting cells and packets among those eligible for transmission to send at any give time, based on transmission priorities of the data and the amount of data that has been sent for each flow, where shaping more typically refers to determining which data packets and cells are eligible for transmission at any given time so that outgoing data of each flow conforms to the service contract for the data flow. According to the illustrated embodiment, a transmit ASIC 71, having QoS elements 71*a* performs the output processing of both ATM data cells and IP data packets. The communication node 10 also includes encapsulation elements for encapsulating the data over a plurality of output channels. The communication node 10 further includes an OC-48 output multiplexer for multiplexing the plurality of output channels from the encapsulation elements 104 to produce a single OC-48 output data stream 108. According to the illustrated embodiment, the encapsulation elements 104 and the multiplexer elements 106 are included in the output ASIC 71.

Figure 8:
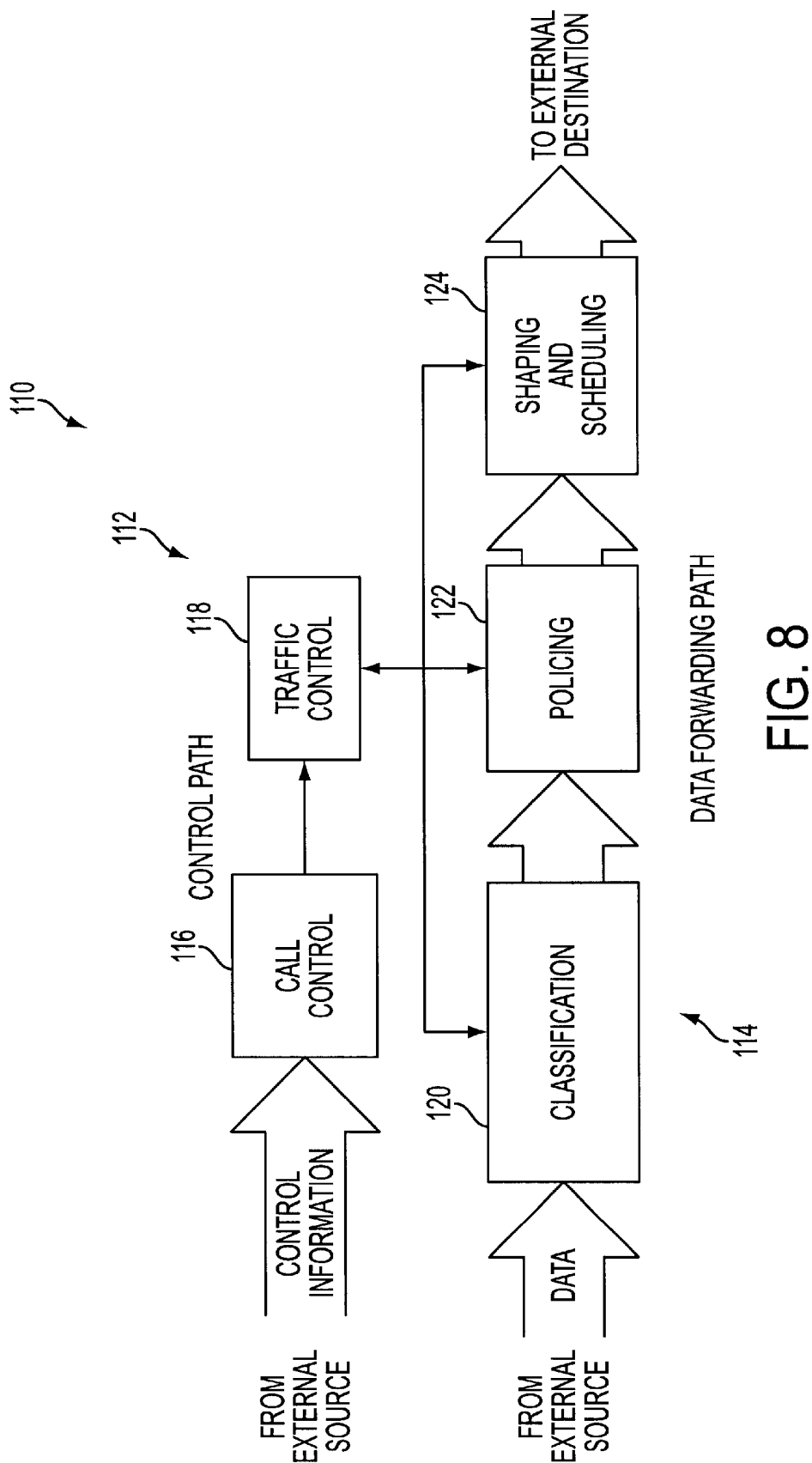
FIG. 8 is a block diagram depicting the logical components of a QoS facility according to an illustrative embodiment of the invention.

FIG. 8 provides a conceptual block diagram depicting the logical components of a QoS facility 110, according to an illustrative embodiment of the invention. The components of the QoS facility 110 logically divide along a control path 112 and a data forwarding path 114. The logical components of the control path 112 include a call control component 116, and a traffic control component 118. The logical components of the data forwarding path 114 include a data classification component 120, a policing component 122 and scheduling, shaping, and congestion control component 124. As discussed in more detail below, the illustrative QoS facility 110 is physically implemented in the switching shelves 12, and partially controlled by a control processor (CP), which resides in the control shelves 16.

The call control component 116 provides a mechanism by which the communication node 10 of FIG. 1 accepts or rejects requests for various levels of QoS from external sources or from external destinations attempting to reserve bandwidth for data flows that the external destinations expect to receive. According to the illustrative embodiment, the call control component 116 employs ATM UNI 4.0 and RSVP to enable external networks to reserve bandwidth. The call control component 116 interacts with the traffic control component 118 to configure the data forwarding path 114 to provide an agreed upon QoS. Agreements between the communication node 10 and external networks for particular QoS features are referred to hereinafter as service contracts. The call control component 116 also determines the available bandwidth of the communication node 10, and rejects or accepts a request for a service contract, based on whether sufficient bandwidth exists to fulfill the QoS requirements of the service contract.

The traffic control component 118 is the logical mechanism that configures the appropriate state in the components of the data forwarding path 114. The traffic control component 118 provides configuration parameters to the classification 120, policing 122 and scheduling, shaping and congestion control component 124. Additionally, the traffic control component 118 interprets parameters from the call control components 116 used to configure the service contract, and translates those parameters into a format required by the logical components along data forwarding path 114.

The classification component 120 is the logical mechanism in the data forwarding path 114 that processes the IP data packets and the ATM data cells in the input data flow, and determines which packets and cells in the input data flow require a particular QoS. In response to determining that a cell or packet requires a particular QoS, the classification component 120 classifies the cell or packet based on the required QoS. To achieve bandwidth enhancements, the illustrative communication node examines input data one time. Accordingly, lookup engines provide the QoS classification for the input data. For ATM, this is implicit in the Virtual Path Indicator/Virtual Channel Indicator (VPI/VCI) for the VC. For IP, the classification component 120 utilizes a combination of one or more of the destination address, the source address, the IP protocol number, and the source and destination port. The result of the lookup is the Destination Handle (DH), which specifies the destination descriptor. The destination descriptor is unique to each data flow. The DH specifies, among other parameters, the output port and output queue (discussed below with respect to FIGS. 33–34). The DH also specifies whether the data conforms to the service contract of its source.

The scheduling, shaping and congestion control component 124 is the mechanism that sorts out cells and packets from multiple data flows and ensures that data flows requiring particular QoS features have their associated packets or cells outputted from the communication node 10 in accordance to the agreed upon service contract.

The policing component 122 is the logical mechanism in the data forwarding path 114 that detects if a data flow exceeds the parameters of an agreed upon service contract. It accomplishes this by determining if a particular packet or cell is within an agreed upon service contract for the source of the particular packet or cell. The illustrative QoS facility 110 performs policing using a "leaky bucket" algorithm. The leaky bucket algorithm sets up a leaky bucket queue to drain at a specific rate, with the depth of the bucket matching the maximum burst size for the particular flow. If the flow "overflows" the bucket, the QoS facility 110 detects the overflowing packets or cells as being nonconforming and polices them. Depending on the service contract, the policing component 122 either marks or discards any nonconforming cells or packets. According to the illustrated embodiment, policing occurs in three places; the ATM lookup, the IP lookup, and the queue manager 620 of FIG. 33. Policing is discussed in further detail below.

Figure 21:
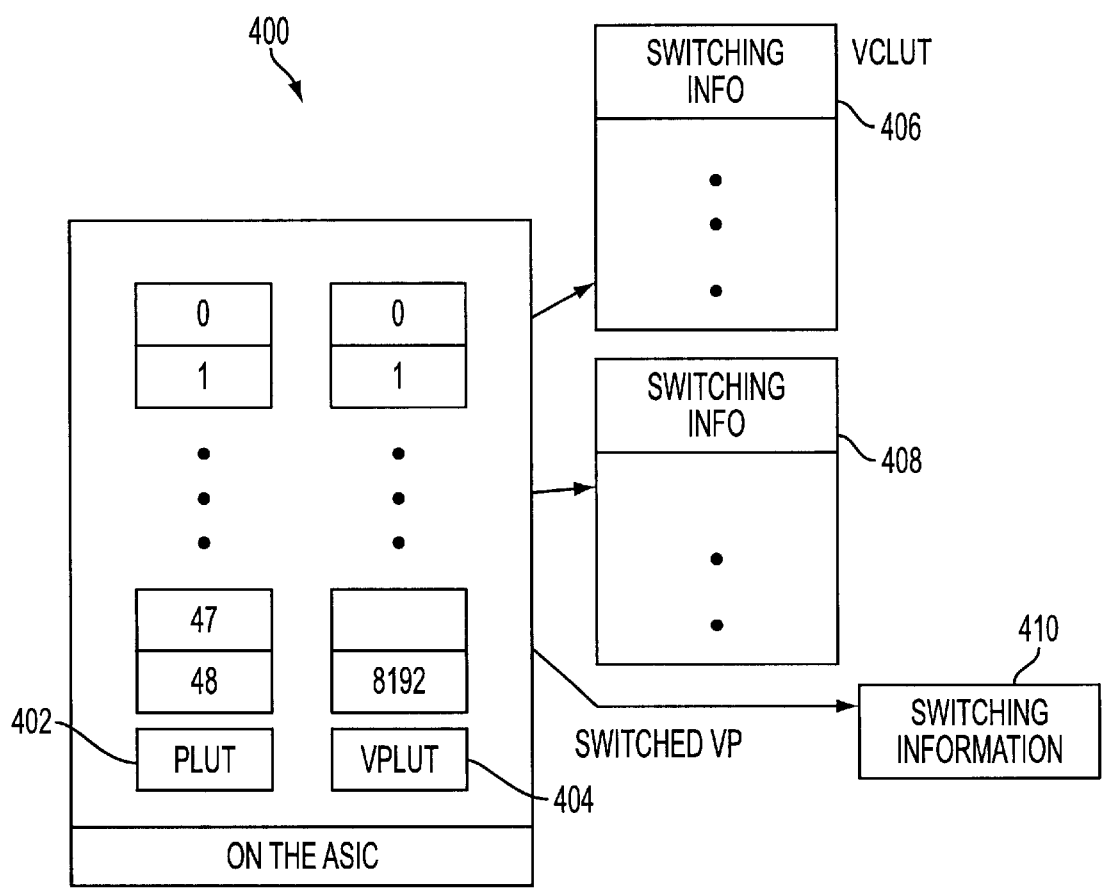
FIG. 21 is a logical diagram illustrating ATM lookup performed by the receive ASIC of FIG. 13.

The ATM lookup of FIG. 21 performs a standard ATM Usage Parameter Control (UPC) algorithm with two leaky buckets for the peak and sustained cell rates (PCR and SCR). The QoS facility 110 marks nonconforming cells using the Cell Loss Priority (CLP) bit and polices the cells based on the properties of the VC. According to one preferred embodiment, the QoS facility 110 does not discard cells unless the output queues of the communication node 10 become congested. In this case, the CLP bit provides an indication of which cells are preferable to discard. The output queue manager, discussed in more detail below and with regard to FIG. 33, can drop cells with the CLP bit set if the output queues become congested.

Figure 26:
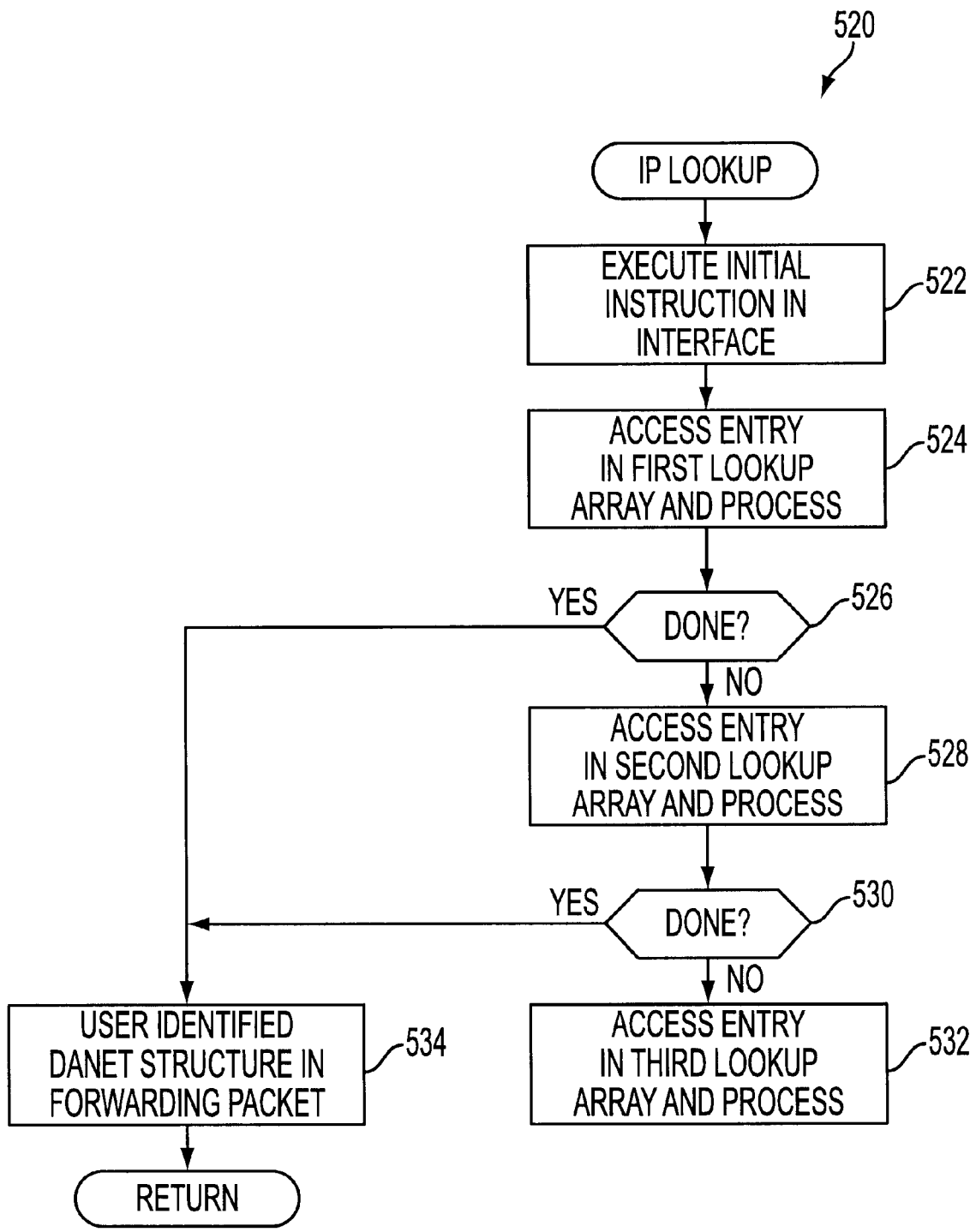
FIG. 26 is a flowchart illustrating steps performed by the receive ASIC of FIG. 13 during IP lookup.

The IP lookup of FIG. 26 determines whether IP input data packets are within a differentiated services of integrated services profile. The IP lookup sets bits in the DH to indicate whether an IP data packet is "in" or "out" of profile. According to the illustrative embodiment, the IP lookup, optionally, discards nonconforming packets. The queue manager 620 of FIG. 33 uses the results of the IP lookup. In the event that the output queues become congested, the queue manager is more likely to discard packets marked as being "out" of profile.

Figure 31A:
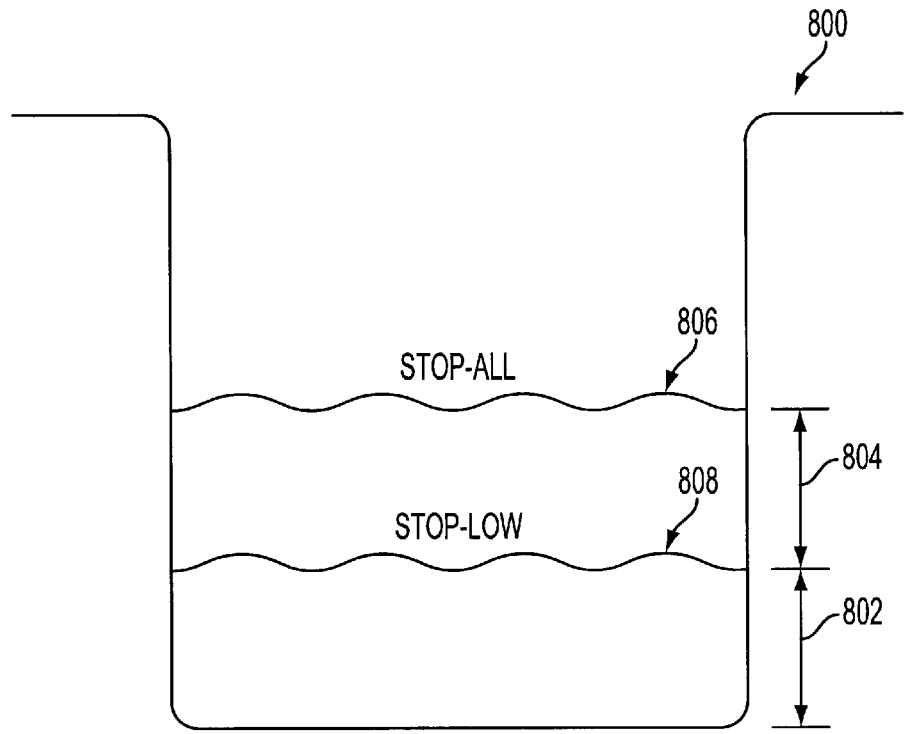
FIGS. 31A and 31B depict interconnect priority queues.

The queue manager 620 of FIG. 31 also performs policing for traffic that is shaped. The queue manager may discard IP data packets and ATM data cells that are scheduled too far away in the future from the current time.

ATM Adaption Layer 5 (AAL5) provides the mechanism for taking an ATM frame and segmenting it into a series of ATM cells. The ATM cells are reassembled at the ATM cell destination. According to the illustrative embodiment, if some of the cells that make up an AAL5 frame exceed a traffic contract and require discarding, the QoS facility 110 avoids sending at least a portion of the frame containing the policed cell. The illustrative QoS facility 110 employs two independent methods for avoiding sending the portion of the policed cell. One method is Partial Packet Discard (PPD). The other is Early Packet Discard (EPD).

According to PPD, if the policing occurs in the middle of an AAL5 frame, then the QoS facility 110 drops all but the last cell of the remaining cells in the frame. The QoS facility 110 allows the last cell to remain because it contains an end of frame indicator. When the checksum for the frame fails, the destination discards the frame. In this way the QoS facility 110 reduces the number of cells that pass through the communication node 10 during periods of congestion.

According to EPD, if the traffic over the interconnect 62 of FIG. 4 is congested, which can be detected when the to-interconnect queue size exceeds some predetermined threshold, the QoS facility 110 discards any newly arrived nonconforming AAL5 frames, until the queue size drops below the threshold. This preserves AAL5 frames as much as possible, without allowing partial frames to propagate through the communication node 10.

According to another feature of the invention, PPD and EPD are also used by the illustrative QoS facility 102 to control traffic congestion at the output ports. In addition, QoS facility 102 may also use Random Early Detect (RED) to randomly discard data when the average lengths of the output queues exceed certain thresholds.

According to a further feature of the invention, the illustrative QoS facility 110 determines the source address of data sources that habitually send nonconforming data streams, and penalize those sources. One method employed by the QoS facility 110 for penalizing offending sources to assign those sources a lower priority for a period of time. Another method is to mark data from offending sources as non-conforming so that they will be more likely to be discarded in case of congestion.

A QoS facility 110, according to the illustrative embodiment of the invention, supports ATM QoS service categories defined by the ATM Forum. The ATM Forum has defined five service categories for ATM. As previously mentioned, these service categories include CBR, rtVBR, nrtVBR, UBR and ABR. When the communication node 10 sets up a VC, it specifies one of these service categories. With each service category comes and associated set of QoS parameters that are specific to the category. Below is a brief description of each of the ATM service categories.

CBR is characterized by a peak cell rate that is continuously available during the connection lifetime. CBR requires that delay variations be kept to a requested value if traffic over the connection does not exceed the peak rate. Cells delayed beyond a maximum specified value are useless to the application. rtVBR is characterized by peak and sustained cell rates along with a maximum burst size. A user may send traffic over the connection at the peak cell rate of an amount not exceeding the maximum burst size, and the average traffic rate must not exceed the sustained cell rate. Delay variations are expected to be kept to a requested value. Delays beyond a specified maximum Cell Transfer Delay (maxCTD) are useless to the application. nrtVBR is characterized by the same peak, sustained and burst size parameters as the rtVBR category. However, cell delay variations are not a significant factor. UBR is a best effort service that is characterized only by an optional peak cell rate. No delay or bandwidth guarantees are made. ABR is a service that provides feedback regarding network congestion to allow sources to adjust their transmission rates to reduce cell loss.

The QoS facility 110 also supports three different types of IP QoS. Those are Configured/Provisioned QoS, Differential Services, and Integrated Services/RSVP. Though, these are well known in the art, a brief description of each is provided below.

Configured/Provisioned QoS is a scheme whereby the administrator configures an IP router to statically provide a QoS to certain traffic classes passing through the router. According to one embodiment, the QoS facility 110 accomplishes this by prioritizing packets to a particular TCP port (i.e. DLSW or Telnet) over other traffic. According to a further embodiment, the QoS facility 110 allocates the bandwidth of traffic from or to a particular set of customers, addresses, or autonomous systems based on a time schedule. The QoS facility 110 configures the classifier 120, the policing module 122 and the scheduler 124, according to which embodiment is employed.

Differentiated Services is concerned with providing service differentiation for "best effort" services through simple, scalable mechanisms. The QoS facility 110 applies this approach to adaptive applications that require a low, but not necessarily bounded, delay. Differential Services allows the service provider to offer a service contract that guarantees a minimum bandwidth or rate through the communication node 10, but allows the customer to use more bandwidth when the node 10 is not congested. The QoS facility 110 implements Differential Services by modifying the ToS/Precedence bits in the Ipv4 header. These bits are used to indicate whether the customer's packets are to receive a particular QoS, and whether the traffic is "in" or "out" of the profile for the customer. If the traffic is "out" of profile, the QoS facility 110 has the option to discard the traffic if congestion is encountered. The goal is to avoid discarding packets that are "in" profile, while allowing traffic that is "out" of profile if resources are available.

Differential Services allows service providers to design service profiles that meet the customers bandwidth and delay needs, without installing complicated protocol mechanisms to implement them. The edge routers test the packets based on the customer profile while the core routers only test whether a given packet is "in" or "out" of profile. By providing service profiles, the service providers can make competitive packages that allow customers to pay for better service if they require it.

The Integrated Services architecture, as outlined in RFC 1633, provides a range of services, better than traditional "best effort" services, to applications. One notable application for Integrate Services architecture is for real-time applications using audio and video. These applications require an end-to-end QoS for one or more application data flows, thus requiring a protocol to signal to the communication node 10 regarding the needs of the application, including what resources are needed and how to identify the application data flows. The protocol that signals this information is the ReSerVation Protocol (RSVP). Integrated Services combines RSVP with the Integrated Services (IntServ) Models for the Controlled Load and Guaranteed Services to create end-to-end per flow QoS. Another piece of the IP QoS deals with the mapping of the IntServ models to specific media (ISSLL).

RSVP enables an end system to request that the communication node 10 provide special treatment for a flow or set of flows. It provides a filter specification indicating what packets should receive the QoS that is used by the classifier 120, as well as the input data flow specification. The input data flow specification indicates what QoS level the classified packets should receive. The flow specification is used by the traffic control module 118 to program the policing 122 and scheduling modules 124. RSVP operates in a "receiver-based" mode where the data receivers are the ones that actually make the reservation through the network. This allows RSVP to scale to large multicast distributions, with reservation merging at split points in the multicast distribution tree.

Another aspect of IP QoS is the INTSERV models developed by the INTSERV working group. There are two models currently standardized. These are Controlled Load Service and Guaranteed Service. These models provide the parameters for the RSVP flow specification and specify the behavior of the policing 122 and scheduling 124 modules.

According to Controlled Load Service, the QoS facility 110 provides a service level that corresponds to an unloaded network. Delay bounds are not explicitly stated but are expected to be consistently lower than "best effort" traffic with low variation. Applications using this service are expected to be adaptive to variations in delay.

According to Guaranteed Service, the communication node 10 provides a service level that corresponds to a fluid model, wherein the communication node 10 behaves as a pipe sized precisely to the needs of the application, and the delays are bounded. The communication node 10 advertises its transit delay in RSVP PATH messages so a receiver can determine if the node 10 has the available bandwidth to support the bounds required. The communication node 10 can support a wide variety of multimedia applications using these two service models.

As mentioned above, the third piece of IP QoS is directed toward the mapping of the IntServ models to specific media. The Integrated Services over Specific Link Layers (ISSLL) working group is responsible for this part of the puzzle. Because IP is a layer 3 protocol and relies on a variety of layer 2 media, a mapping is required between the layer 3, IntServ models, and the native QoS abilities of the layer 2 media. For some media, this means that real QoS is not really possible without some compromises. The illustrative communication node 10 employs standard mapping of the IntServ models to ATM, Frame Relay and Gigabit Ethernet.

Figure 9:
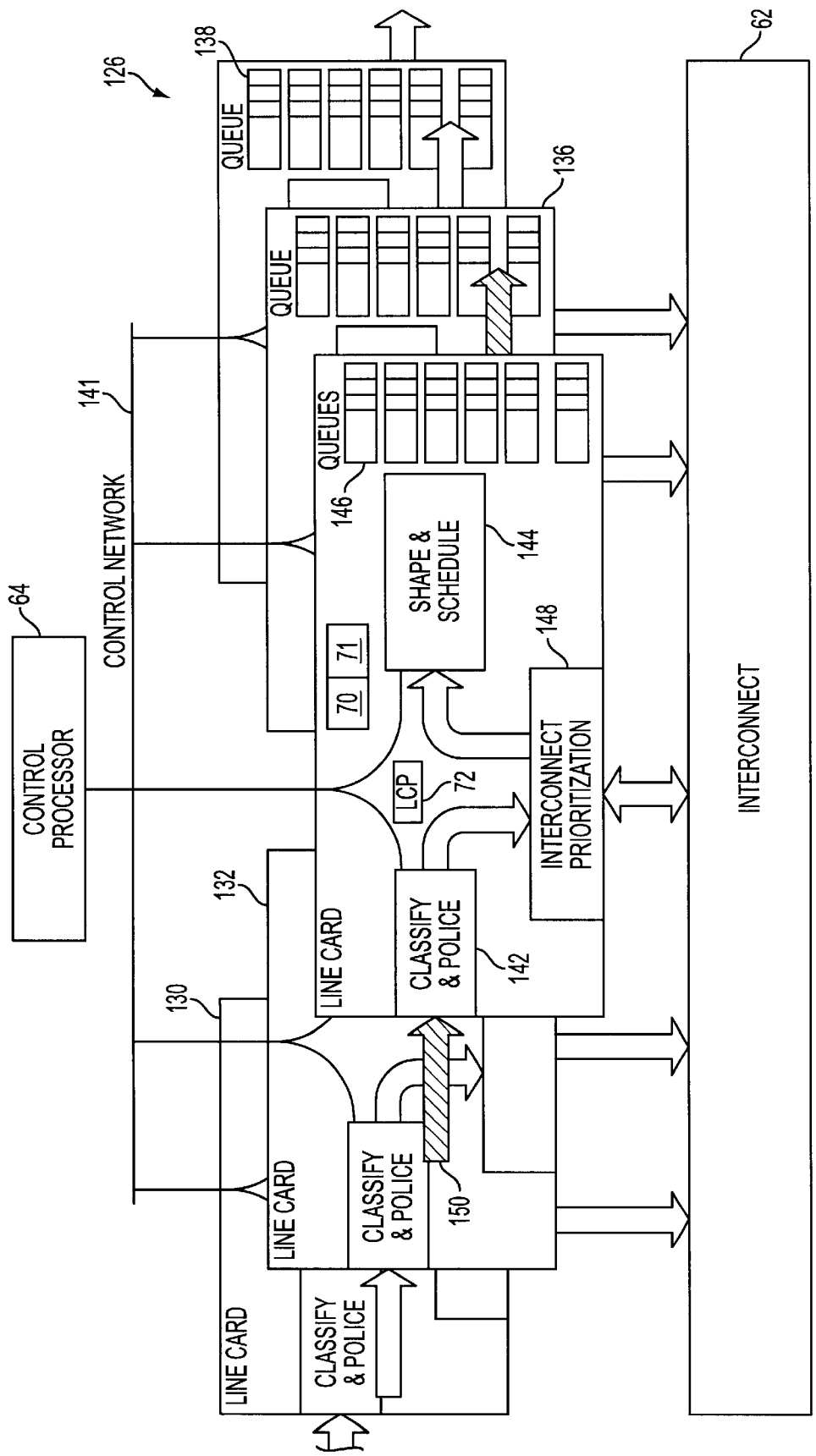
FIG. 9 is a functional block diagram of a portion of the switching shelf of FIG. 2 and illustrates elements of a QoS facility according to one embodiment of the invention.

FIG. 9 is a schematic block diagram of a portion 126 of the switching shelf 12 of FIG. 2. FIG. 9 illustrates some of the logical components of the of the QoS facility 110 of FIG. 8. The depicted portion 126 includes five line card modules 130–138 and interconnect 62. A control processor 64 is also depicted. A control network 141 electrically connects the line cards 130–138. Each line card 130–138 includes classification and policing elements 142, shaping, scheduling and congestion control elements 144, a queuing structure 146, prioritization elements 148, a line card processor (LCP) 72, a receive ASIC 70 and a transmit ASIC 71.

The line cards receive data via input ports 150, classify and police 142 the data and send it to the interconnect 62. The prioritization elements 148 prioritize the data over the Interconnect to ensure that time critical data is delivered on time. The shaping, scheduling and congestion control elements 144 shape, schedule, and flow control data coming from the interconnect 62 according to the QoS of the data flow and congestion status, and places the data in an appropriate priority output queue 146 for transmission. As discussed in more detail with respect to FIG. 33, the CP 128 controls the classification, policing, shaping, scheduling and congestion control of the data flows by populating tables with the appropriate information for the transmit ASIC 71 to make decisions. This population occurs through LCP 72.

In a time saving feature and as discussed below with respect to FIG. 13, the receive ASIC 70 performs classification of incoming data in conjunction with the routing lookups. For ATM and Frame Relay data, this is simply a matter of looking up the incoming VPI/VCI and DLCI, respectively. For IP data, the lookup can include matching the source address, IP protocol type, and TCP or UDP port numbers, as well as the destination address. By performing this kind of long lookup at the input, the illustrative QoS facility 110 saves the time required to look up the same information on the output.

The result of the routing lookup is a DH. The DH provides a mechanism for looking up further parameters for QoS, if necessary. For simple data flows, the DH specifies the output port and the output queue for the data, allowing the scheduling mechanism 144 to direct the data to the proper output queue 146.

The receive ASIC forwards traffic to the interconnect 62 into three queues. The receive ASIC 70 determines in which queue to place the data, based on the destination queue identified in the DH. This allows high priority data, such as ATM CBR traffic to be prioritized over lower priority traffic as it enters the interconnect. While this prioritization is at a coarser granularity than the output queuing, the higher speed of the interconnect 62 prevents this from causing any problems meeting QoS guarantees.

A back pressure mechanism prevents low priority traffic from swamping a line card 130–138 by allowing a line card 130–138 to request, through the interconnect 62, that another line card 130–138 "back off" on data transmission of data having a particular priority. This mechanism prevents a line card having an abundance of effort traffic from swamping an output line card having data flows that require a higher level of QoS. The interconnect 62 may also generate back pressure signals to avoid congestion within the interconnect.

The operation of the classification and policing elements 142, the shaping, scheduling and congestion control elements 144, the output queues 146, and the interconnect prioritization elements 148 are discussed in further detail below with respect to the input ASIC 70, shown in more detail in FIG. 13.

Figure 10:
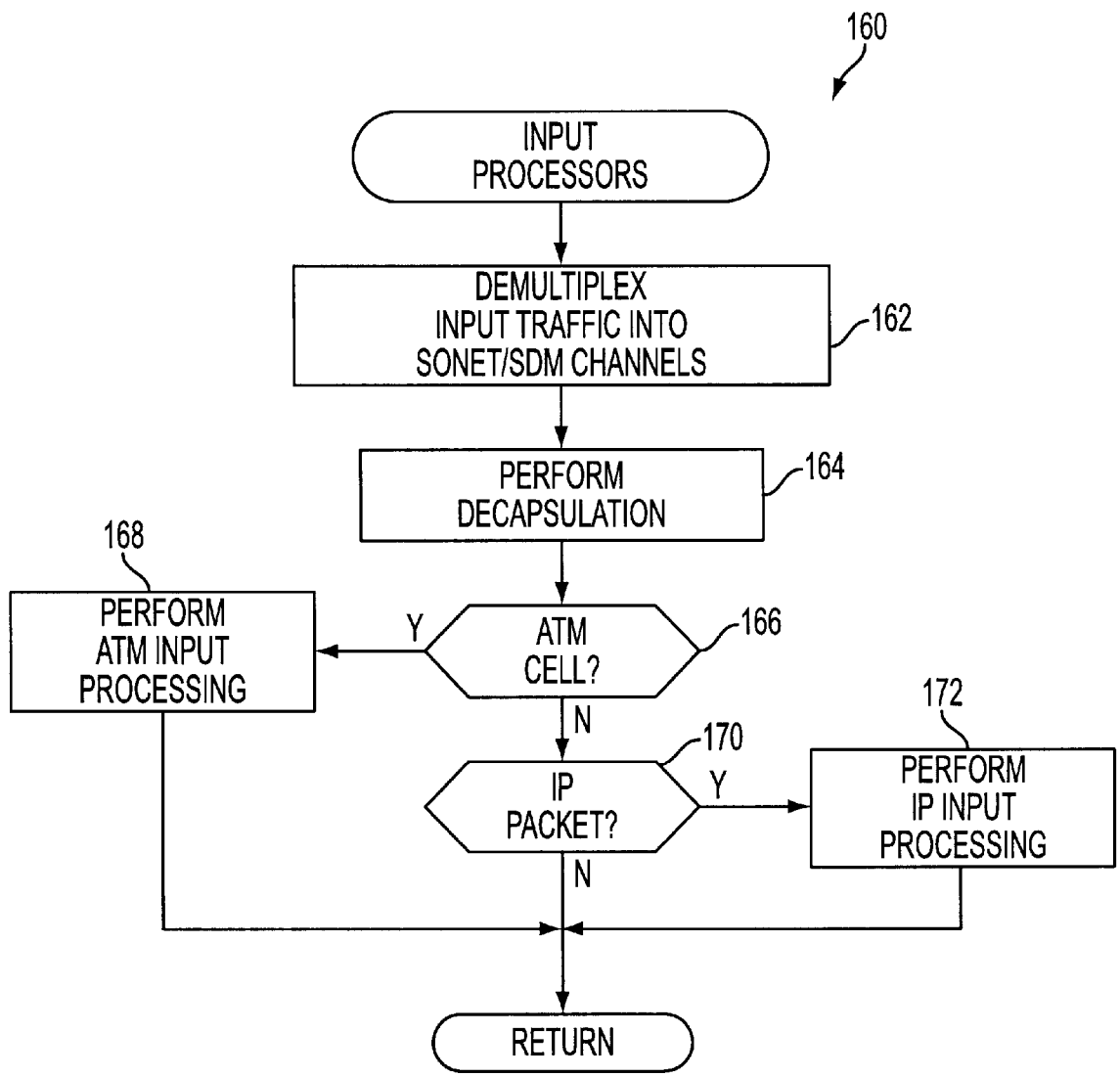
FIG. 10 is a flowchart illustrating the steps that the communication node of FIG. 1 performs during input processing.

As discussed above, the illustrative QoS facility 110 performs classification 120 and policing 122 during input processing. FIG. 10 shows a flowchart 160 that illustrates the steps that are performed during input processing in the illustrative embodiment. Initially, according to step 162, the incoming data is demultiplexed into the respective SONET/SDH tributaries. Next, as shown at 164, the receive ASIC 70 decapsulates the input data stream. Next, the receive ASIC 70 determines whether the input data is an ATM cell (step 166 in FIG. 10) or an IP packet (step 170 in FIG. 10). If the input data is an ATM cell, then the receive ASIC 70 performs ATM input processing (step 168 in FIG. 10). Alternatively, for an IP packet, the receive ASIC 70 performs IP input processing (step 172 in FIG. 10). IP and ATM input processing are discussed below in further detail.

Figure 11:
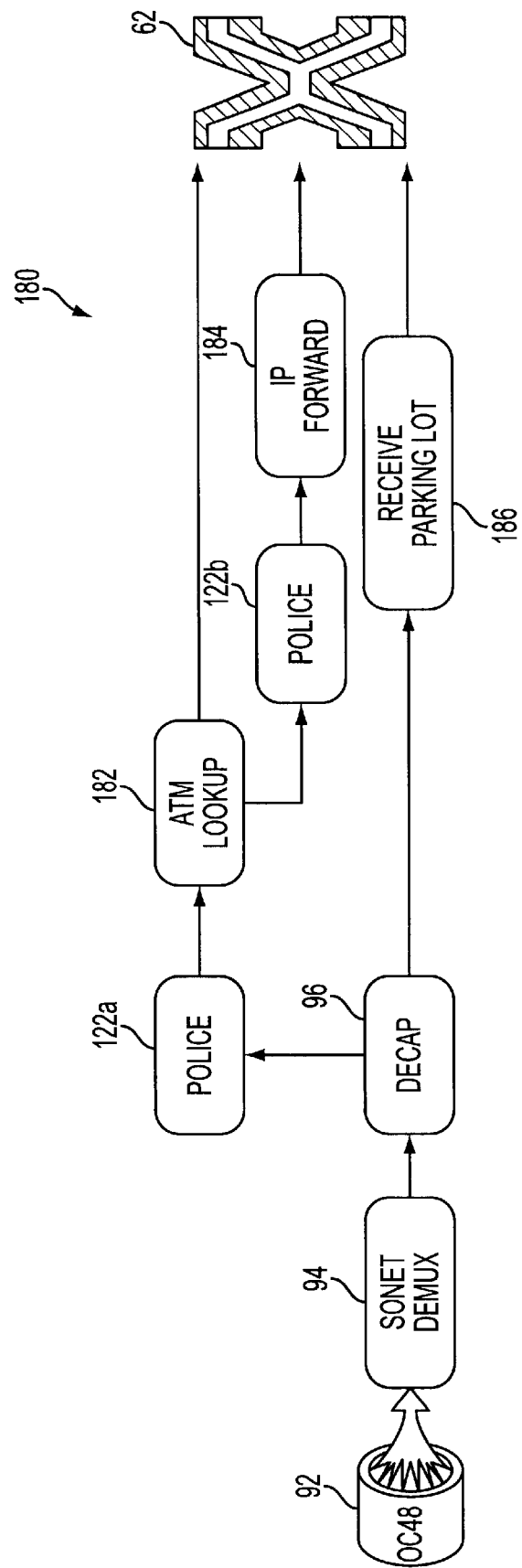
FIG. 11 is a functional flow diagram illustrating the steps that the communication node of FIG. 1 performs during input processing.

FIG. 11 depicts a more detailed flow diagram 180 of input processing. The SONET demultiplexers 94 demultiplex the OC-48 data stream 92. The resulting data in the respective tributaries may be in any of a number of different formats. As shown at 96, the receive ASIC 70 decapsulates the demultiplexed data stream (step 162 in FIG. 10) to gain access to the ATM cells or IP packets carried in the input data stream. The receive ASIC 70 is adapted for decapsulating a number of different types of OSI layer 2 encapsulations. The decapsulation step 162 of FIG. 10 may also include the deframing of SONET frames.

Figure 12:
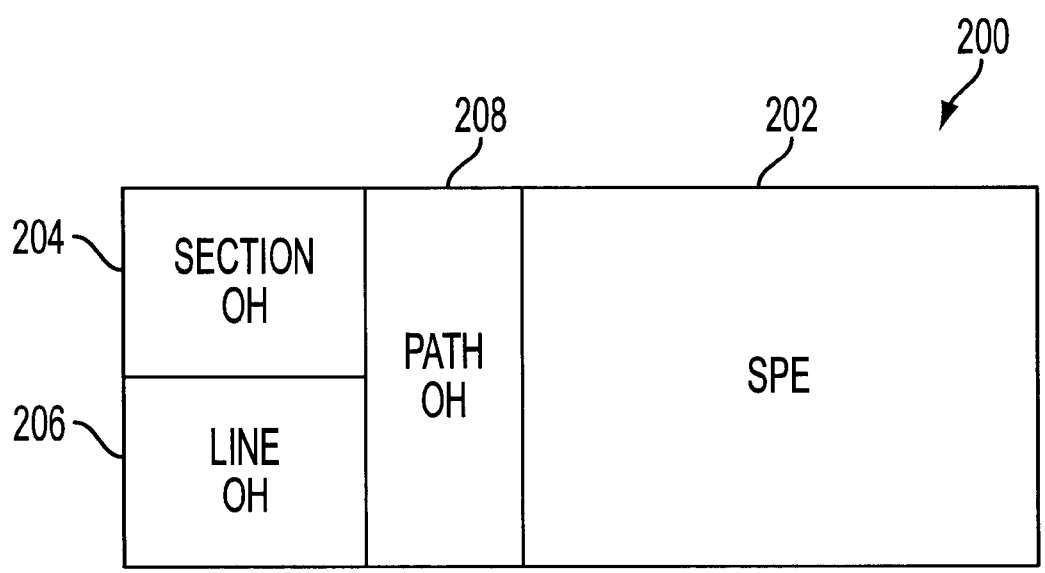
FIG. 12 illustrates the logical format of a SONET frame.

FIG. 12 depicts the format of a SONET frame 200. The SONET frame 200 includes 9-rows, each row containing 90 Octets (i.e. 90 8-bit bytes). The payload for the SONET frame 200 is contained in the synchronous payload envelope (SPE) 202. The SPE 202 contains 9-bytes that are dedicated to path overhead (OH) 208. The SONET frame 200 also contains section OH 204 and line OH 206. The section OH 204 and line OH 206 are part of the SONET transport overhead. In this context, "overhead" refers to header information that is provided for use by various layers of the computer network.

Figure 13:
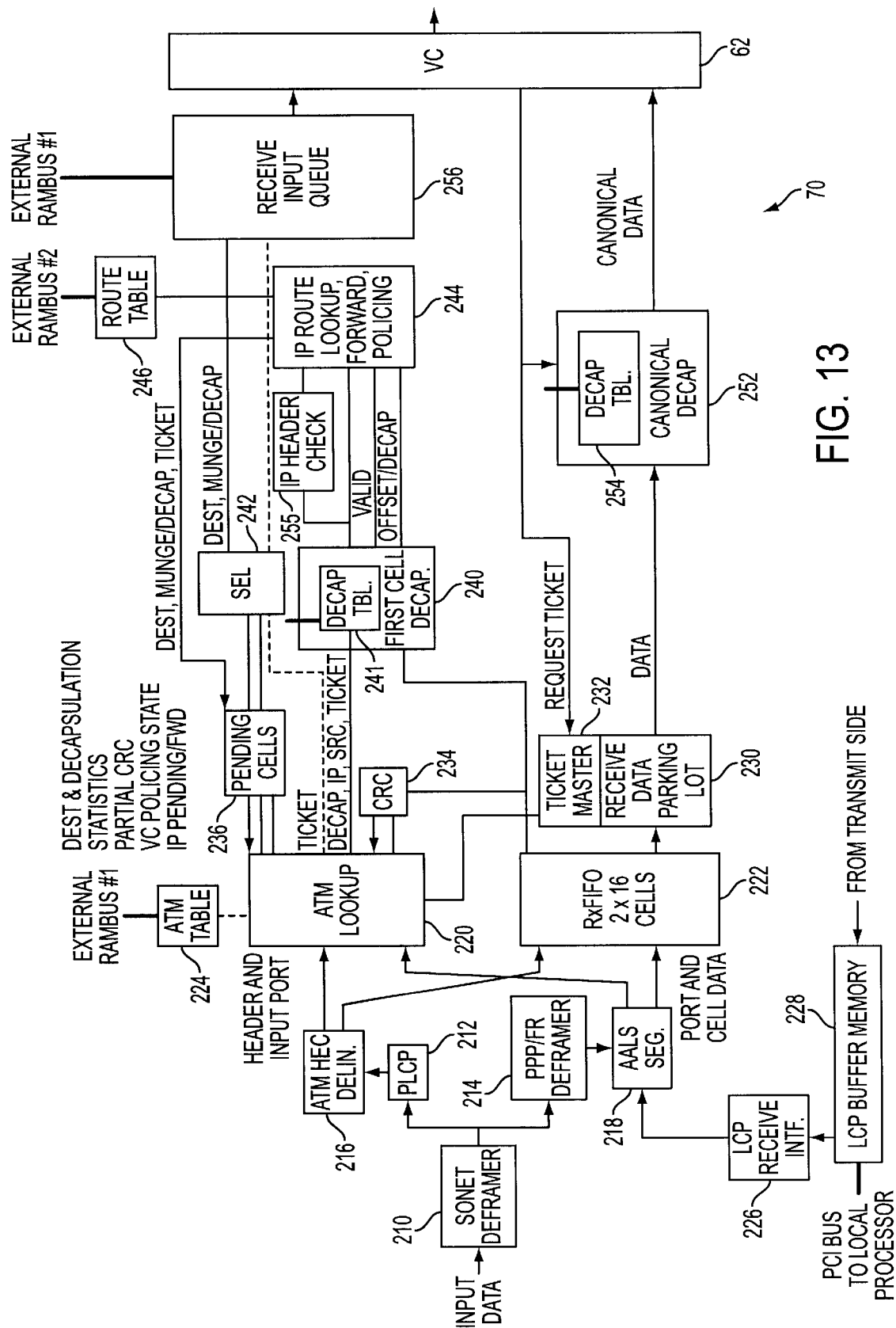
FIG. 13 is a more detailed logical block diagram of the receive ASIC included in the illustrative line card of FIG. 6.

FIG. 13 depicts the logical components of the receive ASIC 70 in more detail. As skilled artisans will appreciate, the divisions between the depicted components of the receive ASIC 70 are only illustrative in nature, and can be alternatively drawn, without impacting the scope of the invention. The receive ASIC 70 includes a SONET deframer 210 that receives the input data. The SONET deframer 210 removes the contents of the SPE 202 from the SONET frame 200. The resulting payload may contain additional encapsulations, as will be described in more detail below.

Figure 14:
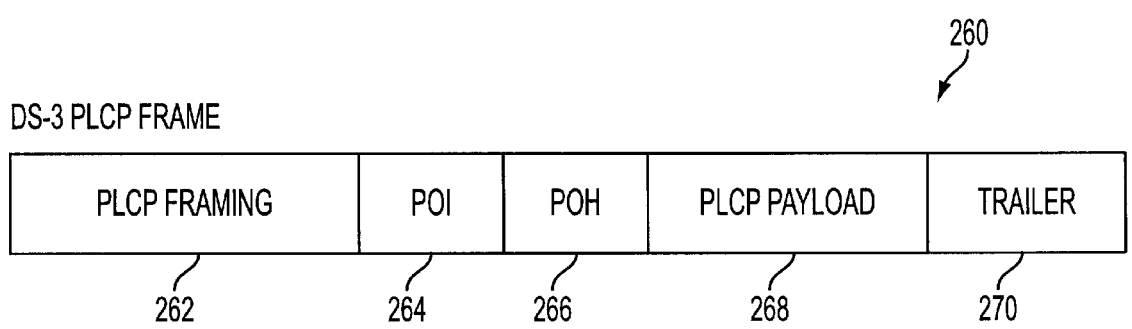
FIG. 14 illustrates the logical format of a DS-3 PLCP frame.

FIG. 14, by way of example, shows how the payload of the SONET frame 200 can contain one or more DS-3 PLCP (Physical Layer Convergence Protocol) frames 260. Such a frame 260 holds a payload that is used in mapping ATM cells onto DS-3 facilities. The frame 260 includes PLCP framing Octets 262 to identify the framing pattern that is utilized. The path overhead indicator (POI) 264 indexes the adjacent path overhead (POH) Octets 266 and identifies the encoding for the POH octet. The payload 268 includes the data content for the frame 260. The frame 260 may also include trailer nibbles (i.e. 4-bits) 220.

Figure 15:
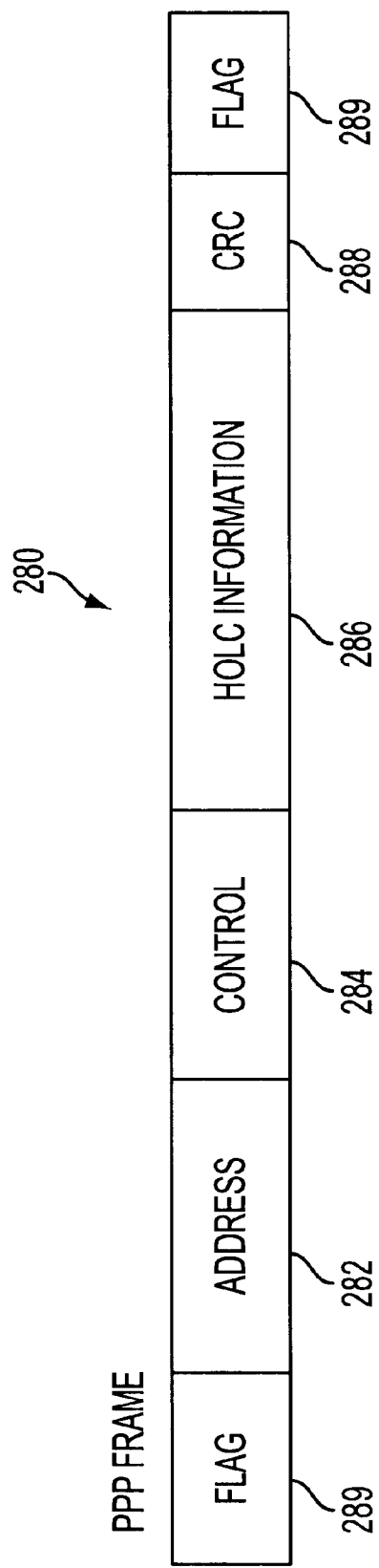
FIG. 15 illustrates the logical format of a PPP frame.

FIG. 15 depicts an alternative embodiment in which the data is encapsulated in a point-to-point protocol (PPP) frame 280. PPP is an OSI layer 2 protocol that is built on top of a restrictive subset of the standard high level data link control (HDLC) protocol. Each PPP frame 280 includes an address 282 and a control field 284 for holding flow control information. The PPP frame 280 contains a HDLC information section 286 that is 1502-octets long and contains a PPP payload. The CRC field 288 identifies the cyclic redundancy check that is used for the frame. The PPP frame 280 also includes frame delimiter flags 281 and 289.

Figure 16:
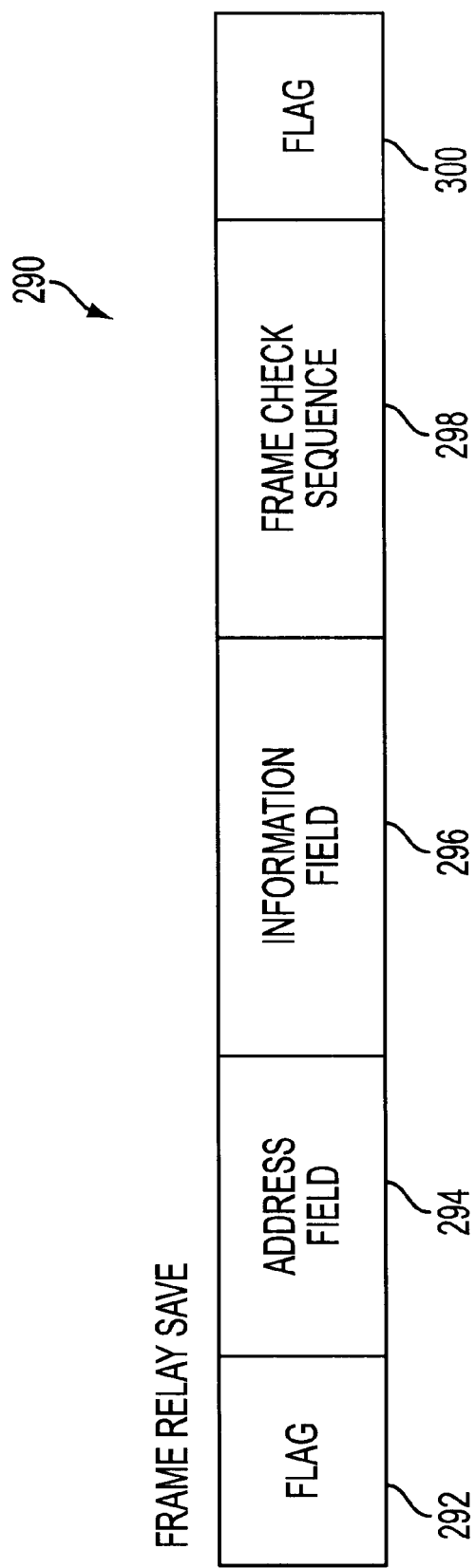
FIG. 16 illustrates the logical format of a Frame Relay frame.

FIG. 16 shows another alternative embodiment in which the data is encapsulated in a Frame Relay (FR) frame 290. FR is an OSI layer 2 protocol. Each FR frame 290 includes a byte of flag information 292 and an address field 294. The FR frame 290 also contains an information field 296 that holds a payload and a frame check sequence octet 298. The octet 298 that supplies information used to check whether the frame is properly received. Lastly, the FR frame 290 has a flag octet 300 at the end of it.

As shown in step 162 of FIG. 10, decapsulation includes removing the ATM data cells or the IP data packets from the OSI layer 2 frames (such as FR frame 290 or PPP frame 280) or from the PLCP frame 260. The receive ASIC 70 maintains interface information regarding the input port through which input data is received. The interface information includes a separate context for each input data tributary/stream and the context identifies the nature of the tributary. Hence, as shown in FIG. 13, for pure ATM, the output from the SONET deframer 210 is passed to the PCLP deframer 212. If data contains PPP frames or FR frames (as indicated by the context) the data is sent to the PPP/FR deframer 214.

Figure 18:
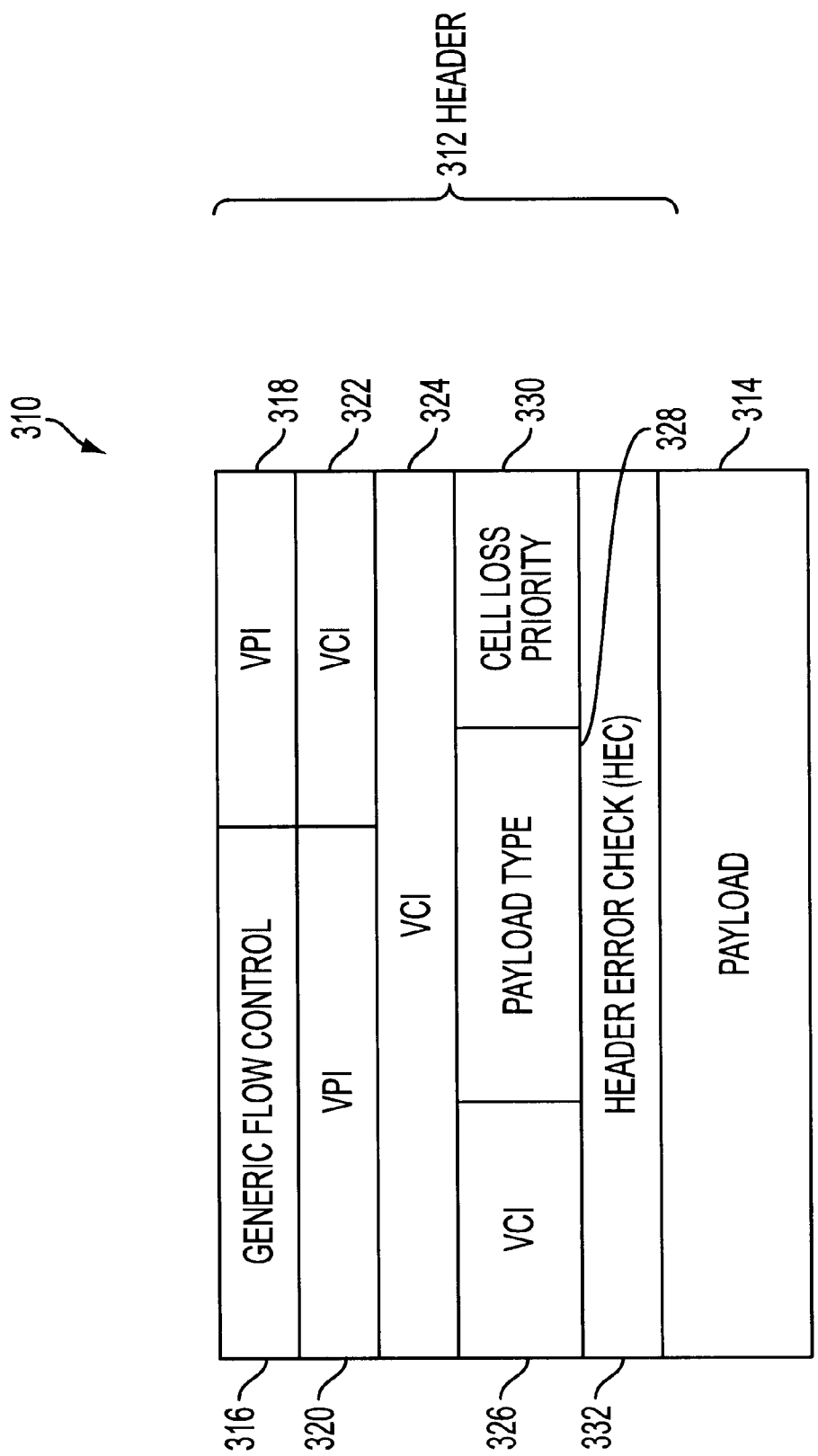
FIG. 18 illustrates the logical format of an ATM cell.

FIG. 18 depicts an illustrative ATM data cell 310. Each ATM data cell 310 is 53 bytes long with 48 bytes of payload 314 and 5 bytes of header 312. The header portion 312 includes generic flow control 316; a Virtual Path Indicator (VPI) 318–320; a Virtual Channel Indicator (VCI) 322–326; a payload type 328; a cell loss priority 330; and a header error check (HEC) 332. The generic flow control field 316 can be used to provide standardized flow control at a customers site. The VPI 318–320 identifies a virtual path (VP) for the ATM cell 310. The VCI 322–326 identifies the VC for the cell. ATM cells use VCIs and VPIs to specify treatment of a cell. A VC is a connection between two communicating ATM entities. A VP is a group of VCs that is carried between two points. VPs provide a convenient technique for bundling traffic that is heading for same destination. In some instances, the node 10 need only check for a VPI to relay traffic rather than checking a more complete address.

The payload type 328 includes a 3-bit field that indicates whether the cell 310 contains user information or contains associated layer management information. The cell loss priority bit 330 allows the specification of explicit loss priority for the cell. The header error control field 332 is used by the physical layer of the node 10 for detecting bit errors in the cell header 312.

Each PLCP frame 260 of FIG. 14 may contain up to 12-ATM cells 310. After the PLCP frame 260 is deframed, the ATM cells are located within the payload. As shown in FIG. 13, an ATM header error control (HEC) delineator 216 locates the ATM cells 310 within the PLCP payload 268. Once the ATM cell 310 has been located and the header located for the ATM cell, the receive ASIC 70 can perform the ATM input processing of step 168 in FIG. 10.

Figure 19:
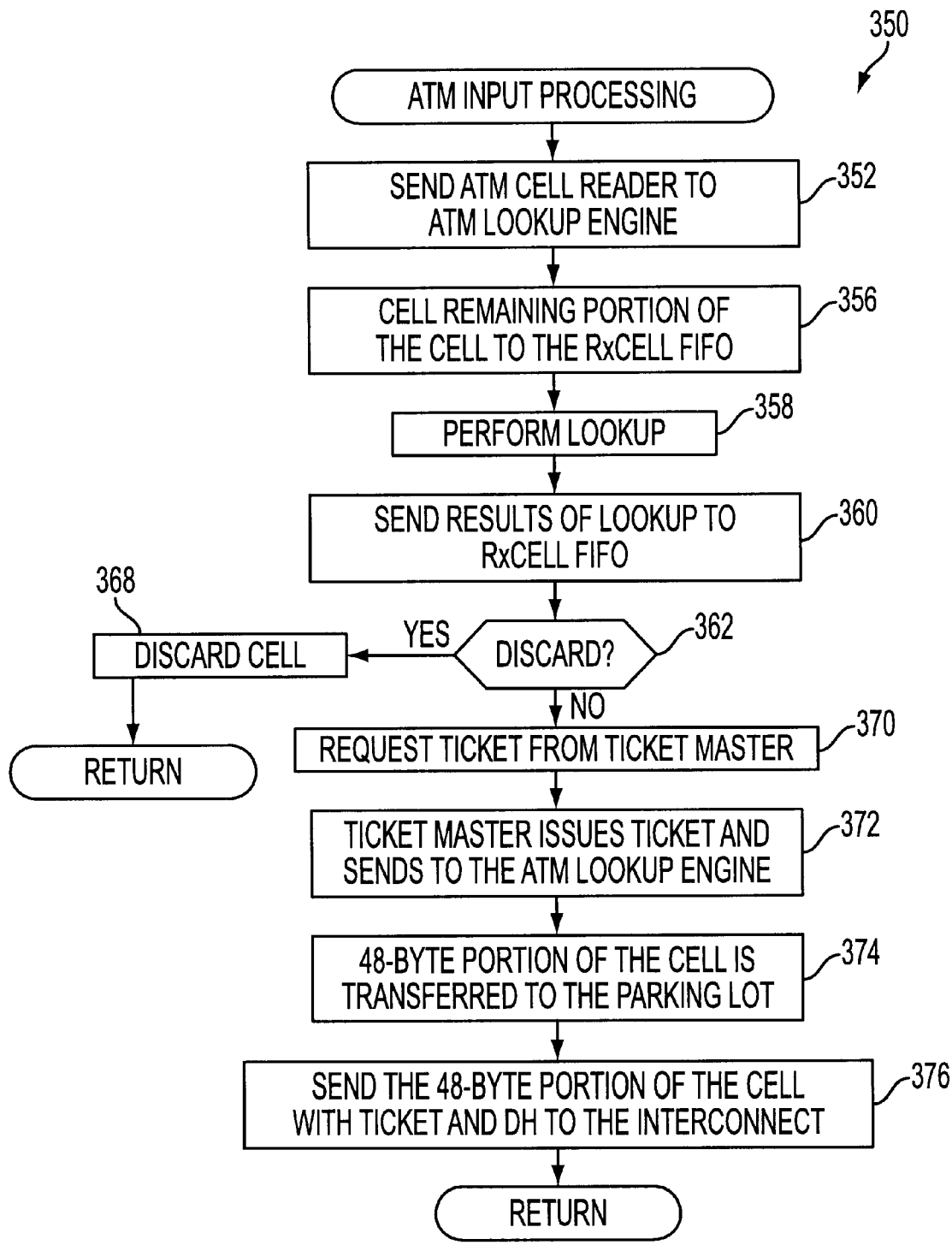
FIG. 19 is a flowchart illustrating the steps that the communication node of FIG. 1 performs during ATM cell input processing.

FIG. 19 is a flow chart 350 illustrating the input processing performed by the receive ASIC 70 of FIG. 13. With reference to FIGS. 13 and 19, the HEC delimiter 216 of FIG. 13 forwards the ATM cell header 312, along with input port information, to the ATM lookup engine 220. The HEC 216 sends the remaining 48-bytes of the ATM cell 310 to the receive FIFO 222.

As mentioned above, the HEC delimiter 216 sends the ATM cell header 312 to the ATM lookup engine 220 (step 352 in FIG. 19). The HEC delimiter 216 sends the payload 314 to the receive FIFO 222 (step 354 in FIG. 19). The ATM lookup engine 220 uses an ATM table 224 to perform a lookup to determine where to direct the ATM cell 310 (step 358 in FIG. 19). Additionally, the ATM lookup engine 220 plays a role in both the ATM policing (see 122a in FIG. 11) and the ATM lookup function (see 182 in FIG. 11). As illustrated, the ATM cell header 312 that is sent to the ATM lookup engine 220 does not include the HEC field 332. Also, according to the illustrative embodiment, the ATM lookup engine 220 performs a lookup in parallel with the payload 314 being stored in the receive FIFO 222.

The discussion below focuses first on the performance of the ATM lookup engine 220, and then describes policing performed by the ATM lookup engine 220. As previously discussed, the policing determines whether incoming data is in conformance with agreed upon service contracts. It accomplishes this by measuring traffic rates, and comparing actual rates with the contracted for rates.

As shown in FIG. 21, an illustrative incoming ATM cell 310 goes through a three stage lookup 400. The first stage involves accessing the port lookup table (PLUT) 402. The PLUT 402 contains 49-entries, where 48-entries are provided for the 48-different input ports that are possible and a 49th entry corresponds to the line card processor (LCP) 72. Each entry in the PLUT 402 points to an entry in the VP lookup table (VPLUT) 404, which constitutes the second stage of the lookup. Each entry in the VPLUT 404 is associated with a particular VP. Hence, an entry in the VPLUT 404 points to the VP associated with the input port context for the entry. Each VPLUT entry 404 points to a VC lookup table (VCLUT) 406 which holds information for a particular VC. Each entry contains 128 bytes of data. The data identifies the VC to which the ATM data cell 310 is routed or switched, or indicates that the VC terminates on the LCP.

To reduce propagation delays through the illustrative communication node 10, incoming data is examined only once. The resulting DH provides the key for finding any further information for a data flow. The DH specifies the Destination Descriptior, which is unique to the data flow. Additionally, the DH specifies the output port and output queue to which the data should be directed. The DH also includes indicators regarding conformance to policing and regarding QoS contracts, as well as an indicator that further QoS lookups are necessary to schedule data flow.

As previously mentioned, to stop data flows from interfering with each other, it is sometimes necessary to police data flows to make sure they are not exceeding their contracts. Policing is accomplished using a "leaky bucket" algorithm that allows a bit bucket to drain at a specific rate while the depth of the bucket matches the maximum burst size for the flow. If the flow "overflows" the bucket, the packets are considered "non-conformant" and can be policed. As previously mentioned, policing is performed in three places in the COMMUNICATION NODE 10; the ATM lookup (SEE FIG. 21), the IP lookup (see FIG. 26), and the Queue Manager (see FIG. 13).

The ATM look up engine 220 employs policers for monitoring peak cell rate (PCR) and sustained cell rate (SCR), according to the traffic service contract for the VC or VP. Each policer implements the generic cell rate algorithm (GCRA), which is defined in the UNI 4.0 specification. The PCR leaky bucket algorithm monitors the maximum cell rate within the tolerance permitted by the cell delay variation toleration (CDVT). The SCR leaky bucket algorithm monitors the average cell arrival rate over a period of time within the burst size permitted by the maximum burst size (MBS) and CDVT. SCR applies to VBR and UBR connections. Traffic contracts are defined in accordance with the ATM Forum Traffic Management 4.0 specification.

Non-conformant cells are dropped or marked using the CLP (Cell Loss Priority) bit and are policed based on the properties of the VC. If marked, the cell is not discarded unless there is congestion in the output queues. The CLP provides an indication as to which cells are the best to be dropped. If the output queues (shown at 622 in FIG. 33) experience congestion, the output queue manager (shown at 620 in FIG. 33) discards cells with the CLP bit set.

Figure 20:
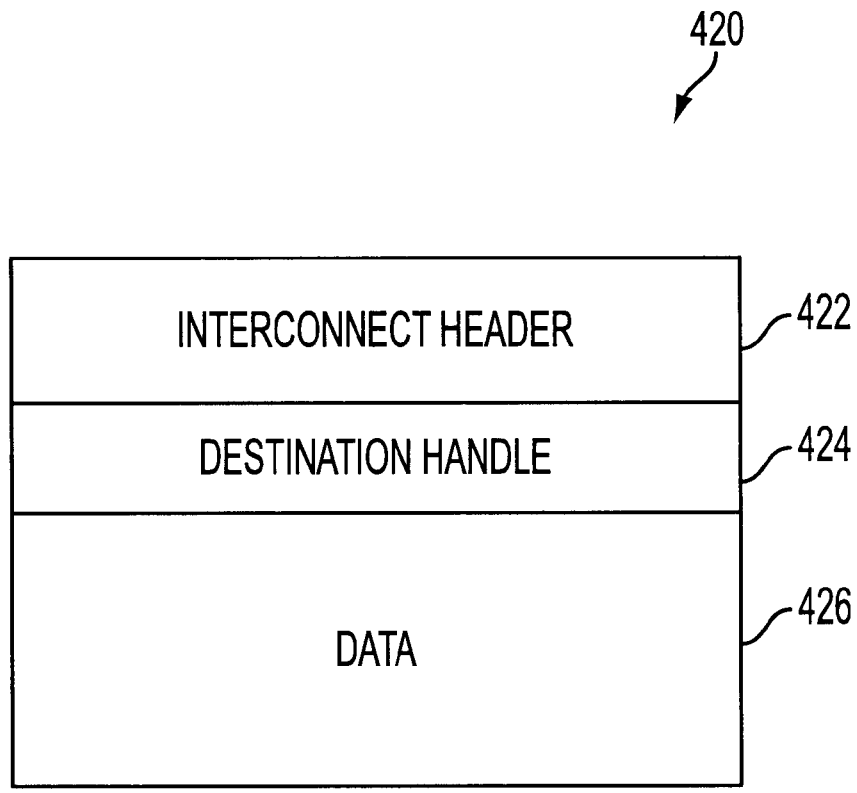
FIG. 20 illustrates the logical format of a communication cell that is used internally in the communication node of FIG. 1.

The lookup engine 220 sends the results of the ATM lookup (i.e. the DH) to the receive FIFO 222 (step 360 in FIG. 18). Optionally, the ATM lookup engine 220 can elect discard a cell as part of policing (step 362 in FIG. 18). The nonconforming cells are then discarded (step 368 in FIG. 18). If the cell is not to be discarded, the ATM lookup engine 220 requests a ticket from the ticket master 232 (step 270 in FIG. 18). The ticket is a pointer to a location within a receive data parking lot 230. The receive data parking lot 230 is a place for storing data while processing is being performed. The ticket may be redeemed to extract the data from the location identified by the ticket. In response to a request, the ticket master 232 issues a ticket and sends the ticket to the ATM lookup engine 220 (step 372 in FIG. 18). The receive FIFO 222 then transfers the ATM payload 314 to the receive data parking lot 230. The receive data parking lot stores the data at the location identified by the issued ticket (step 374 in FIG. 18). The receive data parking lot 230 forwards the 48-byte payload portion 314 of the ATM cell 310, along with the ticket and the DH, to the canonical decapsulation module 252. The canonical decapsulation module 252 includes a decapsulation table 184 that determines how first to decapsulate the data, then to encapsulate the data into the internal cells (i.e. canonical format) used by the communication node 10. For raw ATM cells, the payload 314 is combined with the header information and the DH to create the internal data cell. In particular, the canonical decapsulation module 252 constructs an internal cell with the format depicted at 420 in FIG. 20. The internal cell 420 includes a data portion 426 as well as the DH 424. The internal cell 420 also includes an interconnect header portion 422. The interconnect head portion 422 provides header information that is used by the interconnect 62.

In step 170 of FIG. 10, the receive ASIC 70 may determine that the incoming data is not an ATM cell, but rather is an IP packet or an ATM cell containing an IP packet or part of an IP packet. In such a case, the receive ASIC 70 performs IP input processing (step 172 in FIG. 10). The IP packet may be encapsulated in a PPP frame 280 of FIG. 15 or a FR frame 290 of FIG. 16. As was mentioned above, the deframer 214 deframes the PPP frames 280 and the FR frames 290. The IP packet also may be encapsulated in an AAL5 (ATM adaptation layer 5) frame. In other words, the IP packet may be transmitted over ATM.

Figure 17:
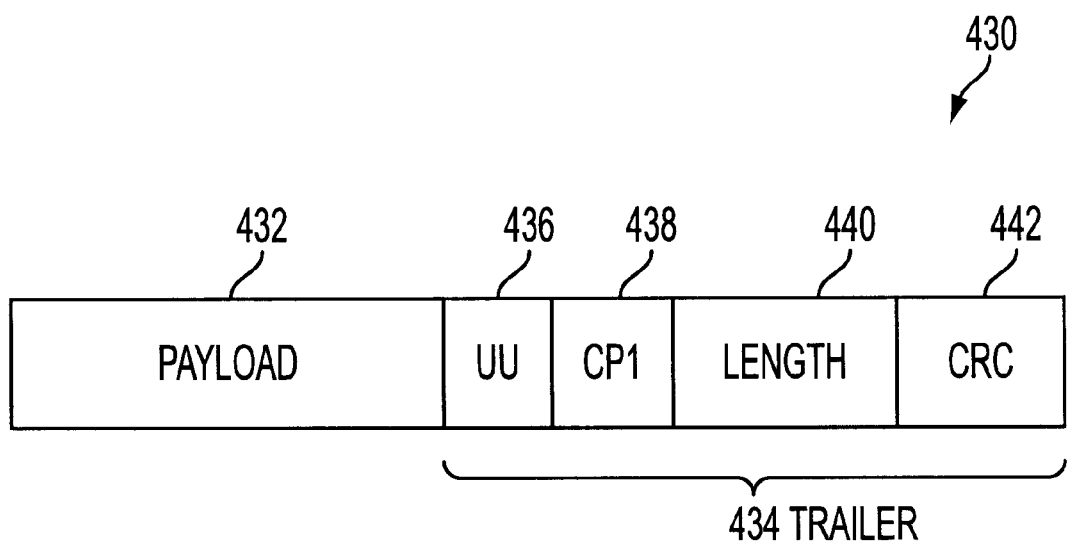
FIG. 17 illustrates the logical format. Of an AAL5 IDU.

FIG. 17 depicts the format of an AAL5 interface data unit (IDU) 430. The IDU 430 includes a payload 432, as well as a trailer 434. The IDU 430 may be of variable length. The trailer 434 contains the User-to-User (UU) field 436, which holds data that is to be transferred transparently between users. A Common Part Indicator (CPI) field 438 aligns the trailer in the total bit stream. The length field 440 indicates the length of the total IDU payload 432. A cyclic redundancy check (CRC) field 442 is used for error detection correction in the trailer only. The entire set of data contained in the IDU 430 is segmented into 48-octet payloads prepended with a 5-octet header to form 53-octet ATM cells.

Figure 22:
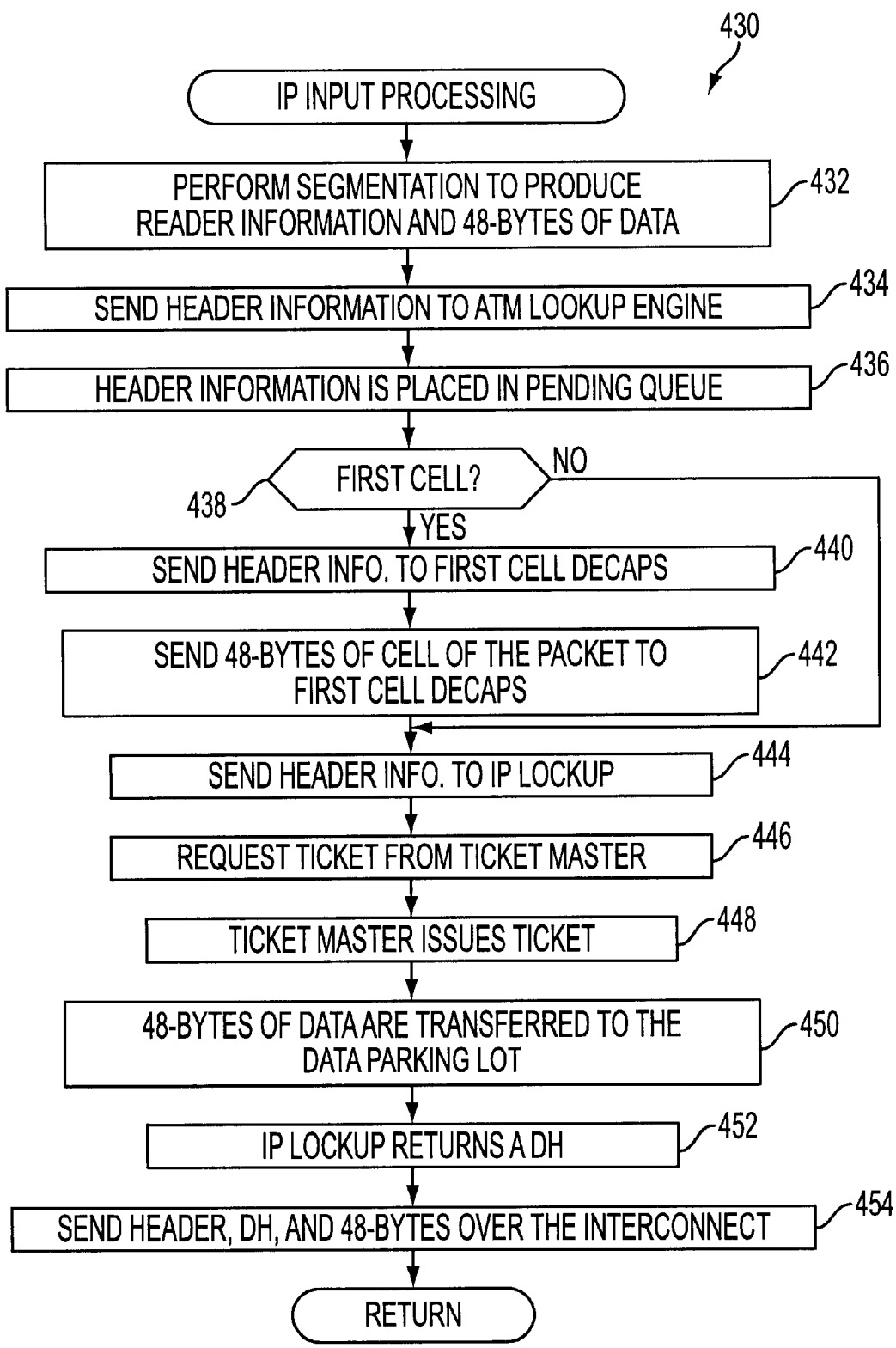
FIG. 22 is a flowchart illustrating the steps performed by the receive ASIC of FIG. 13 during IP input processing.

FIG. 22 is a flowchart 430 that illustrates the steps performed by the receive ASIC 70 during input processing for IP packets. The AAL5 segmenter 218 divides the IP packet into pseudo-ATM cells (step 400 in FIG. 20). In the case where the input data is in packet over ATM format, the IP packet may be held in one or more ATM cells. The AAL5 segmenter 218 sends the header information 312 from each of the pseudo ATM cells to the ATM lookup engine 220 (step 434 in FIG. 22). The ATM lookup engine 220 recognizes the cell as containing IP packet data and places the header information 312 for the cells in the pending cells queue 236 (step 436 in FIG. 22). The pending cells queue 236 accumulates the header information for the cells that constitute a single packet. In this way, the receive ASIC 70 ensures that all of the cells for an IP packet have been processed before transmission of internal cells for the IP packet over the interconnect 62.

In order to understand how processing proceeds, it is helpful to consider the case where a PPP frame 280 of FIG. 15 contains an IP packet. In such an instance, the receive ASIC 70 shreds the IP packet in the PPP frame 280 into pseudo-ATM cells and sends the headers 312 to the ATM lookup engine 220 and the 48-data bytes of the payload 314 to the receive FIFO 222. The PPP VPs and/or VCs are aliased into ATM cells so that ATM lookup engine 220 is able to process the pseudo-ATM cells. Specifically, traffic coming over a PPP context has a VPI with a preconfigured value of zero. This value is inserted into the PPP frame before sending the packet to the AAL5 segmenter 218. The VPI value of zero for the PPP context is set up as a switched VP circuit that is routed. For FR frames 290, the VPI is set to the incoming DLCI value plus one. When processing incoming header data, the ATM lookup engine 220 returns either a DH or a placeholder DH. The placeholder DHs are an indication that the incoming header is for an IP packet. The presence of the placeholder DH output causes the ATM lookup engine 220 to put the header information in the pending cells queue 236.

The ATM lookup engine 220 determines whether the input data cell is for the first cell of an IP packet (step 438 in FIG. 22). If the ATM lookup engine 220 determines that the cell is first cell for an IP packet, it sends the IP header information to the first cell decapsulation module 240 (step 440 in FIG. 22). Additionally, the receive FIFO 222 sends the 48 bytes of payload data for the cell to the first cell decapsulation module 240, as well (step 442 in FIG. 22). The first cell decapsulation module 240 decapsulates the information contained in the header to send appropriate information to the IP lookup module 244 (step 444 in FIG. 22). The first cell decapsulation module 240 uses a decapsulation table 241 to identify how to decapsulate the cell. The IP lookup module 244 performs both forwarding lookup 184 (see 184 in FIG. 11) and policing (see 122b in FIG. 11) for IP packets.

As the lookup is proceeding, the interconnect 62 requests a ticket from the ticket master 232 to obtain data to be sent over the interconnect 62 (step 446 in FIG. 22), and in response, the ticket master 232 issues a ticket (step 448 in FIG. 22). The receive FIFO 222 transfers 48-bytes of payload data to the receive data parking lot 230 (step 450 in FIG. 20) for storage at the location identified by the issued ticket. The IP lookup module 244 returns a DH that identifies the destination line card for the internal cell that will be forwarded over the interconnect 62 (step 452 in FIG. 22). The receive ASIC 70 forwards an interconnect header, the DH and the 48-bits of payload data over the interconnect 62 (step 454 in FIG. 22) in the internal cell format 420. Prior to transmission, the receive ASIC 70 buffers these fields in the receive input queue 286.

Figure 23:
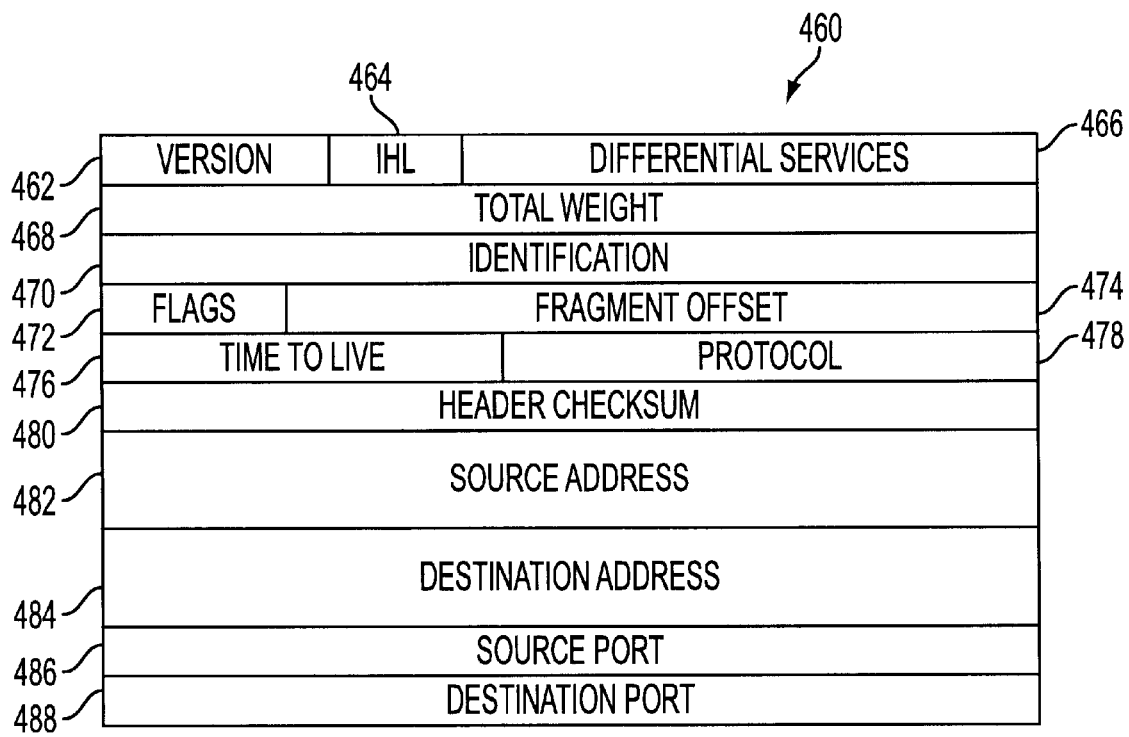
FIG. 23 illustrates the logical format of IP header data.

FIG. 23 depicts the format of the IP header data 460 that is used by the IP lookup module 244. All of the fields in the header data 460, other than fields 486 and 488, are copied from the IP header of the associated IP packet. Fields 486 and 488 are copied from a transport header. The header data 460 includes a version field 462, which holds information regarding the version of the IP protocol being used. For version 4 IP packets, this field 462 holds a value of 4. The Internet Header Length (IHL) field 464 identifies the length of the header from the IP packet in multiples of 4-octets. The TOS field 466 holds a value that identifies a particular handling or treatment for the packet. The total length field 468 holds information regarding the total length of the packet. The identification field 470 provides an identification value for the packet. If the packet is later fragmented, the identification value associates the fragments with the original packet.

The header data 460 includes flags 472, including a DF flag and a MF flag. The DF ("don't fragment") flag indicates whether a datagram that is carried at least in part by the packet is allowed to be fragmented, should it be necessary. The MF ("more fragment") flag identifies whether there are more fragments or whether the packet holds the last fragment of the datagram. The fragment offset field 474 holds an offset value that identifies the offset in which the fragment belongs to the reassembled packet. The time to live field 476 identifies the number of hops a packet may have before the packet is discarded. The protocol field 478 holds a value that allows the network layer of the destination end node to know to which transport protocol running at the destination end node the packet should be directed. A header checksum field 480 is provided. A source address field 482 and a destination address field 484 are also provided. The source address field stores a source address of the node from which the packet originated. The destination address field stores a destination address for the node to which the packet is to be forwarded.

The source port field 486 identifies a source port and destination port field 488 identifies a destination port for the packet.

Figure 24:
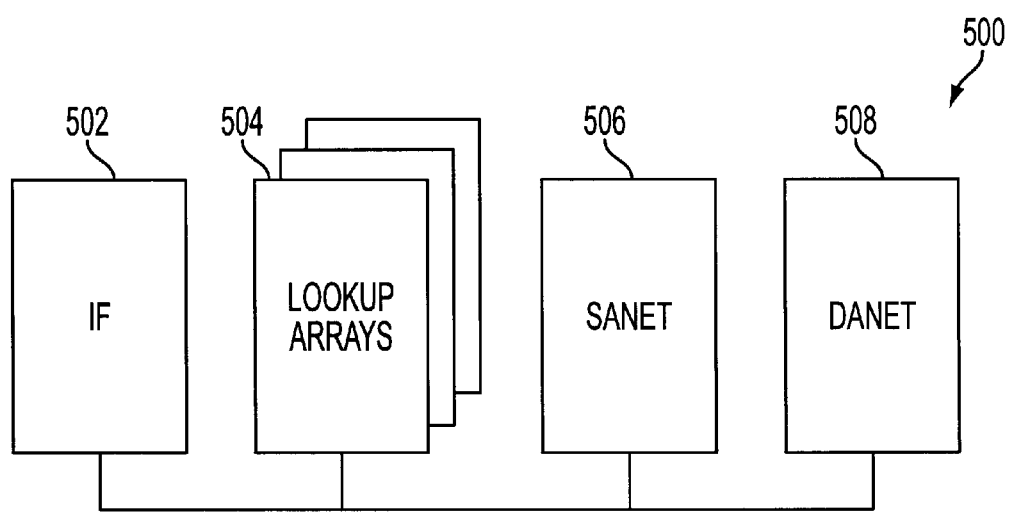
FIG. 24 illustrates data structures and tables that are employed during IP lookup.

The IP lookup module 244 uses a number of tables (see Route Table 246 in FIG. 13) and other structures in performing IP lookup. FIG. 24 depicts a number of the more prominent tables and structures 500 that the IP lookup module 244 utilizes. An interface (IF) structure 502 is provided to identify each interface (i.e. context) from which data is received. The interface structure contains an initial lookup element that is utilized when forwarding lookup is to be initiated. This initial lookup element is an array lookup element that contains an instruction to be executed at the beginning of forwarding lookup for an IP packet.

The IP lookup module 244 uses lookup arrays 504 containing lookup elements. The IP lookup module 244 may also use a SANET 506 or DANET 508. The SANET 506 is a data structure that provides a number of structures for respective source addresses that are being exploited for QoS processing and Type of Service (ToS) processing. The DANET 508 holds DANET structures that contain information regarding destination addresses that identifies the next hop for IP packets.

Figure 25:
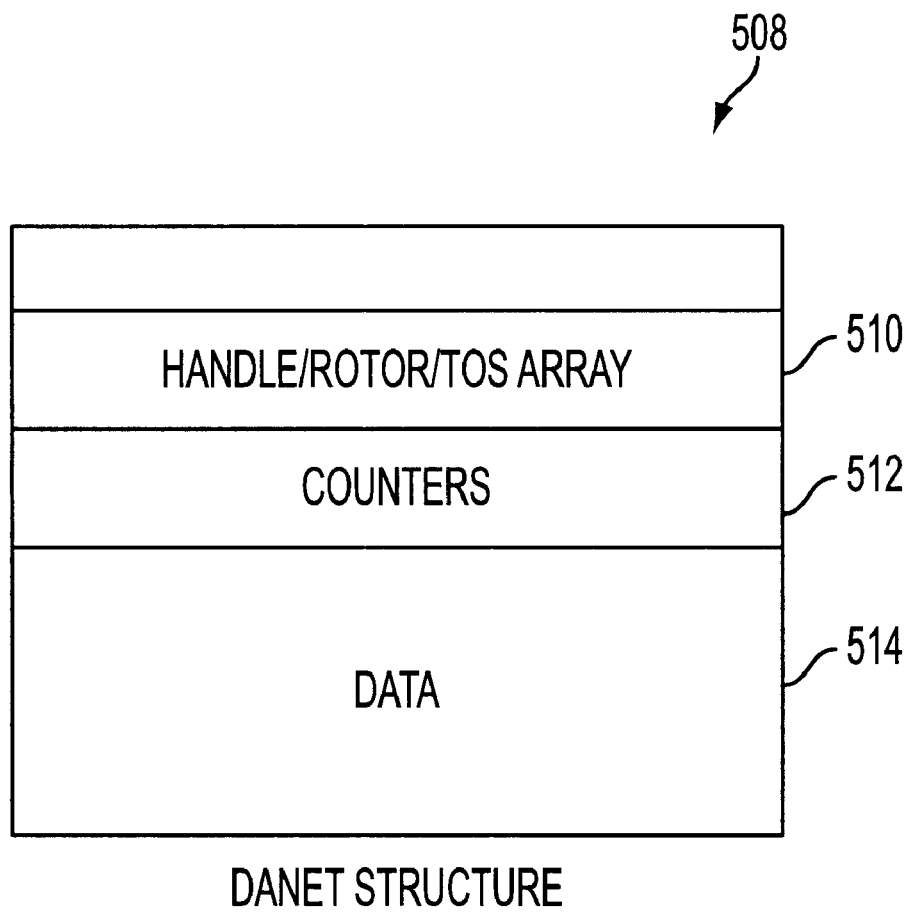
FIG. 25 illustrates a logical format of a DANET structure.

FIG. 25 shows the format of an illustrative DANET structure 508. The DANET structure 508 includes a DH and a pointer to a rotor or a pointer to a ToS array in field 510. A rotor is a data structure that contains a set of DHs. A rotor may be used to aggregate multiple lower speed links into a virtual higher speed link. A ToS array is also an array of handles but it is indexed by a ToS parameter value. The ToS array enables the DH to vary with ToS. The DANET structure 508 also includes counters 512 for tracking statistical data, as well as other data. The DANET structure 508 further includes a data field 514.

Figure 27:
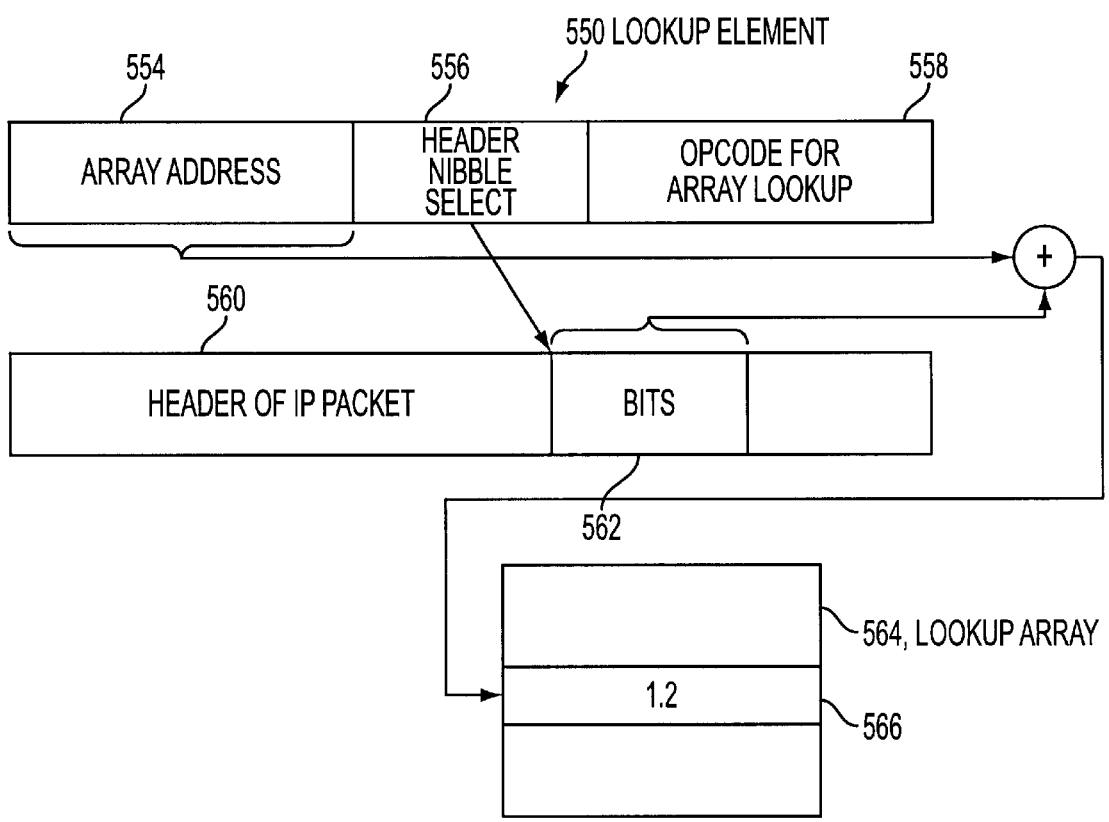
FIG. 27 is a diagram illustrating the indexing of a lookup array during IP lookup.

FIG. 26 provides a flow chart 520 illustrating the steps that the receive ASIC 70 performs during an IP lookup for a unicast IP packet. The IP lookup determines how to send the IP packet to the next hop toward the destination (i.e. ultimately, it determines what output port to use). The IP lookup module 244 of FIG. 13 detects the interface on which the IP packet arrived. The interface structure for the associated interface is accessed and the IP lookup module 244 processes the initial lookup element contained in the interface structure (step 522 in FIG. 26). As shown in FIG. 27, the interface element contains a lookup element 550. The lookup element 550 contains an array address 554 and an opcode for array lookup 558. The lookup element 550 also contains a header nibble select 556 that identifies what 4 bit nibble within the header may be utilized to generate an index to an array lookup element 550 in the lookup array 564. The array address combined with the nibble that is selected by the header nibble select 556 is used to access a lookup element 566 in the lookup array 564. The bits 562 contained within the header of the IP packet 560 are combined to produce an index for accessing the lookup element 566.

The route table 246 of FIG. 13 contains multiple lookup tables. In particular, a tree of lookup arrays is provided. The first level of the tree is a single lookup array that is indexed by the first two bytes of the destination IP address for an IP packet. The second level of the tree contains lookup arrays indexed by the third bytes of the destination IP address. The third level of the tree contains lookup arrays that are index by the final byte of the destination IP address. By using this tree structure, the illustrative embodiment is able to decrease the number of memory access required, and to increase the speed with which IP lookup occurs.

After the instruction has been accessed in the interface structure (see step 522 in FIG. 26), an entry is accessed in the first lookup array and processed (step 524 in FIG. 26). The instruction signals the IP lookup module 246 what to do next. For example, the instruction may signal the IP lookup module 246 to access an element in a second lookup table. Alternatively, the instruction may signal the IP lookup module 246 to use a DH contained within a particular DANET structure. If the entry in the first lookup array does not complete (i.e. identify a DANET structure to use) the process (see step 526 in FIG. 26), the receive ASIC 70 of FIG. 13 accesses an entry in the second lookup array and processes it (step 528 in FIG. 26). If the processing of this entry in the second lookup array does not complete the lookup (see step 530 in FIG. 26) the receive ASIC 70 access, an entry in the third lookup array and processes it (step 532 in FIG. 26). If the instructions in the lookup arrays direct the use of an identified DANET structure in forwarding the packet, the receive ASIC 70 uses that structure (step 534 in FIG. 26).

Figure 28:
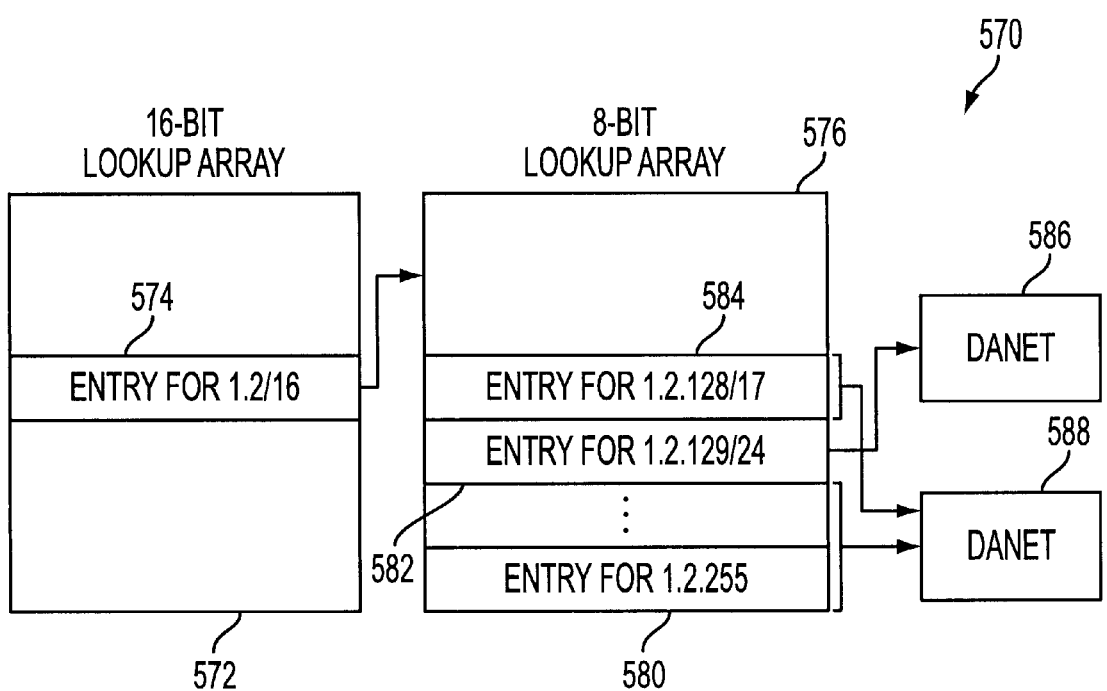
FIG. 28 is a example illustrating the relationship between lookup arrays and DANET structures during IP lookup.

FIG. 28 depicts an example 570 that illustrates how the receive ASIC 70 uses the lookup arrays 564 in conjunction with the DANET structures 508 of FIG. 25. In the example 570 depicted in FIG. 28, the 16-bit lookup array 572 contains an entry 574 for the prefix 1.2/16. This entry 574 advises the use of the 8-bit lookup array 576. The next bit in the destination address is then used to locate an entry, such as entry 582 or entry 584. The entry 582 is for the IP destination address 1.2.129/24. The DANET structure 586 is used in such an instance. For the IP destination address of 1.2.128/17, the DANET structure 588 is used.

The IP lookup is described in more detail in copending application entitled, "Network Packet Forwarding Lookup With A Reduced Number Of Memory Accesses," application Ser. No. 09/237,128, filed on Jan. 25, 1999, which has been previously incorporated by reference.

The IP lookup module 244 of FIG. 13 also performs policing of IP packets (see 122b in FIG. 11). The IP lookup module 244 classifies IP packets into three bands: green, amber or red. Green implies that the traffic is within sustained rate traffic limits. Amber implies that the traffic is over the traffic limits, but under a predefined burst rate, and red implies that the traffic is over the burst rate. The policing may be used to mark the ToS bit 436 in the IP header 460 of FIG. 23. In addition, the policer in the IP lookup module 244 generates a profile indicator value in a range of one to four that is used as input to a Random Early Detect (RED) algorithm on the transmit ASIC 71. Each data flow has an associated traffic profile that sets limits on how much traffic the flow is allowed to generate. The flow limit is enforced by a token bucket algorithm that allows brief bursts above the flow limit. The token bucket assigns incoming traffic to the appropriate band. Thus, the IP lookup engine 244 performs both the policing function 122b (FIG. 11) and the IP forwarding function (184 in FIG. 11).

Figure 29:
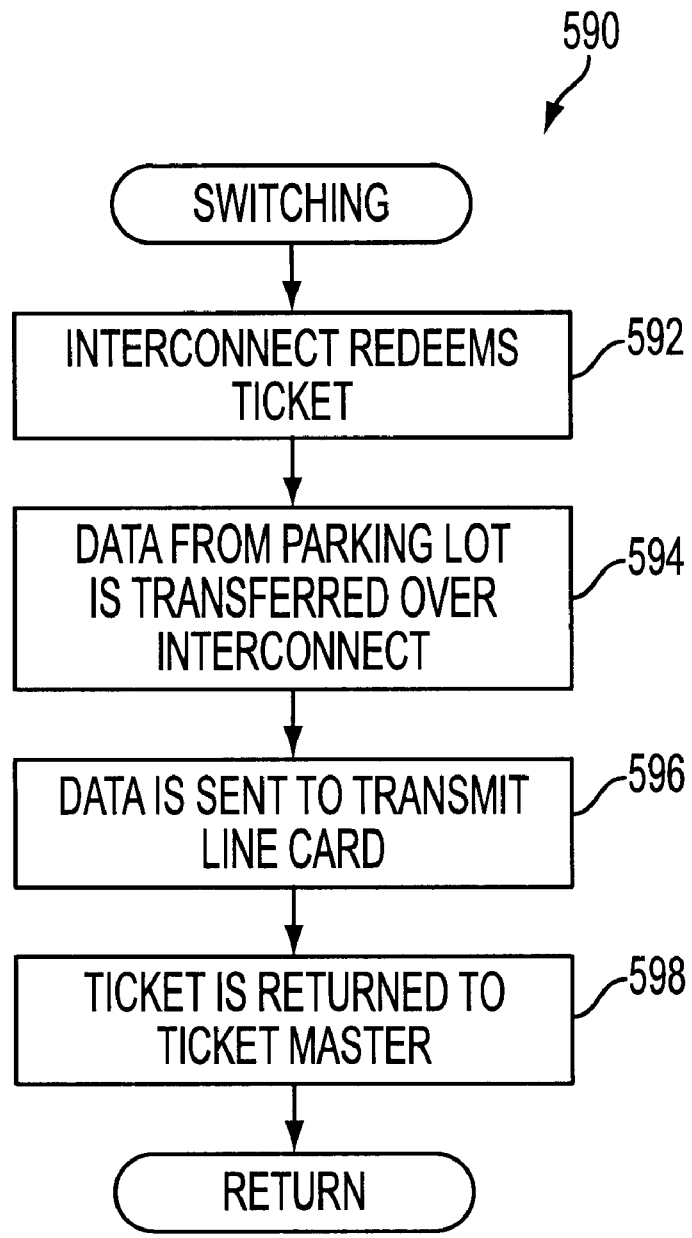
FIG. 29 is a flowchart illustrating the steps that are performed by the modular communication node of FIG. 1 during a switching stage.

FIG. 29 is a flow chart 590 depicting the steps performed by the interconnect 62 as a part of the switching stage 84 of FIG. 6. The interconnect 62 redeems a ticket from the ticket master 232 of FIG. 13 to obtain data from the receive data parking lot 230 (step 592 in FIG. 29). The parking lot 230 then transfers the data over the interconnect 62 (step 594 in FIG. 29). The interconnect 62 sends the data to the appropriate line card, by way of example, line card 53 of FIG. 4 (step 596 in FIG. 29). The interconnect 62 then returns the ticket to the ticket master 232 on the receive ASIC 70 (step 598 in FIG. 29). The interconnect 62 is described in more detail in copending application entitled, "Interconnect Network For Operation Within A Communication Node," Ser. No. 09/336,090, which has been previously incorporated by reference.

Figure 30:
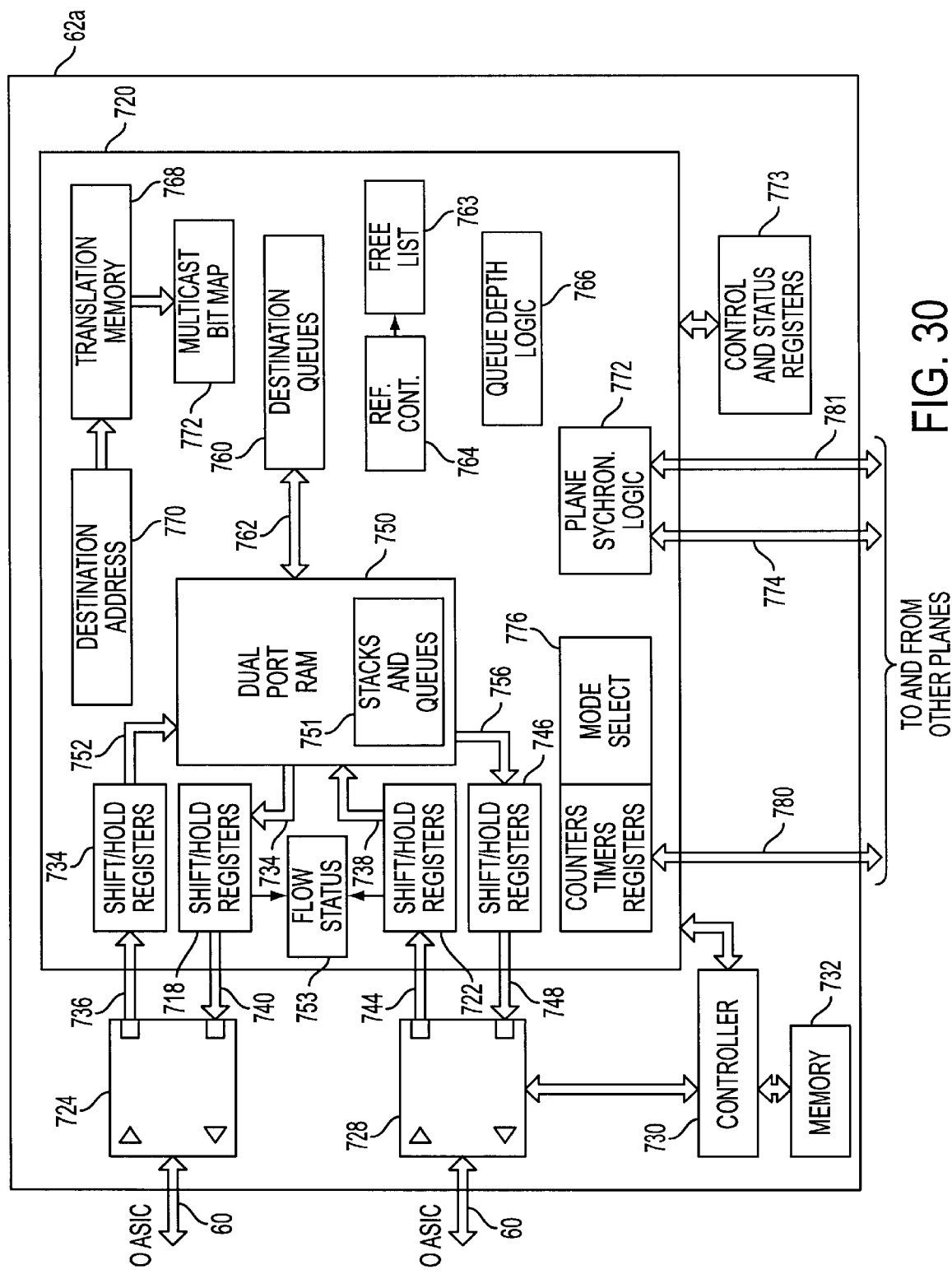
FIG. 30 is a logical block diagram of an interconnect card of the type used to transfer information between the line cards of FIG. 4.

FIG. 30 is a functional block diagram of an illustrative interconnect card 62a of interconnect 62. The card 62a includes an ASIC 720. As all of the interconnect cards are preferably identical, for the purpose of the following discussion it is assumed that card 62a is an exemplary interconnect card of a switching shelf 12.

As shown in FIG. 30, the interconnect card 62a includes Gigabit transceiver sets 724 and 728, memory elements 730, controller 732 and status and control registers 734. Gigabit transceiver set 728 provides Gigabit I/O ports 0a–7a and 0b–7b, which couple to the internal communication channels of a switching shelf 12 of FIG. 2. Gigabit transceiver set 724 provides Gigabit I/O ports 8a–15a and 8b–15b, which couple to the extended communication channels of the expansion shelf 18, shown in FIG. 1.

Each transceiver of sets 724 and 728 couples to the ASIC 720 by way of associated input and output shift and hold registers. More specifically, transceivers of set 724 couple to input shift and hold registers 734 by way of lines 736 and output shift and hold registers 738 by way of lines 740. Transceivers of set 724 couple to input shift and hold registers 742 by way of lines 744, and output shift and hold registers 746 by way of lines 748.

The ASIC 720 also includes a dual-port RAM 750 for storing various stacks and queues 751 associated with flow control information. Flow status 753 stores an availability status, regarding the availability of a particular line card to receive information. RAM 750 intermediately stores information being transferred through the card 62a. Shift and hold registers 734 and 736 couple to the dual-port RAM 750 by way of lines 752 and 754, respectively. Shift and hold registers 742 and 746 couple to the dual-port RAM 750 by way of lines 756 and 758. The dual-port RAM 750 also couples to destination stack 760 by way of lines 762. The ninety-six destination queues 760 intermediately store addresses representative of where particular data is stored in RAM 750. The queues 760, preferably employ a plurality of stacks for ease of addressing. However, other storage structures can be employed.

According to one preferred embodiment, the invention employs a plurality of memory storage queues/buffers to aid in the efficient transfer of information. It should be noted that the terms queue and buffer are used interchangeably. The dual-port RAM 750 provides an output queue for each transceiver of sets 724 and 726. More specifically, information cells coupled into card 62a to be transferred to a transmit ASIC 71 of FIG. 31, are first written into buffer memory at an address which is written into an output queue. Free list memory 762 provides a list of available buffer memory addresses. There is a reference counter 764 for each of the 1536 buffers in the dual port RAM 750. Reference counter 764 contains the number of output queues to which the contents of the respective buffers are to be sent. A reference counter 764 decrements in response to information being read from an associated buffer. When the reference counter reaches zero, the address of the buffer is returned to free list 745. In this way, the ASIC 720 can track the available buffer locations associated with each transceiver. Information written to buffer memory is subsequently transferred to one of the output shift and hold registers 740 or 748, and held there until an internal time slot arrives in which the destination address lookup can be performed, the read from the free list memory 762 can be performed, the write to the buffer memory can be performed, and the write to the output queue can be performed.

According to a preferred embodiment, the invention provides enhanced QoS features. To that end, queues 751 can include QoS queues. The QoS queues, such as those conceptually illustrated in FIGS. 31A and 31B, can have multiple watermark levels; those levels corresponding to differing priorities. By way of example, high-priority queue 800 of FIG. 31A can have two watermarks 806 and 808. In range 802, queue 800 reports its status as "stop-none," indicating the I/O channel associated with queue 800 is ready to receive information of any priority. During operation, in range 804, queue 800 reports its status as "stop-low," indicating the I/O channel associated with queue 800 is ready to receive information having a "medium" priority or higher. When the queue 800 is filled up to level 806, it reports its status as "stop-all." This indicates that its associated I/O channel is unavailable. If the "Stop-Low" watermark 808 of queue 800 has not been reached, it is available to receive information of any priority.

Figure 31B:
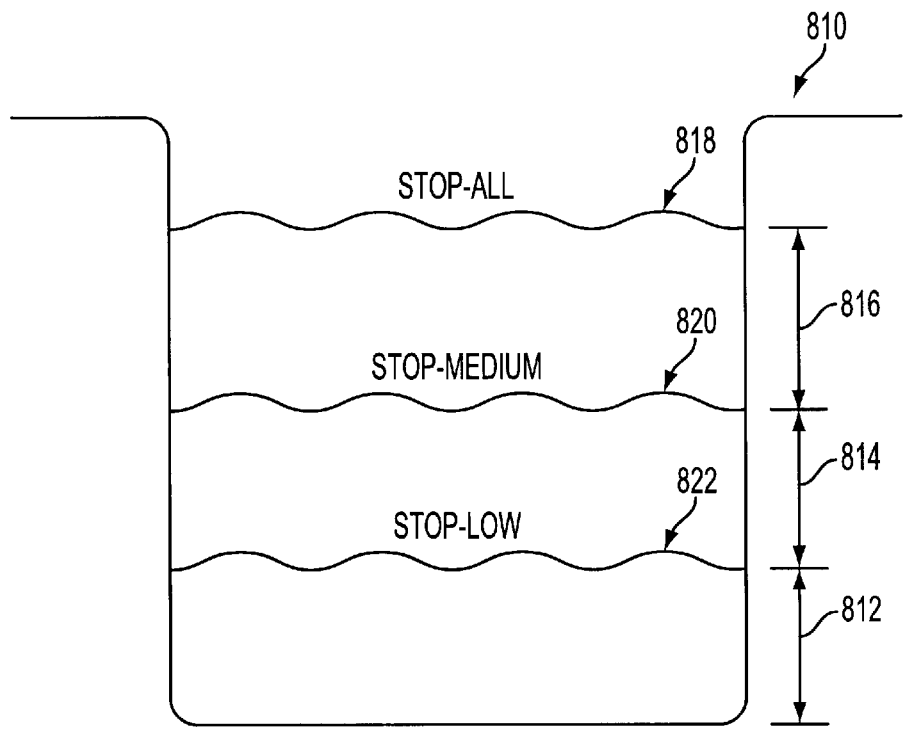

Low-priority queues, such as queue 810 depicted in FIG. 31B, can include three watermarks 818, 820 and 822. Queue 810 reports a status of "Stop-None" in range 812. It reports a status of "Stop-Low" in range 814. It reports a status of "Stop-Medium" in range 816, and a status of "Stop-All" subsequent to reaching watermark 818.

High-priority queues, such as queue 800, enable associated line cards to pass low- and medium-priority traffic, while not allowing low-priority traffic of one line card to strangle medium-priority traffic of a different line card.

Low-priority queues, such as queue 810, enable associated line cards to pass low-, medium- and high-priority traffic, while not allowing low-priority and medium-priority traffic of one line card to strangle high-priority traffic of a different line card. It also prevents low-priority traffic of one line card from strangling medium- and high-priority traffic of a different line card.

To efficiently manage information of differing priorities, the dual-port RAM 750 preferably provides storage for sixty-four low-priority unicast queues; one for each possible line card in the communication node 10. The RAM 750 also provides storage for sixteen high-priority unicast queues; one for each line card of a switching shelf 12, one for each potential additional switching shelf 12, and one extra queue. Multicast traffic, preferably employs four low-priority and four high-priority queues.

Additionally, each plane of the extension shelf 18 employs eight high-priority unicast queues; one for each potential switching shelf 12. Each extension shelf logical plane also employs eight high-priority and eight low-priority multicast queues; again, one for each potential switching shelf 12 destination.

A related component, the queue depth logic circuitry 766, maintains a status of all of the line cards of a switching shelf 12. The status provides information regarding the availability of each line card to receive information of varying priority levels.

Another feature of the illustrated embodiment of the invention is the way in which the node 10 passes the flow control status (sometimes referred to as back pressure status) between the extension shelf 18 and each of the line cards of the switching shelves 12. According to one preferred embodiment, the invention utilizes bits of the internal canonical information cell, previously reserved for the destination address.

The ASIC 720 also includes a translation memory 768. The translation memory 768 provides storage for path segments through the extension shelf 18, if an extension shelf 18 is included in the system. In the case of a communication node 10, configured as shown in FIG. 1, translation memory 768 preferably contains nine logical storage areas; one for each switching shelf 12, and one for the extension shelf 18. The extension shelf storage area is configured as a bitmap of destination line cards and priority. Destination address circuitry 770 accesses the translation memory 768, and the multicast bitmap register 772 receives the accessed information.

Substantially identical ASICs are employed in the interconnect cards 60 of the switching shelves 12 as are employed in the extension shelf 18. To that end, ASIC 720 includes mode select 777 for selecting whether ASIC 740 is to operate as an interconnection circuit or as an extended interconnection circuit.

Another feature of the illustrated ASIC 720 is a "slot counter" contained in timers, counters, control registers 778. The slot counter repeatedly counts from 0–15. Each port 01–15a and 0b–15b is assigned a lot count. Each time the slot count 0–15 matches a port number, a check is performed to determine if there is a cell to be transmitted out that port. If there is, the cell is copied from RAM 750 to shift and hold register 738 or 746 for transmission. If there is no cell to be transmitted, then a flow control cell is transmitted. According to the illustrated embodiment, a common slot counter is employed for the a-ports and the b-ports.

As mentioned above, card 62a also includes controller 732 and memory 730. Memory 730 stores the control code for card 62a. As such, it provides start up initialization of statuses, pointers and communication interfaces. Controller 732 provides a variety of conventional processor functions.

It should be noted that connections and circuit divisions referred to in the above description may be representative of both actual and logical connections or divisions.

The interconnect 62 delivers the internal cells to the transmit ASIC 64 of FIG. 5. The transmit ASIC 64 is responsible for performing output processing (see 86 in FIG. 6) so the appropriate output data stream is output over the appropriate port.

Figure 32:
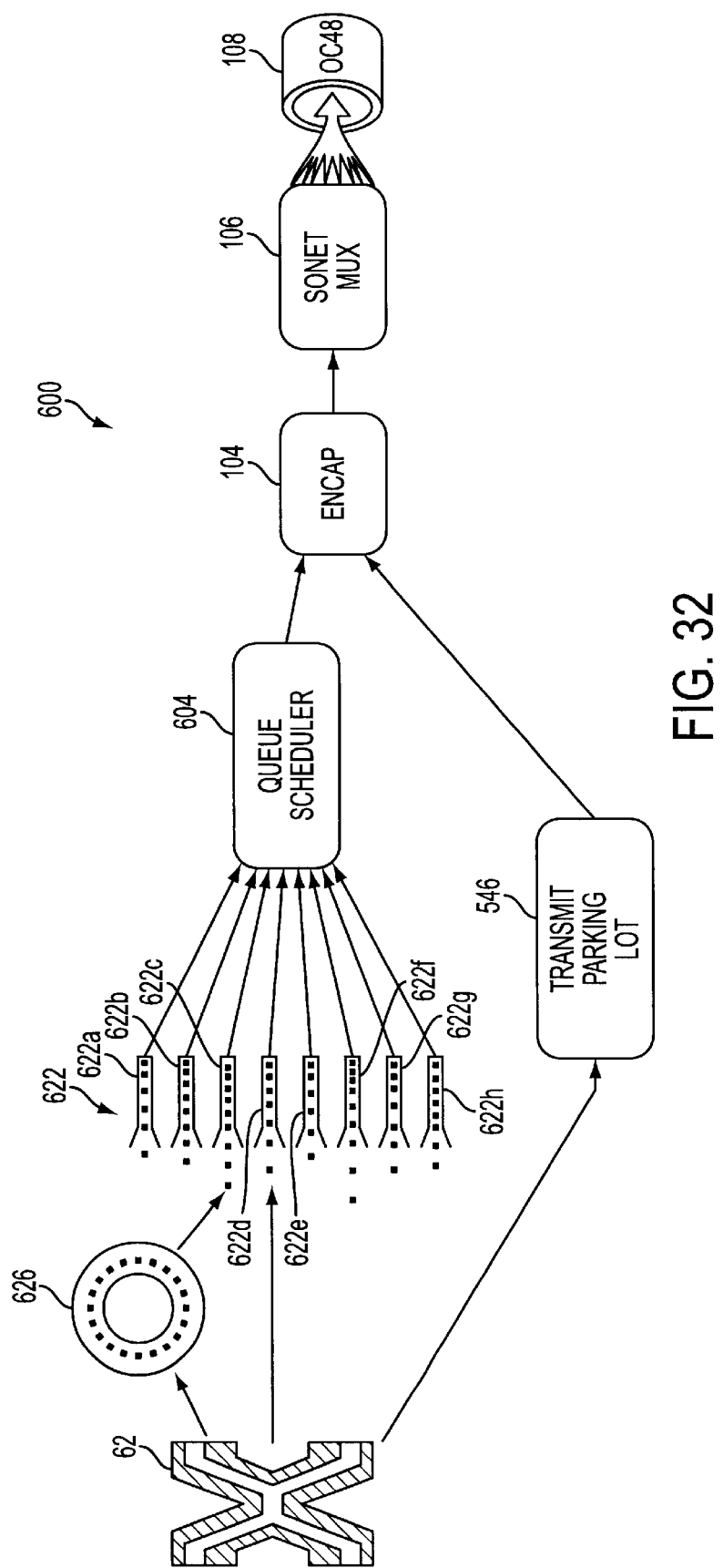
FIG. 32 is a functional diagram illustrating, among other output operations, QoS operations performed by the transmit ASIC of FIG. 5 during output processing.

FIG. 32 provides a more detailed flow diagram 600 illustrative of output processing performed by the transmit ASIC 71. As shown, the transmit parking lot 602 buffers output traffic from the interconnect 62. If the transmit ASIC 71 receives an internal cell as part of an IP packet, it defers output processing until all of the internal cells for that packet are received.

Figure 33:
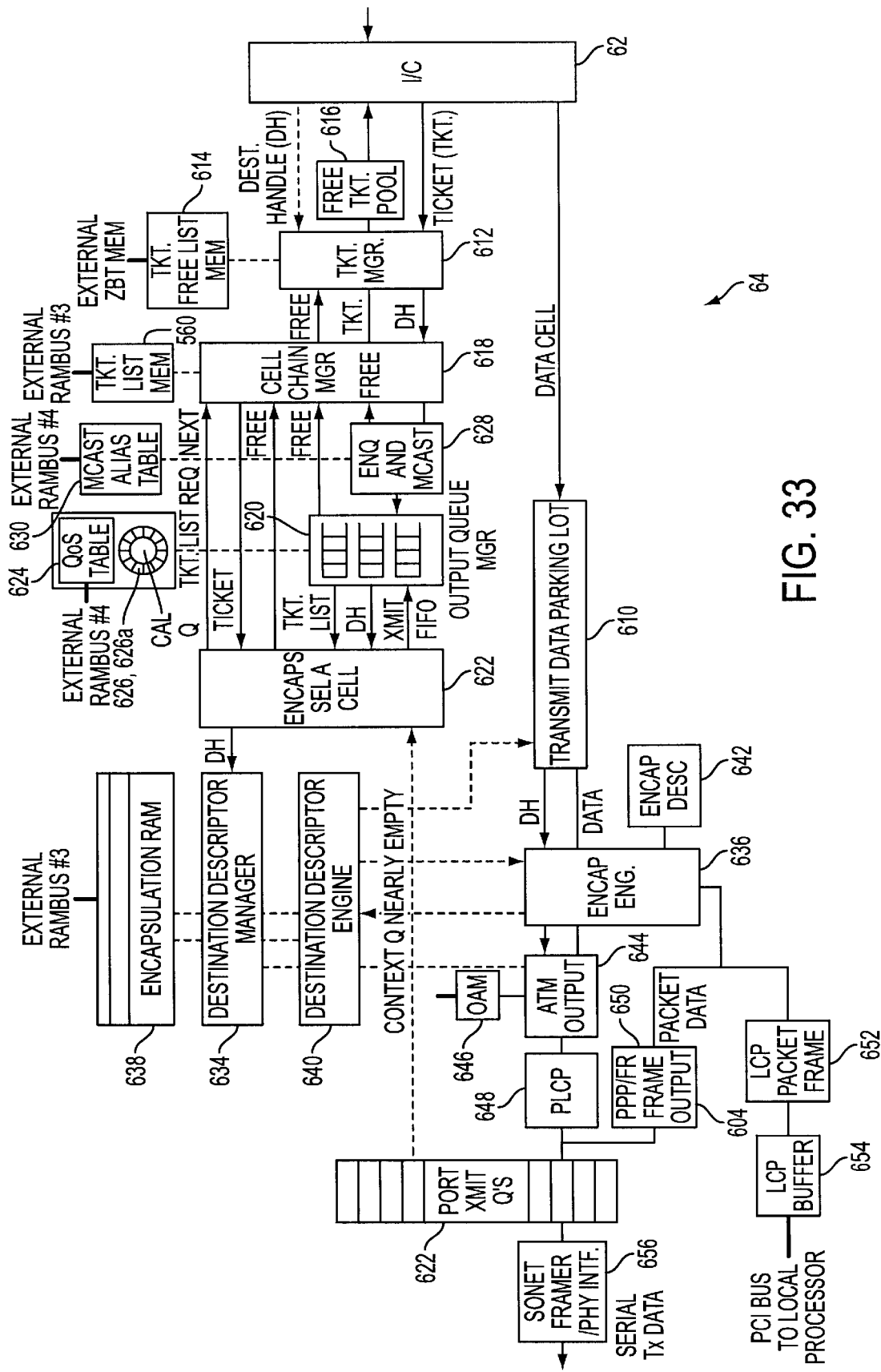
FIG. 33 is a more detailed diagram of the transmit ASIC included in the illustrative line card of FIG. 5.

FIG. 33 depicts the transmit ASIC 71 in more detail. The transmit ASIC 71 receives the 64-byte internal cell from the interconnect 62. The transmit ASIC 71 removes the interconnect header 422 of FIG. 20, and sends the data portion 426 of the internal cell 420 to the transmit data parking lot 610. The transmit data parking lot 610 may be implemented as an SDRAM. Those skilled in the art will appreciate that the transmit data parking lot 610 may be implemented alternatively with a number of other types of memory devices.

A ticket manager 612 manages the distribution of tickets. The ticket manager 612 has access to a ticket free list memory 614 and accesses the memory 614 to provide the interconnect 62 with a free ticket pool 616 of locations in the transmit data parking lot 610 that are available for use. The interconnect 62 chooses one of the free tickets and presents the ticket to the ticket manager 612. The interconnect 62 also requests the data to be stored in the transmit data parking lot 610 at the location identified by the ticket.

The interconnect 62 provides the ticket manager 612 with the DH for the internal cell 420 and passes the DH to the cell chain manager 618. The cell chain manager 618 accumulates packets of cell chains. The cell chain manager 618 ensures that all pieces (i.e. chunks of data) of an IP packet are available before the IP packet is transmitted.

The output queue manager 620 provides scheduling for implementing the QoS features of the invention. It manages various output queues 622, which will be described in more detail below. The output queue manager 620 cooperates with a QoS table 624 and a calendar queue 626.

The output data stream need not be a unicast data stream, but rather may be a multicast data stream such that the same data stream is sent to multiple destinations. The enqueuing and multicast component 628 in FIG. 33 is responsible for both in enqueuing cells in the transmit queues 622 and performing steps necessary to support multicast output. Multicast packets or cells are identified by the enqueuing and multicast component 628, and given a multicast identifier that corresponds to an ATM or IP multicast group. The enqueuing and multicast component 628 replicates the packets or cells to be sent to generate as many copies as there are destinations specified in a multicast alias table 630. The enqueuing and multicast component 628 transfers the replicated data into the appropriate output queues 622.

Figure 34:
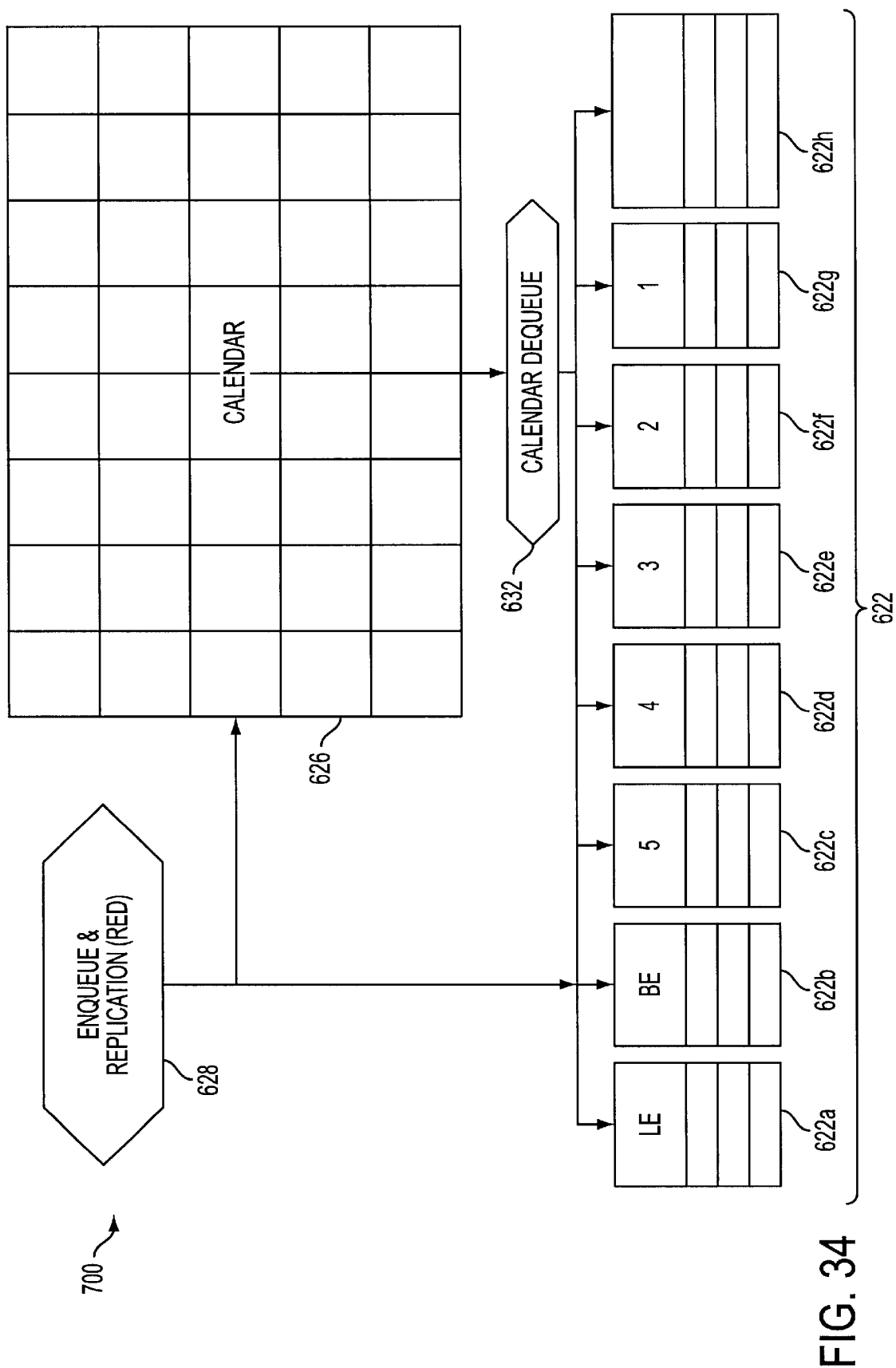
FIG. 34 is a logical block diagram of the transmit and calendar queues employed on the transmit ASIC of FIG. 33 for providing QoS features according to an illustrative embodiment of the invention.

FIG. 34 provides a more detailed block diagram of the queuing structure 700 of the transmit ASIC 71. As shown in FIGS. 33 and 34, the queuing structure 700 includes a calendar queue 626 and output queues 622. As shown, the output queues 622 and the calendar queue 626 receives data from the enqueuing and multicast component 628. According to the illustrative embodiment, each output port includes eight output queues 622a–622h. The DH specifies in which queue to put the cell. The following provides an example usage of the queues.

The interrupt queue 622h is the highest priority queue and is dequeued immediately. The interrupt queue 622h is used for extremely urgent data that has to be transmitted ahead of other information. Priority queues 622a–622g are for different priorities of data. These priority queues 622a–622g are serviced in accordance with a weighted round robin scheme wherein the data in the higher priority queues (e.g. priority one queue 622g) is serviced prior to the servicing of lower priority queues (e.g. priority five queue 622c). The best effort queue 622b is used for traffic that has no guarantees or assurances of delivery. The less effort queue 622a is used for data that has been tagged as being in the violation of a service contract, and can be dropped if there is not sufficient available bandwidth. In general, data on the less effort queue 622a is not expected to be transmitted, but can be if there is available bandwidth. As skilled artisans will appreciate, the output queue structure of FIG. 34 is considered to be illustrative in nature, and any number of output queue structures may be employed without impacting the scope of the present invention.

The queuing structure 700 also monitors the amount of data stored in each queue. If the amount of data in a queue exceeds a certain threshold, congestion control may be performed (e.g., PPD, EPD and RED) to discard or mark traffic destined to the queue. Information about the discarded traffic may also be sent to the control processor to identify those flows that are contributing most to the output congestion so that penalty actions, such as previously discussed, may be performed on those flows.

The calendar queue 626 shapes or rate limits traffic. The calendar queue 626 regulates the data to be placed into the queues 622a–622h. If a cell or packet is part of a data flow requiring shaping, then the enqueuing and multicast component 628 passes the cell or packet through the calendar queue 626. By using the calendar queue 626 only for traffic requiring shaping, the invention reduces the burden on the enqueuing engine to reference and update information. The calendar queue 626 employs a logical ring structure with logical slots 626a corresponding to future moments on time. The calendar queue 626 has current time, enqueue and dequeue pointers. The current time pointer advances according to a time schedule based on the width of a slot 626a in the calendar ring. The enqueue pointer points to the slot that the data is being scheduled into, and the dequeue pointer points to the slot from which data is being dequeued from the calendar queue. Data is queued based on a desired transmit rate, such that a "future time" is calculated for the item to be queued, based on the last transmit time of an item in a particular data flow. The "future time" cannot be less than the time slot pointed to by the current time pointer. The calendar queue 626 relies on the QoS table 624 to schedule data into the calendar queue 626 appropriately. The QoS table 624 stores indicators of the QoS features required by data in the transmit data parking lot 610. Preferably, the CP 64 of FIGS. 4 and 9 populate the table 624 through the LCP 72 of FIGS. 5 and 9.

The dequeue process for the calendar queue 626 is asynchronous relative to the enqueue process. The dequeue process removes all entries for the slot pointed to by the dequeue pointer and advances dequeue pointer until it catches up with the current time pointer. The entries removed from the "dequeue slot" are placed into the output queues 622a–622h specified by their QoS features. As shown in FIG. 34, data that is not subjected to shaping passes directly to the output queues 622a–622h. Alternatively, data that is subject to shaping is placed in the calendar queue for 626 until dequeued 632.

A queue scheduler shown at 604 in FIG. 32 (in the output queue manager 620) dequeues data from the output queues 622a–622h, also shown in FIG. 32. The scheduler 604 implements both priority and weighted round robin scheduling. A programmable threshold divides priority queues from weighted round robin queues. The scheduler 604 first processes the priority queues, transmitting traffic in strict priority order. The rest of the queues 622 are processed in weighted round robin order. Each output queue is typically assigned to QoS class, with the weighted priorities on the queues configured accordingly. The priority threshold can be used to select priority queuing only or weighted round robin queuing only for all of the output queues 622a–622h. Additionally, output queues 622a–622h of one logical output port can be configured independently from output queues 622a–622h of any other logical output port.

Figure 35:
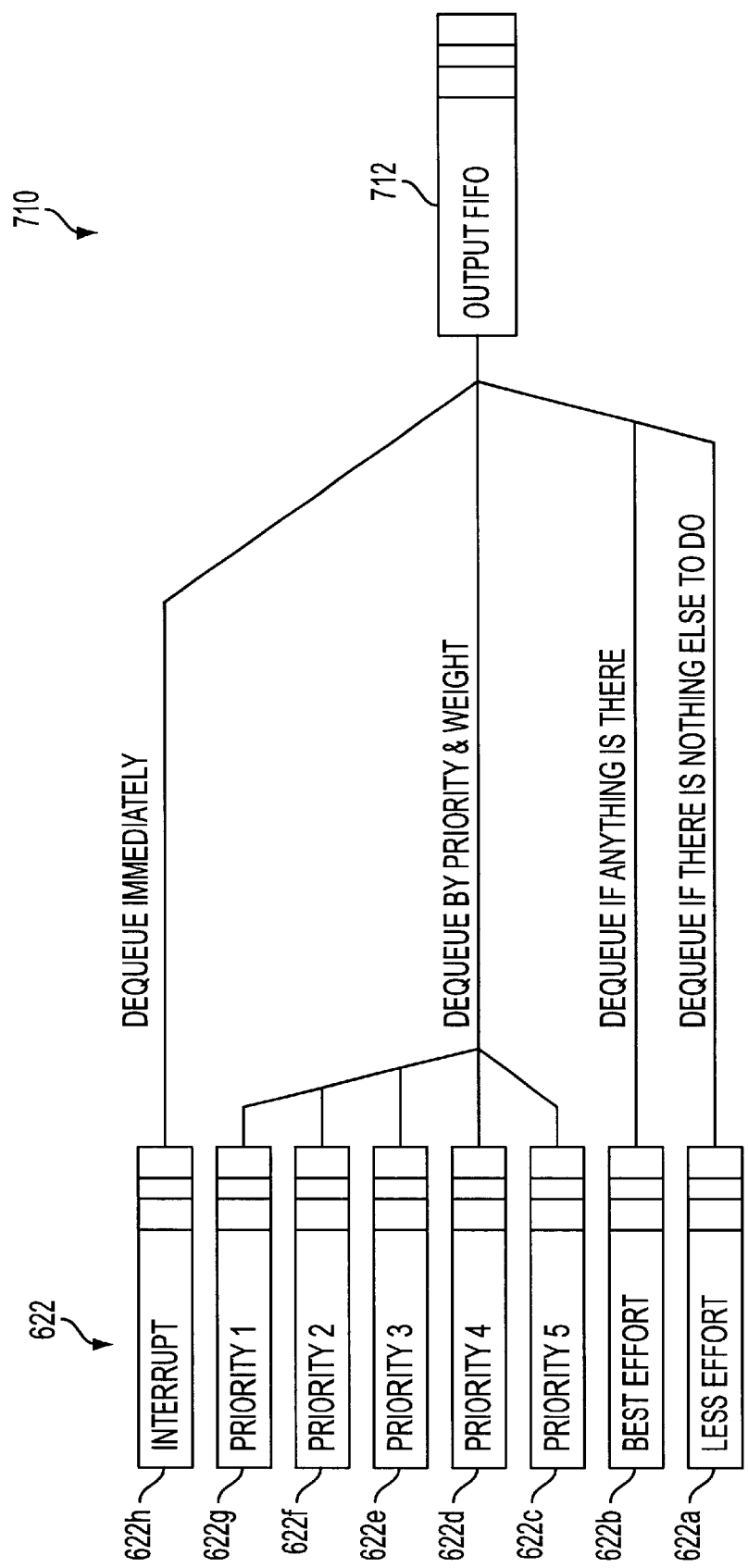
FIG. 35 illustrates the relationship between the transmit queues of FIG. 34 and an output FIFO storage element.

FIG. 35 is a more detailed diagram 710 illustrative of the dequeuing process of the output queues 622 into an output FIFO 712. Threshold levels in the output FIFO 712 trigger dequeuing. The output FIFO 712 triggers additional data to be dequeued in response to having its content fall below a selected level. The weighting of the priority queues 622c–622g allows a user to specify how much bandwidth can be consumed by a particular queue, and prevents a higher priority queue from consuming all of the available bandwidth. According to the illustrative embodiment, the queuing structure achieves this by only dequeuing a maximum amount of data allowed by the weight from a particular queue, prior to moving on to dequeue data from a lower priority queue with the illustrative queuing structure.

According to the illustrative embodiment, each communication module 12 of FIG. 2 includes up to 48 logical output ports and each logical output ports has an associated set of output queues 622. The following describes an example method of using the queues.

The queue 622h is an interrupt queue. As mentioned above, this queue is serviced first, and it is used for extremely urgent data that has to be transmitted ahead of any other information. Typical uses include link management frames or cells or delay sensitive traffic that cannot be queued any other way. In the illustrative embodiment, this queue 622h is used internally by the communication node 10, and only when absolutely necessary.

The queues 622c–622g are priority queues. These queues are for any traffic that is treated better than best-effort and has rate limits. Data from the calendar queue 626 is placed into these queues according to priority. For example, the queue manager 620 places extremely time sensitive CBR and rtVBR traffic into the Priority 1 queue 622g, while it places nrtVBR traffic into a lower priority queue, such as the Priority 5 queue 622e.

The queue 622b is a "best effort" queue. This is the queue that is used for traffic that has no associated QoS guarantees or assurances of delivery. Typically, the queue manager directs UBR and non-reserved IP traffic into the queue 622b.

The queue 622a provides a "less effort" queue. The queue 622a can be used for data that is tagged as being in violation of a traffic service contract or would be dropped if there is not any available bandwidth. Data in the queue 622a is not expected to be transmitted, but can be if there is available bandwidth. Another use for this queue is for "misbehaving" best effort flows. For example, if a flow is experiencing excessive discards from the RED algorithm, the flow can be classified and placed in the "less effort" queue as a penalty.

The output queue manager 620 passes a ticket list and a DH to the encapsulation selector 632. The encapsulation selector 632 then retrieves the appropriate data from the transmit parking lot 610. The encapsulation selector 632 passes the destination handle for the selected cells to the destination description manager 634. The destination description manager 634 works in conjunction with the encapsulation engine 636 to determine how to appropriately encapsulate the data that is to be output. The destination description manager 634 accesses the encapsulation RAM 638 to obtain information regarding the appropriate encapsulation for the destination. The destination description manager 634 has a destination descriptor for the destination of the output data stream. The DH, which accompanies every cell, is used by the destination description manager 634 to locate a destination descriptor. The destination descriptor is a field found within the DH and contains all of the information necessary for reencapsulating the cell, including partial cyclic redundancy checks and information regarding the length of the frame. The encapsulation engine 634 uses an encapsulation identifier from the destination descriptor engine 640 to reference a table of encapsulation descriptors 642. The encapsulation descriptor from table 642 contains a pattern to be inserted into the beginning of an outgoing frame that identifies the type of encapsulation.

The encapsulation engine 636 gathers the DH and the data retrieved from the transmit data parking lot 610, packages the data in the appropriate encapsulation and forwards the data for ATM output 644. The ATM output module 644 creates a correct AAL5 trailer and sets various bits in the cell. The Operations Administration and Maintenance (OAM) element 646 provides operation and control functions within the ATM protocol set. The ATM output module 644 transmits the resulting data to the PLCP module 648. If no PLCP encapsulation is required, the cells pass through the PLCP module 648 to the port transmit queue 622, without modification. Otherwise, the PLCP module 648 encapsulates the cells into PLCP frames.

The encapsulation engine 636 passes IP packets to the PPP/FR output module 650, which PPP frames or FR frames the IP packets for encapsulation. The PPP/FR output module 650 passes the resulting frames to the port transmit queues 622. The encapsulation engine 636 passes certain packets to the LCP 72 of FIG. 5 by way of the LCP packet output module 652 and the LCP buffer 654.

A SONET framer/physical interface 656 frames the data into SONET frames and performs parallel to serial conversion. The SONNET framer/physical interface 656 is a physical interface to the output lines. The resulting data is output towards its destination.

Thus, the illustrative embodiment of the invention provides a QoS facility for operation within a digital communication node. The digital communication node is essentially a single device and can forward IP packets, as well as ATM cells. The illustrative QoS facility provides QoS features for both IP-based data streams and ATM-based data streams. Since the illustrative communication node transfers data internally in an internal canonical form, it can be easily adapted to forward and apply QoS features to data streams using, substantially, any encapsulation scheme.

While the present invention has been described with reference to an illustrative embodiment thereof, those skilled in the art will appreciate the various changes in form and detail may be made without departing from the intended scope of the present invention as in the appended claims.

Having described the invention, what is claimed as new and protected by Letters Patent is:

1. A facility for providing Asynchronous Transfer Mode (ATM) and Internet Protocol (IP) Quality of Service (QoS) features in a digital communication node, said facility comprising:

a plurality of logical input ports adapted for receiving input data flows from external data sources and a plurality of logical output ports adapted for transmitting output data flows to a plurality of external data destinations, wherein said input data flows and said output data flows include a plurality of ATM data cells and a plurality of IP data packets;

ATM forwarding means for forwarding ATM data cells from one of said logical input ports toward at least one of said logical output ports along a selected forwarding path;

IP forwarding means for forwarding IP data packets from one of said logical input ports toward at least one of said logical output ports along a selected forwarding path;

QoS elements for identifying one or more ATM QoS features for ATM data cells in the input data flows, identifying one or more IP QoS features for IP data packets in the input data flows, and scheduling forwarding of said input data flows, based at least in part, on the identified one or more ATM QoS features and on the identified one or more IP QoS features; and a housing that contains both said ATM forwarding means and said IP forwarding means.

2. A facility for providing ATM and IP QoS features according to claim 1, wherein the housing also includes said QoS elements.

3. A facility for providing ATM and IP QoS features according to claim 1, wherein said QoS elements further comprise call control means for responding to service contract requests from at least one of said external data sources and said external data destinations, and for selectively forming service contracts between said communication node and at least one of said external data sources and said external data destinations, wherein said service contracts include agreements by said communication node to provide said ATM and IP QoS features to at least one of input data flows from said external data sources and input data flows directed toward said external data destinations, and wherein said communication node is adapted for providing differing service contracts to different ones of said external data sources and said external data destinations.

4. A facility for providing ATM and IP QoS features according to claim 3, wherein said call control means is adapted for determining an available bandwidth of said communication node and for denying a service contract request in response to determining that insufficient bandwidth is available to provide a requested QoS feature.

5. A facility for providing ATM and IP QoS features according to claim 3, wherein said QoS elements further comprise traffic control means, responsive to said call control means, for interpreting said ATM and IP QoS features provided by said service contracts, and for signaling control information to devices along said forwarding paths to ensure adequate bandwidth along said forwarding paths to provide said ATM and IP QoS features commensurate with said service contracts.

6. A facility for providing ATM and IP QoS features according to claim 1, wherein said QoS elements further comprise ReSerVation Protocol (RSVP) means for providing a signaling mechanism for an external data destination to request a service contract from said communication node for data flows directed toward said external data destination.

7. A facility for providing ATM and IP QoS features according to claim 1, wherein said QoS elements further comprise data classification means for selecting for particular QoS categories, IP data packets and ATM data cells, which have been input to said communication node, by determining which QoS features, if any, are required by said input IP data packets and said input ATM data cells.

8. A facility for providing ATM and IP QoS features according to claim 7, wherein said QoS elements further comprise scheduling means for scheduling forwarding of said IP data packets and switching of said ATM data cells in response to said QoS categories selected by said classification means.

9. A facility for providing ATM and IP QoS features according to claim 1, wherein said QoS elements further comprise data policing means for determining if said IP data packets and said ATM data cells are part of a particular one of said input data flows, for determining if an external source of said particular data flow has a service contract with said communication node, and for determining whether said IP data packets and said ATM data cells of said particular data flow are in accord with said service contract.

10. A facility for providing ATM and IP QoS features according to claim 9, wherein said policing means further includes discarding means for discarding, selected ones of said IP data packets and said ATM data cells, which are not in accord with said service contract.

11. A facility for providing ATM and IP QoS features according to claim 9, wherein said policing means further includes marking means for marking, selected ones of said IP data packets and said ATM data cells, which are not in accord with said service contract.

12. A facility for providing ATM and IP QoS features according to claim 9, wherein one or more of said ATM data cells make up an ATM frame, and wherein said policing means further includes Partial Packet Discard (PPD) means for discarding selected additional ATM data cells in an ATM frame in response to said policing means determining that another of said ATM data cells is not in accord with a service contract.

13. A facility for providing ATM and IP QoS features according to claim 9, wherein one or more of said ATM data cells make up an ATM frame, and wherein said policing means further includes ATM queuing means for buffering said forwarding of ATM data cells and Early Packet Discard (EPD) means for discarding entire ATM frames in response to said ATM queuing means reaching a selected level of fullness.

14. A facility for providing ATM and IP QoS features according to claim 9, wherein said policing means further includes queuing means for buffering said forwarding of ATM data cells and for buffering said forwarding of said IP data packets, and Random Early Detect means for substantially randomly discarding IP data packets and ATM data cells in response to said queuing means reaching one or more selected levels of fullness.

15. A facility for providing Asynchronous Transfer Mode (ATM) and Internet Protocol (IP) Quality of Service (QoS) features in a digital communication node, said facility comprising:

a plurality of logical input ports adapted for receiving input data flows from external data sources and a plurality of logical output ports adapted for transmitting output data flows to a plurality of external data destinations, wherein said input data flows and said output data flows include a plurality of ATM data cells and a plurality of IP data packets;

ATM forwarding means for forwarding ATM data cells from one of said logical input ports toward at least one of said logical output ports along a selected forwarding path;

IP forwarding means for forwarding IP data packets from one of said logical input ports toward at least one of said logical output ports along a selected forwarding path;

QoS elements for identifying one or more ATM QoS features for ATM data cells in the input data flows, identifying one or more IP QoS features for IP data packets in the input data flows, and scheduling forwarding of said input data flows, based at least in part, on the identified one or more ATM QoS features and on the identified one or more IP QoS features; and an Application Specific Integrated Circuit that contains at least a portion of said ATM forwarding means, said IP forwarding means, and said QoS elements.

16. A facility for providing ATM and IP QoS features according to claim 15 further comprising a common physical interface that includes said logical input ports from which said ATM forwarding means receives said ATM data cells and said IP forwarding means receives said IP data packets.

17. A facility for providing Asynchronous Transfer Mode (ATM) and Internet Protocol (IP) Quality of Service (QoS) features in a digital communication node, said facility comprising:

a plurality of logical input ports adapted for receiving input data flows from external data sources and a plurality of logical output ports adapted for transmitting output data flows to a plurality of external data destinations, wherein said input data flows and said output data flows include a plurality of ATM data cells and a plurality of IP data packets, and said input data flows include Synchronous Optical Network (SONET) frames;

ATM forwarding means for forwarding ATM data cells from one of said logical input ports toward at least one of said logical output ports along a selected forwarding path;

IP forwarding means for forwarding IP data packets from one of said logical input ports toward at least one of said logical output ports along a selected forwarding path;

QoS elements for identifying one or more ATM QoS features for ATM data cells in the input data flows, identifying one or more IP QoS features for IP data packets in the input data flows, and scheduling forwarding of said input data flows, based at least in part, on the identified one or more ATM QoS features and on the identified one or more IP QoS features; and a SONET deframer for deframing said SONET frames in said input data flows.

18. A facility for providing Asynchronous Transfer Mode (ATM) and Internet Protocol (IP) Quality of Service (QoS) features in a digital communication node, said facility comprising:

a plurality of logical input ports adapted for receiving input data flows from external data sources and a plurality of logical output ports adapted for transmitting output data flows to a plurality of external data destinations, wherein said input data flows and said output data flows include a plurality of ATM data cells and a plurality of IP data packets;

ATM forwarding means for forwarding ATM data cells from one of said logical input ports toward at least one of said logical output ports along a selected forwarding path, wherein said ATM forwarding means includes ATM lookup means for identifying toward which of said logical output ports to forward said ATM data cells in said input data flows based on information contained in said ATM data cells;

IP forwarding means for forwarding IP data packets from one of said logical input ports toward at least one of said logical output ports along a selected forwarding path; and QoS elements for identifying one or more ATM QoS features for ATM data cells in the input data flows, identifying one or more IP QoS features for IP data packets in the input data flows, and scheduling forwarding of said input data flows, based at least in part, on the identified one or more ATM QoS features and on the identified one or more IP QoS features.

19. A facility for providing ATM and IP QoS features according to claim 18, wherein said ATM lookup means is further adapted for determining which of said ATM QoS features should be applied to said ATM data cells in said input data flows.

20. A facility for providing ATM and IP QoS features according to claim 19, wherein said ATM lookup means is further adapted for performing said identifying and said determining in a single lookup operation.

21. A facility for providing Asynchronous Transfer Mode (ATM) and Internet Protocol (IP) Quality of Service (QoS) features in a digital communication node, said facility comprising:

a plurality of logical input ports adapted for receiving input data flows from external data sources and a plurality of logical output ports adapted for transmitting output data flows to a plurality of external data destinations, wherein said input data flows and said output data flows include a plurality of ATM data cells and a plurality of IP data packets;

ATM forwarding means for forwarding ATM data cells from one of said logical input ports toward at least one of said logical output ports along a selected forwarding path;

IP forwarding means for forwarding IP data packets from one of said logical input ports toward at least one of said logical output ports along a selected forwarding path, wherein said IP forwarding means includes IP lookup means for identifying toward which of said logical output ports to route said IP data packets in said input data flows based on address information contained in said IP data packets; and QoS elements for identifying one or more ATM QoS features for ATM data cells in the input data flows, identifying one or more IP QoS features for IP data packets in the input data flows, and scheduling forwarding of said input data flows, based at least in part, on the identified one or more ATM QoS features and on the identified one or more IP QoS features.

22. A facility for providing ATM and IP QoS features according to claim 21, wherein said IP lookup means is further adapted for determining which of said IP QoS features should be applied to said IP data packet.

23. A facility for providing ATM and IP QoS features according to claim 1, wherein said ATM QoS features include at least one of, Constant Bit Rate (CBR), Unspecified Bit Rate (UBR), non-real-time Variable Bit Rate (nrtVBR), real-time Variable Bit Rate (rtVBR) and Available Bit Rate (ABR), and said IP QoS features include at least one of, Provisioned QoS, Differentiated Services, and Integrated Services.

24. A facility for providing Asynchronous Transfer Mode (ATM) and Internet Protocol (IP) Quality of Service (QoS) features in a digital communication node, said facility comprising:

a plurality of logical input ports adapted for receiving input data flows from external data sources, and a plurality of logical output ports adapted for transmitting output data flows to a plurality of external data destinations, wherein said input data flows and said output data flows include at least one of a plurality of ATM data cells and a plurality of IP data packets; and a plurality of communication modules, wherein said communication modules include:

IP packet forwarding elements for forwarding IP data packets from one of said logical input ports toward at least one of said logical output ports, ATM cell forwarding elements for forwarding ATM data cells from one of said logical input ports to at least one of said logical output ports, and QoS elements adapted for identifying one or more ATM QoS features associated with the ATM data cells in the input data flows, identifying one or more IP QoS features associated with the IP data packets in the input data flows, and providing the identified one or more ATM QoS features and the identified one or more IP QoS features to said input data flows in said communication node, wherein at least some of said QoS elements are distributed in said plurality of communication modules.

25. A facility for providing Asynchronous Transfer Mode (ATM) and Internet Protocol (IP) Quality of Service (QoS) features in a digital communication node, said facility comprising:

a plurality of logical input ports adapted for receiving input data flows from external data sources, and a plurality of logical output ports adapted for transmitting output data flows to a plurality of external data destinations, wherein said input data flows and said output data flows include at least one of a plurality of ATM data cells and a plurality of IP data packets;

a plurality of communication modules, wherein said communication modules include:

IP packet forwarding elements for forwarding IP data packets from one of said logical input ports toward at least one of said logical output ports, ATM cell forwarding elements for forwarding ATM data cells from one of said logical input ports to at least one of said logical output ports, and QoS elements adapted for identifying one or more ATM QoS features associated with the ATM data cells in the input data flows, identifying one or more IP QoS features associated with the IP data packets in the input data flows, and providing the identified one or more ATM QoS features and the identified one or more IP QoS features to said input data flows in said communication node; and an interconnect in digital communication with said communication modules and adapted for forwarding ATM data cells and IP data packets between said communication modules.

26. A facility for providing ATM and IP QoS features according to claim 25, wherein at least some of said QoS elements are distributed in said interconnect.

27. A facility for providing ATM and IP QoS features according to claim 24, further comprising an interconnect in digital communication with said communication modules and adapted for forwarding ATM data cells and routing IP data packets between said communication modules, wherein at least some of said QoS elements are distributed in said interconnect.

28. A facility for providing ATM and IP QoS features according to claim 24 further comprising a control processor for controlling operation of said QoS elements.

29. A facility for providing ATM and IP QoS features according to claim 28, wherein said communication modules include communication module processors that are in communication with said control processor and assist said control processor in controlling said QoS elements.

30. A facility for providing Asynchronous Transfer Mode (ATM) and Internet Protocol (IP) Quality of Service (QoS) features in a digital communication node, said facility comprising:

a plurality of logical input ports adapted for receiving input data flows from external data sources, and a plurality of logical output ports adapted for transmitting output data flows to a plurality of external data destinations, wherein said input data flows and said output data flows include at least one of a plurality of ATM data cells and a plurality of IP data packets; and a plurality of communication modules, wherein said communication modules include:

IP packet forwarding elements for forwarding IP data packets from one of said logical input ports toward at least one of said logical output ports, ATM cell forwarding elements for forwarding ATM data cells from one of said logical input ports to at least one of said logical output ports, QoS elements adapted for identifying one or more ATM QoS features associated with the ATM data cells in the input data flows, identifying one or more IP QoS features associated with the IP data packets in the input data flows, and providing the identified one or more ATM QoS features and the identified one or more IP QoS features to said input data flows in said communication node, and lookup engines adapted for processing IP data packets and ATM data cells in an input data flow to determine ATM and IP QoS features required by said IP data packets and said ATM data cells in said input data flow.

31. A facility for providing ATM and IP QoS features according to claim 30, wherein said lookup engines are further adapted for processing said IP data packets and said ATM data cells in an input data flow to identify one or more of said logical output ports towards which said ATM data cells and said IP data packets should be forwarded.

32. A facility for providing ATM and IP QoS features according to claim 31, wherein said lookup engines are further adapted for generating a destination handle representative of said QoS features required by said ATM data cells and said IP data packets, and representative of said one or more logical output ports towards which said ATM data cells and said IP data packets are to be forwarded.

33. A facility for providing ATM and IP QoS features according to claim 31, wherein said lookup engines are further adapted for determining said QoS features and said logical output ports in common lookup operations.

34. A facility for providing ATM and IP QoS features according to claim 30, wherein said ATM data cells include ATM cell headers and said lookup engines are further adapted for processing said ATM cell headers to determine ATM QoS features required by said ATM cells in an input data flow.

35. A facility for providing ATM and IP QoS features according to claim 34, wherein said ATM cell headers include Virtual Circuit Indicators (VCIs) and Virtual Path Indicators (VPIs) and said lookup engines are further adapted to process said VCIs and VPIs to determine ATM QoS features required by said ATM cells in an input data flow.

36. A facility for providing ATM and IP QoS features according to claim 30, wherein said IP data cells include IP cell headers comprising at least one of, destination address, source address, IP protocol number, input port number, output port number and source Autonomous System (AS), and wherein said lookup engines are further adapted for processing said IP cell headers to determine QoS features required by said IP data packets in an input data flow.

37. A facility for providing Asynchronous Transfer Mode (ATM) and Internet Protocol (IP) Quality of Service (QoS) features in a digital communication node, said facility comprising:

a plurality of logical input ports adapted for receiving input data flows from external data sources, and a plurality of logical output ports adapted for transmitting output data flows to a plurality of external data destinations, wherein said input data flows and said output data flows include at least one of a plurality of ATM data cells and a plurality of IP data packets; and a plurality of communication modules, wherein said communication modules include:

IP packet forwarding elements for forwarding IP data packets from one of said logical input ports toward at least one of said logical output ports, ATM cell forwarding elements for forwarding ATM data cells from one of said logical input ports to at least one of said logical output ports, QoS elements adapted for identifying one or more ATM QoS features associated with the ATM data cells in the input data flows, identifying one or more IP QoS features associated with the IP data packets in the input data flows, and providing the identified one or more ATM QoS features and the identified one or more IP QoS features to said input data flows in said communication node, and policing elements for detecting if said IP data packets and said ATM data cells in an input data flow exceed a selected QoS feature.

38. A facility for providing ATM and IP QoS features according to claim 30, wherein said communication modules include policing elements for detecting nonconforming IP data packets and nonconforming ATM data cells in an input data flow, wherein said nonconforming IP data packets and ATM data cells exceed a selected QoS feature.

39. A facility for providing ATM and IP QoS features according to claim 38, wherein said lookup engine includes at least some of said policing elements, and is further adapted for marking said nonconforming ATM data and IP data packets.

40. A facility for providing ATM and IP QoS features according to claim 39, wherein said lookup engines are further adapted for generating destination handles representative of said QoS features required by said ATM data cells and said IP data packets, and for performing said marking of said nonconforming ATM data cells and said IP data packets by setting bits in said destination handle.

41. A facility for providing ATM and IP QoS features according to claim 25, wherein said communication modules further comprise lookup engines adapted for processing IP data packets and ATM data cells in an input data flow to determine ATM and IP QoS features required by said IP data packets and said ATM data cells in said input data flow, and for generating destination handles representative of said QoS features required by said ATM data cells and said IP data packets, and said interconnect further comprises input data queues for IP data packets and ATM data cells, wherein said interconnect determines which of said input data queues to store particular ones of said IP data packets and said ATM data cells based at least in part on said IP and ATM QoS features indicated by said destination handle.

42. A facility for providing ATM and IP QoS features according to claim 25 wherein ATM data cells and IP data packets transferred from said interconnect to one of said communication modules include an associated status indicating an ability of one or more of others of said communication modules to receive additional ATM data cells and IP data packets.

43. A facility for providing ATM and IP QoS features according to claim 25, wherein said communication modules further include a queuing structure for intermediately storing ATM data cells and IP data packets transferred from said interconnect to said communication modules for output via one or more of said logical output ports.

44. A facility for providing ATM and IP QoS features according to claim 43, wherein said communication modules include one or more physical output ports associated with each of said logical output ports, said queuing structure further comprises a plurality of output queues associated with each of said physical output ports, wherein each plurality of output queues is adapted for intermediately storing ones of said IP data packets and ATM data cells destined for output via said associated physical output port.

45. A facility for providing ATM and IP QoS features according to claim 44, wherein output queues included in a particular plurality of output queues have an assigned priority relative to other output queues included in said particular plurality, wherein data stored in an output queue having a relatively higher priority is scheduled for output in preference to data stored in a queue having a relatively lower priority.

46. A facility for providing ATM and IP QoS features according to claim 44, wherein said queuing structure further includes a calendar queue, wherein said calendar queue is adapted for intermediately storing at least selected ones of said ATM data cells and IP data packets destined for said output queues, and for scheduling transfer of said selected ones of said ATM data cells and IP data packets from said calendar queue to said output queues based at least in part on which of said ATM and IP QoS features apply to said selected ones of said ATM data cells and IP data packets.

47. A facility for providing ATM and IP QoS features according to claim 45, wherein said queuing structure further comprises an output stack, wherein said output stack is adapted for intermediately storing said ATM data cells and IP data packets destined for transfer from one of said pluralities of output queues, and said facility further comprises a processor for transferring said ATM data cells and IP data packets from said plurality of output queues to said output stack according to a selected priority, wherein said selected priority is based at least in part on from which one of said output queues said data being transferred.

48. A facility for providing ATM and IP QoS features according to claim 15, wherein said QoS elements further comprise means for providing a static QoS contract between said communication node and an external device.

49. A facility for providing ATM and IP QoS features according to claim 1 wherein the QoS elements are further configured to prioritize transfer of said ATM data cells and IP data packets through said facility based at least in part on the identified one or more ATM QoS features and the identified one or more IP QoS features.

50. A facility for providing ATM and IP QoS features according to claim 18, further comprising:

ATM prioritizing elements for prioritizing transfer of said ATM data cells from said logical input ports to said logical output ports, based at least in part, on the identified one or more ATM QoS features.

51. A facility for providing ATM and IP QoS features according to claim 21, further comprising:

IP prioritizing elements for prioritizing transfer of said IP data packets from said logical input ports to said logical output ports, based at least in part, on the identified one or more IP QoS features.

52. A method for providing Asynchronous Transfer Mode (ATM) and Internet Protocol (IP) Quality of Service (QoS) features in a digital communication node, said method comprising:

receiving, by a plurality of logical input ports, input data flows from external data sources, wherein said input data flows include a plurality of ATM data cells and a plurality of IP data packets;

transmitting, by a plurality of logical output ports, output data flows to a plurality of external data destinations, wherein said output data flows include a plurality of ATM data cells and a plurality of IP data packets;

identifying one or more of said logical output ports to which to forward said ATM data cells in said input data flows based on information contained in said ATM data cells;

forwarding ATM data cells from one of said logical input ports toward the identified one or more logical output ports along a selected forwarding path;

forwarding IP data packets from one of said logical input ports toward at least one of said logical output ports along a selected forwarding path;

identifying one or more ATM QoS features for ATM data cells in the input data flows;

identifying one or more IP QoS features for IP data packets in the input data flows; and scheduling forwarding of said input data flows, based at least in part, on the identified one or more ATM QoS features and on the identified one or more IP QoS features.

53. A method for providing Asynchronous Transfer Mode (ATM) and Internet Protocol (IP) Quality of Service (QoS) features in a digital communication node, said method comprising:

receiving, by a plurality of logical input ports, input data flows from external data sources, wherein said input data flows include a plurality of ATM data cells and a plurality of IP data packets;

transmitting, by a plurality of logical output ports, output data flows to a plurality of external data destinations, wherein said output data flows include a plurality of ATM data cells and a plurality of IP data packets;

identifying one or more of said logical output ports to which to route said IP data packets in said input data flows based on address information contained in said IP data packets;

forwarding ATM data cells from one of said logical input ports toward at least one of said logical output ports along a selected forwarding path;

forwarding IP data packets from one of said logical input ports toward the identified one or more logical output ports along a selected forwarding path;

identifying one or more ATM QoS features for ATM data cells in the input data flows;

identifying one or more IP QoS features for IP data packets in the input data flows; and scheduling forwarding of said input data flows, based at least in part, on the identified one or more ATM QoS features and on the identified one or more IP QoS features.

* * * * *